United States Patent
Sights et al.

(10) Patent No.: US 11,562,423 B2
(45) Date of Patent: Jan. 24, 2023

(54) SYSTEMS FOR A DIGITAL SHOWROOM WITH VIRTUAL REALITY AND AUGMENTED REALITY

(71) Applicant: Levi Strauss & Co., San Francisco, CA (US)

(72) Inventors: James Barton Sights, San Francisco, CA (US); Benjamin Bell, San Francisco, CA (US); Debdulal Mahanty, Fremont, CA (US); Jennifer Schultz, Cambridge, MA (US); Christopher Schultz, Cambridge, MA (US)

(73) Assignee: Levi Strauss & Co., San Francisco, CA (US)

( * ) Notice: Subject to any disclaimer, the term of this patent is extended or adjusted under 35 U.S.C. 154(b) by 0 days.

(21) Appl. No.: 17/008,492

(22) Filed: Aug. 31, 2020

(65) Prior Publication Data

US 2021/0065287 A1 Mar. 4, 2021

Related U.S. Application Data

(60) Provisional application No. 62/893,767, filed on Aug. 29, 2019.

(51) Int. Cl.
*G06Q 30/06* (2012.01)
*G06F 30/10* (2020.01)
(Continued)

(52) U.S. Cl.
CPC ........... *G06Q 30/0643* (2013.01); *A41D 1/06* (2013.01); *A41H 3/007* (2013.01); *A41H 43/00* (2013.01);
(Continued)

(58) Field of Classification Search
CPC .......... G06Q 30/0643; G06Q 30/0621; G06Q 30/0627; G06Q 30/0601–0645; G06Q 30/06–08; G06F 2111/18; H04N 9/3147
(Continued)

(56) References Cited

U.S. PATENT DOCUMENTS

| 4,539,585 A | 9/1985 | Spackova et al. |
| 5,025,537 A | 6/1991 | Green |

(Continued)

FOREIGN PATENT DOCUMENTS

| WO | WO0125824 | 4/2001 |
| WO | WO2017029487 | 2/2017 |

(Continued)

OTHER PUBLICATIONS

Ritenbaugh, Stephanie. "Digital customization: Canadian tailor threads suits with latest technology" Post-Gazette.com (Year: 2017).*

(Continued)

*Primary Examiner* — Allison G Wood
*Assistant Examiner* — Katherine A Barlow
(74) *Attorney, Agent, or Firm* — Aka Chan LLP

(57) ABSTRACT

A system allows a user to select designs for apparel and preview these designs before manufacture. The previews provide photorealistic visualizations in two or three dimensions, and can be presented on a computer display, projected on a screen, or presented in virtual reality (e.g., via headset), or augmented reality. The system can also include a projection system that projects the new designs onto garments on mannequins in a showroom. The garments and the new designs projected onto the garments have a three-dimensional appearance as if the garments having the new designs are worn by people. Software and lasers are used in finishing the garments to produce garments with the new designs and the finished garments have an appearance of the three- (Continued)

dimensional appearance of the garments and new designs on the mannequins with the new designs projected onto the garments by the projection system.

22 Claims, 43 Drawing Sheets

(51) Int. Cl.
| | |
|---|---|
| G06F 3/04815 | (2022.01) |
| B23K 26/00 | (2014.01) |
| D06C 29/00 | (2006.01) |
| A41D 1/06 | (2006.01) |
| A41H 3/00 | (2006.01) |
| A41H 43/00 | (2006.01) |
| D06C 23/02 | (2006.01) |
| G06T 19/20 | (2011.01) |
| H04N 9/31 | (2006.01) |
| G06Q 50/04 | (2012.01) |
| G06Q 50/28 | (2012.01) |
| G06F 111/18 | (2020.01) |
| G06F 3/0482 | (2013.01) |

(52) U.S. Cl.
CPC .......... *B23K 26/0006* (2013.01); *D06C 23/02* (2013.01); *D06C 29/00* (2013.01); *G06F 3/04815* (2013.01); *G06F 30/10* (2020.01); *G06Q 30/0621* (2013.01); *G06Q 30/0627* (2013.01); *G06T 19/20* (2013.01); *G06F 3/0482* (2013.01); *G06F 2111/18* (2020.01); *G06Q 30/0633* (2013.01); *G06Q 50/04* (2013.01); *G06T 2219/2004* (2013.01); *G06T 2219/2012* (2013.01); *G06T 2219/2024* (2013.01); *H04N 9/3147* (2013.01)

(58) Field of Classification Search
USPC ...................................... 705/26.1–27.2, 26.5
See application file for complete search history.

(56) References Cited

U.S. PATENT DOCUMENTS

| | | | |
|---|---|---|---|
| 5,356,437 A | 10/1994 | Pedersen et al. | |
| 5,419,952 A | 5/1995 | Brown et al. | |
| 5,514,187 A | 5/1996 | Mcfarland et al. | |
| 5,916,461 A | 6/1999 | Costin et al. | |
| 6,564,118 B1 | 5/2003 | Swab | |
| 6,587,878 B1 | 7/2003 | Merriam | |
| 6,665,577 B2 | 12/2003 | Onyshkevych et al. | |
| 6,685,868 B2 | 2/2004 | Costin | |
| 6,819,972 B1 | 11/2004 | Martin et al. | |
| 7,072,890 B2 | 7/2006 | Salerno et al. | |
| 7,308,332 B2 | 12/2007 | Okada et al. | |
| 7,617,016 B2 | 11/2009 | Wannier et al. | |
| 7,864,180 B1 | 1/2011 | Baraff et al. | |
| 7,914,428 B2 | 3/2011 | Piane, Jr. | |
| 8,174,521 B2 | 5/2012 | Harvill et al. | |
| 8,310,627 B2 | 11/2012 | Kuromizu | |
| 8,359,247 B2 | 1/2013 | Vock | |
| 8,478,663 B2 | 7/2013 | Lu et al. | |
| 9,269,157 B2 | 2/2016 | Saban et al. | |
| 9,454,581 B1 | 9/2016 | Garg et al. | |
| 9,513,788 B2 | 12/2016 | Suzuki et al. | |
| 9,530,142 B2 | 12/2016 | Minsky et al. | |
| 9,624,608 B2 | 4/2017 | Martin et al. | |
| 9,928,412 B2 | 3/2018 | Wang et al. | |
| 9,940,749 B2 | 4/2018 | Chen et al. | |
| 9,984,409 B2 | 5/2018 | Naware et al. | |
| 9,990,764 B2 | 6/2018 | Bell et al. | |
| 10,290,041 B2 | 5/2019 | Ko | |
| 10,304,227 B2 | 5/2019 | Colbert | |
| 10,311,508 B2 | 6/2019 | Reed et al. | |
| 10,380,794 B2 | 8/2019 | Hauswiesner et al. | |
| 10,430,867 B2 | 10/2019 | Mitchell et al. | |
| 10,475,099 B1 | 11/2019 | Nomula et al. | |
| 10,552,714 B2 | 2/2020 | Kiapour et al. | |
| 10,552,898 B2 | 2/2020 | Chopra et al. | |
| 10,565,634 B2 | 2/2020 | Talmor et al. | |
| 10,614,506 B2 | 4/2020 | Penner et al. | |
| 2002/0103714 A1* | 8/2002 | Eze ................... | G06Q 30/0621 705/26.5 |
| 2002/0133261 A1 | 9/2002 | Fard | |
| 2003/0009417 A1 | 1/2003 | Pappas | |
| 2005/0131571 A1 | 6/2005 | Costin | |
| 2006/0095377 A1 | 5/2006 | Young et al. | |
| 2006/0206386 A1 | 9/2006 | Walker et al. | |
| 2006/0218045 A1 | 9/2006 | Wagner | |
| 2011/0187025 A1 | 8/2011 | Costin, Sr. et al. | |
| 2011/0298897 A1 | 12/2011 | Sareen et al. | |
| 2012/0309520 A1 | 12/2012 | Evertt et al. | |
| 2013/0055136 A1 | 2/2013 | Aaron et al. | |
| 2013/0218721 A1 | 8/2013 | Borhan et al. | |
| 2014/0025462 A1 | 1/2014 | Langton | |
| 2014/0132845 A1 | 5/2014 | Okaniwa | |
| 2014/0165265 A1 | 6/2014 | Tulin et al. | |
| 2014/0176565 A1 | 6/2014 | Adeyoola et al. | |
| 2014/0277663 A1 | 9/2014 | Gupta et al. | |
| 2014/0324215 A1 | 10/2014 | Leblang | |
| 2015/0170256 A1 | 6/2015 | Pettyjohn et al. | |
| 2015/0206292 A1 | 7/2015 | Masuko et al. | |
| 2015/0248719 A1 | 9/2015 | Hansen | |
| 2015/0275423 A1 | 10/2015 | Finley | |
| 2015/0361597 A1 | 12/2015 | Candrian | |
| 2015/0371260 A1 | 12/2015 | Chan et al. | |
| 2016/0078663 A1 | 3/2016 | Sareen et al. | |
| 2016/0190447 A1 | 6/2016 | Pflumm et al. | |
| 2016/0263928 A1 | 9/2016 | Costin, Jr. et al. | |
| 2016/0275599 A1 | 9/2016 | Adeyoola et al. | |
| 2016/0292779 A1* | 10/2016 | Rose ................... | G06Q 30/0621 |
| 2016/0292966 A1 | 10/2016 | Denham | |
| 2016/0335667 A1 | 11/2016 | Aubrey | |
| 2017/0039628 A1 | 2/2017 | Wang et al. | |
| 2017/0053158 A1 | 2/2017 | Kim et al. | |
| 2017/0337612 A1 | 11/2017 | Galron et al. | |
| 2018/0047192 A1 | 2/2018 | Kristal et al. | |
| 2018/0049497 A1* | 2/2018 | Benefiel ................... | A41H 3/08 |
| 2018/0114264 A1* | 4/2018 | Rafii ................... | G06Q 30/0643 |
| 2018/0165736 A1 | 6/2018 | Love et al. | |
| 2018/0165737 A1 | 6/2018 | Love et al. | |
| 2018/0224553 A1 | 8/2018 | Kitagawa et al. | |
| 2018/0330430 A1 | 11/2018 | Sohangir | |
| 2019/0073389 A1 | 3/2019 | Agrawal et al. | |
| 2019/0256710 A1 | 8/2019 | Puvvada et al. | |
| 2019/0264361 A1 | 8/2019 | Oden et al. | |
| 2019/0272679 A1* | 9/2019 | Brodsky ................ | G06F 30/20 |
| 2019/0371080 A1 | 12/2019 | Sminchisescu et al. | |
| 2020/0065889 A1* | 2/2020 | Kline ................... | H04W 4/029 |

FOREIGN PATENT DOCUMENTS

| | | |
|---|---|---|
| WO | WO2019169052 | 6/2019 |
| WO | WO2019169054 | 9/2019 |
| WO | WO2020033605 | 2/2020 |

OTHER PUBLICATIONS

Begum, Tahmina. "Zara Has Replaced Mannequins With Augmented Reality To Try To Change The Way We Shop" HuffPost. HuffingtonPost.co.uk. (Year: 2018).*

Zhao-Heng Zheng, Hao-Tian Zhang, Fang-Lue Zhang, and Tai-Jiang Mu, Image-based Clothes Changing System, Computational Visual Media, DOI 10.1007/s41095-017-0084-6, Research Article, Dec. 2017, pp. 337-347, vol. 3, No. 4.

Video (screenshots/captures): "Lightelier," uploaded on Oct. 1, 2013 by user Jose Carlos Rodriguez, 12 pages, URL: https://www.youtube.com/watch?v=FkyVvFx9X6Y.

Video (screenshots/captures): "e-Mark 3.0," uploaded on Apr. 7, 2016 by user Jeanologia, 24 pages, URL: https://www.youtube.com/watch?v=2y26Oqu5fiA&feature=youtu.be.

(56) References Cited

OTHER PUBLICATIONS

Technical Document: "GFK Laser System," Easy Mark 2012, Software Manual, Jeanologia, S.L., 2012, 41 pages.
Sushil Chaurasia, Augmented Reality in Retail: A Revolutionary Next Generation Technology, Fibre2Fashion.com, Mar. 31, 2013, online, URL: https://www.fibre2fashion.com/industry-article/6823/augmented-reality-in-retail-a-revolutionary-next-generation-technology.
International Search Report, PCT Application PCT/US2020/048838, dated Nov. 30, 2020, 9 pages.
Golden Laser, Jeans Laser Engraving Machine, Dec. 22, 2016, Golden Laser (Year: 2016).

\* cited by examiner

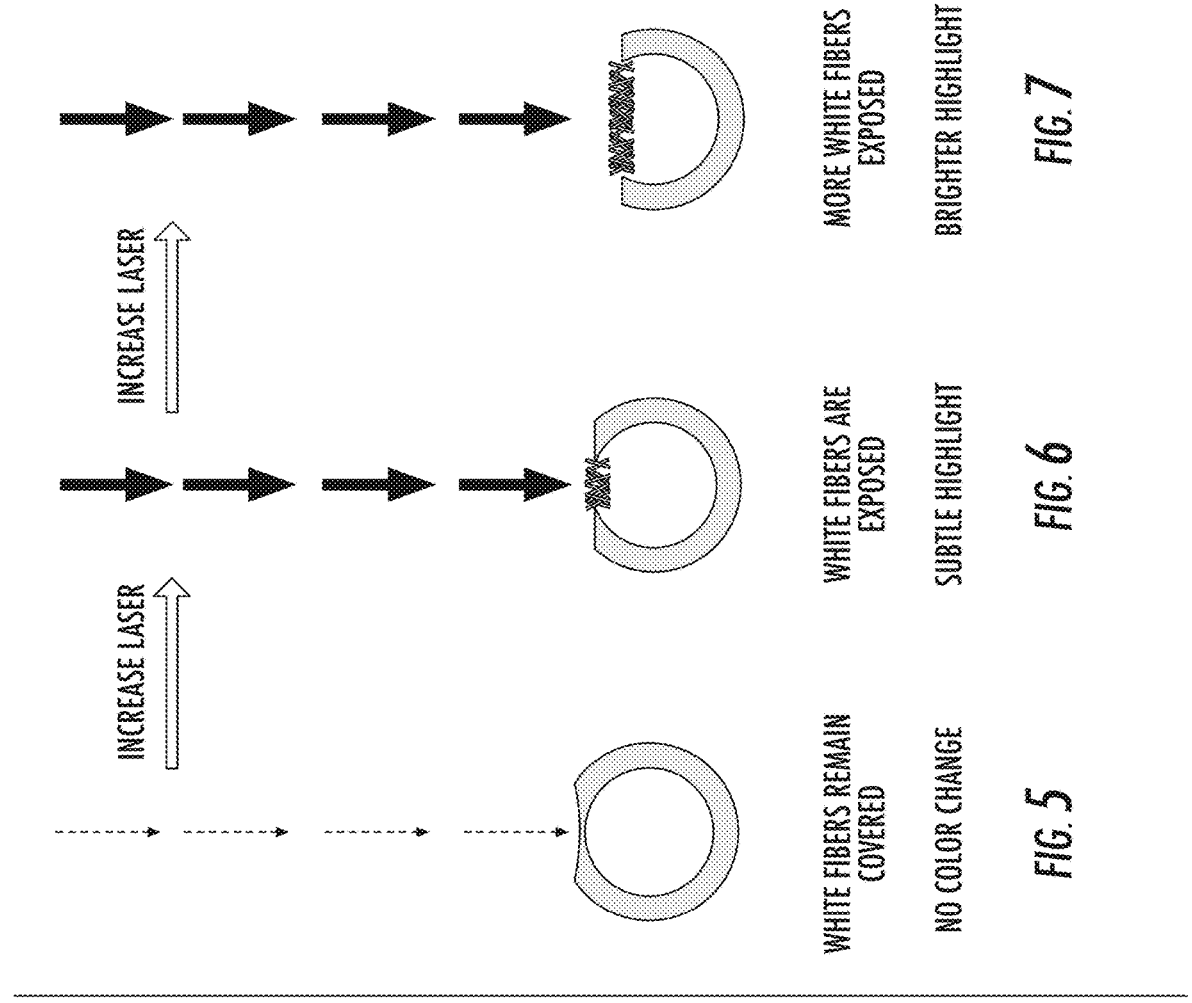
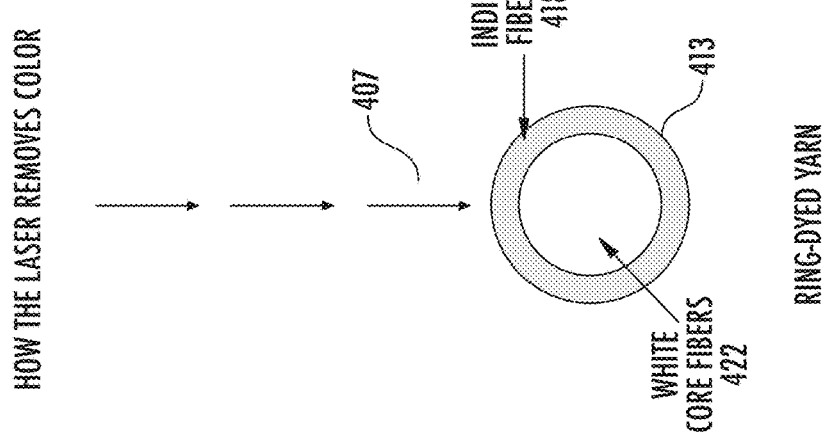

$$\text{ROTATION Z} \begin{pmatrix} \cos\theta & \sin\theta & 0 \\ -\sin\theta & \cos\theta & 0 \\ 0 & 0 & 1 \end{pmatrix} \quad \text{ROTATION Y} \begin{pmatrix} \cos\beta & 0 & \sin\beta \\ 0 & 1 & 0 \\ -\sin\beta & 0 & \cos\beta \end{pmatrix} \quad \text{ROTATION X} \begin{pmatrix} 1 & 0 & 0 \\ 0 & \cos\alpha & \sin\alpha \\ 0 & -\sin\alpha & \cos\alpha \end{pmatrix}$$

$$\text{SCALE IN 3D} \begin{bmatrix} S_x & 0 & 0 & 0 \\ 0 & S_y & 0 & 0 \\ 0 & 0 & S_z & 0 \\ 0 & 0 & 0 & 1 \end{bmatrix} \quad \text{TRANSLATION IN 3D} \begin{bmatrix} 1 & 0 & 0 & T_x \\ 0 & 1 & 0 & T_y \\ 0 & 0 & 1 & T_z \\ 0 & 0 & 0 & 1 \end{bmatrix}$$

$$\begin{bmatrix} X \\ Y \\ Z \end{bmatrix} \begin{bmatrix} \text{ROTATION Z} \end{bmatrix} = \text{NEW } X, Y, Z \text{ ROTATED BY } \theta \text{ ABOUT } Z$$

FIG. 28

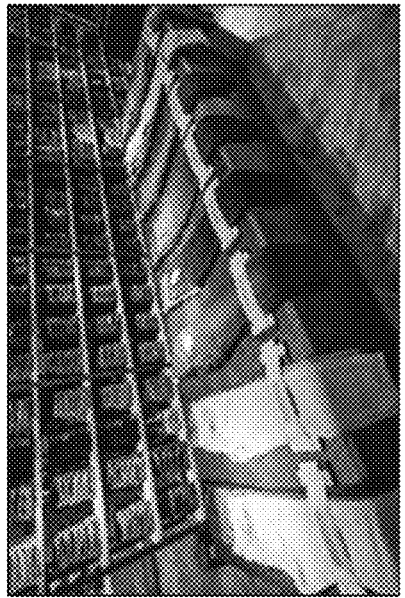
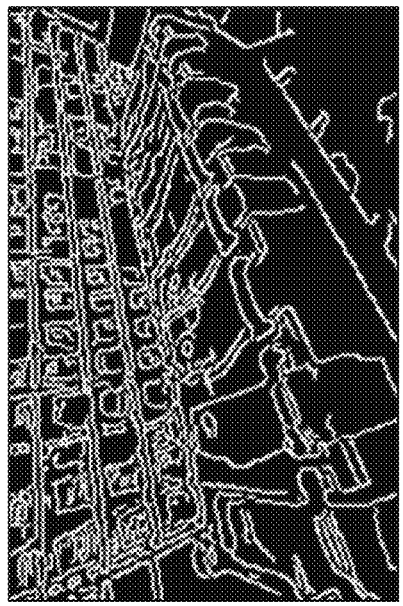
FIG. 44

SYSTEMS FOR A DIGITAL SHOWROOM WITH VIRTUAL REALITY AND AUGMENTED REALITY

CROSS-REFERENCE TO RELATED APPLICATIONS

This application claim the benefit of U.S. application 62/893,767, filed Aug. 29, 2019, which is incorporated by reference along with all other references cited in this application.

BACKGROUND OF THE INVENTION

The present invention relates to apparel finishing and, more specifically, the use of a laser in the finishing of garments, especially denim including jeans, shirts, shorts, jackets, vests, and skirts, to obtain a faded, distressed, washed, or worn finish or appearance.

In 1853, during the California Gold Rush, Levi Strauss, a 24-year-old German immigrant, left New York for San Francisco with a small supply of dry goods with the intention of opening a branch of his brother's New York dry goods business. Shortly after arriving in San Francisco, Mr. Strauss realized that the miners and prospectors (called the "forty niners") needed pants strong enough to last through the hard work conditions they endured. So, Mr. Strauss developed the now familiar jeans which he sold to the miners. The company he founded, Levi Strauss & Co., still sells jeans and is the most widely known jeans brand in the world. Levi's is a trademark of Levi Strauss & Co. or LS&Co.

Though jeans at the time of the Gold Rush were used as work clothes, jeans have evolved to be fashionably worn every day by men and women, showing up on billboards, television commercials, and fashion runways. Fashion is one of the largest consumer industries in the U.S. and around the world. Jeans and related apparel are a significant segment of the industry.

As fashion, people are concerned with the appearance of their jeans. Many people desire a faded or worn blue jeans look. In the past, jeans became faded or distressed through normal wash and wear. The apparel industry recognized people's desire for the worn blue jeans look and began producing jeans and apparel with a variety of wear patterns. The wear patterns have become part of the jeans style and fashion. Some examples of wear patterns include combs or honeycombs, whiskers, stacks, and train tracks.

Despite the widespread success jeans have enjoyed, the process to produce modern jeans with wear patterns takes processing time, has relatively high processing cost, and is resource intensive. A typical process to produce jeans uses significant amounts of water, chemicals (e.g., bleaching or oxidizing agents), ozone, enzymes, and pumice stone. For example, it may take about twenty to sixty liters of water to finish each pair of jeans.

Therefore, there is a need for an improved process for finishing jeans that reduces environmental impact, processing time, and processing costs, while maintaining the look and style of traditional finishing techniques. There is a need for tools to create and preview patterns on jeans before laser finishing, especially photorealistic previews.

BRIEF SUMMARY OF THE INVENTION

A system allows a user to select designs for apparel and preview these designs before manufacture. The previews provide photorealistic visualizations in two or three dimensions, and can be presented on a computer display, projected on a screen, or presented in virtual reality (e.g., via headset), or augmented reality. The system can also include a projection system that projects the new designs onto garments on mannequins in a showroom. The garments and the new designs projected onto the garments have a three-dimensional appearance as if the garments having the new designs are worn by people. Software and lasers are used in finishing the garments to produce garments with the new designs and the finished garments have an appearance of the three-dimensional appearance of the garments and new designs on the mannequins with the new designs projected onto the garments by the projection system.

A tool allows a user to create new designs for apparel and preview these designs before manufacture. Software and lasers are used in finishing apparel to produce a desired wear pattern or other design. Based on a laser input file with a pattern, a laser will burn the pattern onto apparel. With the tool, the user will be able to create, make changes, and view images of a design, in real time, before burning by a laser. Input to the tool includes fabric template images, laser input files, and damage input. The tool allows adding of tinting and adjusting of intensity and bright point. The user can also move, rotate, scale, and warp the image input.

In an implementation, a system includes a projection system that projects the new designs onto garments on mannequins or human models in a showroom. The system also provides for display of the new designs on display screen, electronic displays, or on virtual reality headsets in the showroom. The garments and the new designs projected onto the garments, human models, and other display formats have a three-dimensional appearance as if the garments having the new designs are worn by people or displayed in a retail setting. Software and lasers are used in finishing the garments to produce garments with the new designs and the finished garments have an appearance of the three-dimensional appearance of the garments and new designs on the mannequins or human models with the new designs projected onto the garments by the projection system or displayed in the other display formats.

The display of the new designs projected onto garments on mannequins or human models allows manufacturers, designers, and customers to have realistic previews of garments that can be customized with finishing patterns without actually having to manufacture the garments with the finishing patterns. Large numbers of example garments have typically been manufactured for fashion shows and sales that occur at different geographic locations where a unique set of garments is provide to each location for preview. The cost of such manufacturing is relatively large. Providing for display of garments in three-dimensional view on computer displays, on mannequins, human models, display screen, electronic displays, and in virtual reality headsets allows for large cost savings from not manufacture sets of garments for fashion shows and sales meetings while still providing excellent three-dimensional preview of garments.

In the digital showroom, the system shows previews of garments to the buyer or consumer that will be photorealistic visualizations, two-dimensional or three-dimensional visual representations of the garments. Then buyer or consumer will be able to select one or more products to order without seeing actual swatches or samples of each item. With the photorealistic previews, this can help reduce or eliminate entirely the need for the apparel manufacturer to produce swatches and samples for the sales process.

The preview image can be a two- or three-dimensional preview image, which will be a photorealistic visualization in two dimensions or three dimensions. For example, a three-dimensional photorealistic visualization can include displaying on a computer screen (e.g., desktop computer, laptop computer, tablet, smartphone, or others) or in a window a three-dimensional rendering of a customized garment design (before manufacture) as that garment would appear after a postlaser wash and in the retail or sale environment. The preview image can also be presented in virtual reality (VR) or augmented reality (AR).

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 4-7 show how the laser alters the color of ring-dyed yarn.

FIG. 28 shows a technique of shape projection.

FIG. 44 shows an image texture and color swap approach for digitally displaying a collection of garments in a digital image of a store or retail environment.

DETAILED DESCRIPTION OF THE INVENTION

Figure 1:
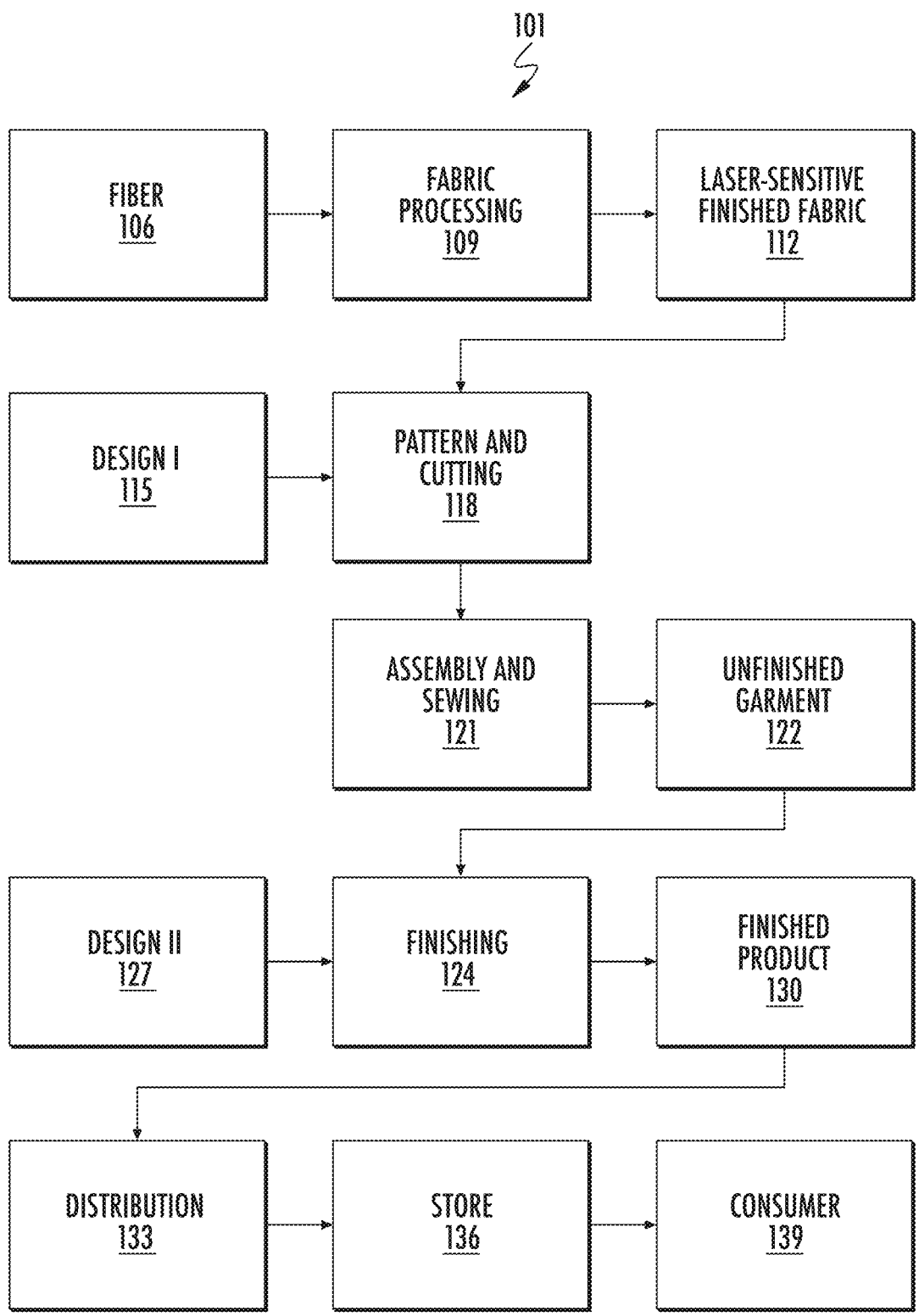
FIG. 1 shows a block diagram of a system for creating, designing, producing apparel products with laser finishing.

FIG. 1 shows a process flow 101 for manufacturing apparel such as jeans, where garments are finished using a laser. The fabric or material for various apparel including jeans is made from natural or synthetic fibers 106, or a combination of these. A fabric mill takes fibers and processes 109 these fibers to produce a laser-sensitive finished fabric 112, which has enhanced response characteristics for laser finishing.

Some examples of natural fibers include cotton, flax, hemp, sisal, jute, kenaf, and coconut; fibers from animal sources include silk, wool, cashmere, and mohair. Some examples of synthetic fibers include polyester, nylon, spandex or elastane, and other polymers. Some examples of semisynthetic fibers include rayon, viscose, modal, and lyocell, which are made from a regenerated cellulose fiber. A fabric can be a natural fiber alone (e.g., cotton), a synthetic fiber alone (e.g., polyester alone), a blend of natural and synthetic fibers (e.g., cotton and polyester blend, or cotton and spandex), or a blend of natural and semisynthetic fibers, or any combination of these or other fibers.

For jeans, the fabric is typically a denim fabric, which is a sturdy cotton warp-faced textile in which a weft passes under two or more warp threads. This twill weaving produces a diagonal ribbing. The yarns (e.g., warp yarns) are dyed using an indigo or blue dye, which is characteristic of blue jeans.

Although this patent describes the apparel processing and finishing with respect to jeans, the invention is not limited jeans or denim products, such as shirts, shorts, jackets, vests, and skirts. The techniques and approaches described are applicable to other apparel and products, including nondenim products and products made from knit materials. Some examples include T-shirts, sweaters, coats, sweatshirts (e.g., hoodies), casual wear, athletic wear, outerwear, dresses, evening wear, sleepwear, loungewear, underwear, socks, bags, backpacks, uniforms, umbrellas, swimwear, bed sheets, scarves, and many others.

A manufacturer creates a design 115 (design I) of its product. The design can be for a particular type of clothing or garment (e.g., men's or women's jeans, or jacket), sizing of the garment (e.g., small, medium, or large, or waist size and inseam length), or other design feature. The design can be specified by a pattern or cut used to form pieces of the pattern. A fabric is selected and patterned and cut 118 based on the design. The pattern pieces are assembled together 121 into the garment, typically by sewing, but can be joined together using other techniques (e.g., rivets, buttons, zipper, hoop and loop, adhesives, or other techniques and structures to join fabrics and materials together).

Some garments can be complete after assembly and ready for sale. However, other garments are unfinished 122 and have additional finishing 124, which includes laser finishing. The finishing may include tinting, washing, softening, and fixing. For distressed denim products, the finishing can include using a laser to produce a wear pattern according to a design 127 (design II). Some additional details of laser finishing are described in U.S. patent application 62/377,447, filed Aug. 19, 2016, and Ser. No. 15/682,507, filed Aug. 21, 2017, issued as U.S. Pat. No. 10,051,905 on Aug. 21, 2018, which are incorporated by reference along with all other references cited in this application. U.S. patent applications 62/636,108, filed Feb. 27, 2018, and 62/715,788, filed Aug. 7, 2018, describe some specific implementations of a brief builder application and are incorporated by reference.

U.S. patent application Ser. Nos. 16/288,035, 16/288,036, 16/288,038, 16/288,042, 16/288,046, 16/288,048, 16/288,050, 16/288,053, and 16/288,054, filed Feb. 27, 2019, are incorporated by reference. Further, the following patent applications are incorporated by reference: U.S. patent application Ser. Nos. 16/288,047, 16/288,048, 16/288,050, 16/288,053, and 16/288,095, filed Feb. 27, 2019; 62/636,107, 62/636,108, and 62/636,112, filed Feb. 27, 2018; Ser. Nos. 15/841,263 and 15/841,268, filed Dec. 13, 2017; 62/579,863 and 62/579,867, filed Oct. 31, 2017; and Ser. No. 15/682,507, filed Aug. 21, 2017.

Design 127 is for postassembly aspects of a garment while design 115 is for preassembly aspects of a garment. After finishing, a finished product 130 (e.g., a pair of jeans) is complete and ready for sale. The finished product is inventoried and distributed 133, delivered to stores 136, and sold to consumers or customers 139. The consumer can buy and wear worn blue jeans without having to wear out the jeans themselves, which usually takes significant time and effort.

Traditionally, to produce distressed denim products, finishing techniques include dry abrasion, wet processing, oxidation, or other techniques, or combinations of these, to accelerate wear of the material in order to produce a desired wear pattern. Dry abrasion can include sandblasting or using sandpaper. For example, some portions or localized areas of the fabric are sanded to abrade the fabric surface. Wet processing can include washing in water, washing with oxidizers (e.g., bleach, peroxide, ozone, or potassium permanganate), spraying with oxidizers, washing with abrasives (e.g., pumice, stone, or grit).

These traditional finishing approaches take time, incur expenses, and impact the environment by utilizing resources and producing waste. It is desirable to reduce water and chemical usage, which can include eliminating the use agents such as potassium permanganate and pumice. An alternative to these traditional finishing approaches is laser finishing.

Figure 2:
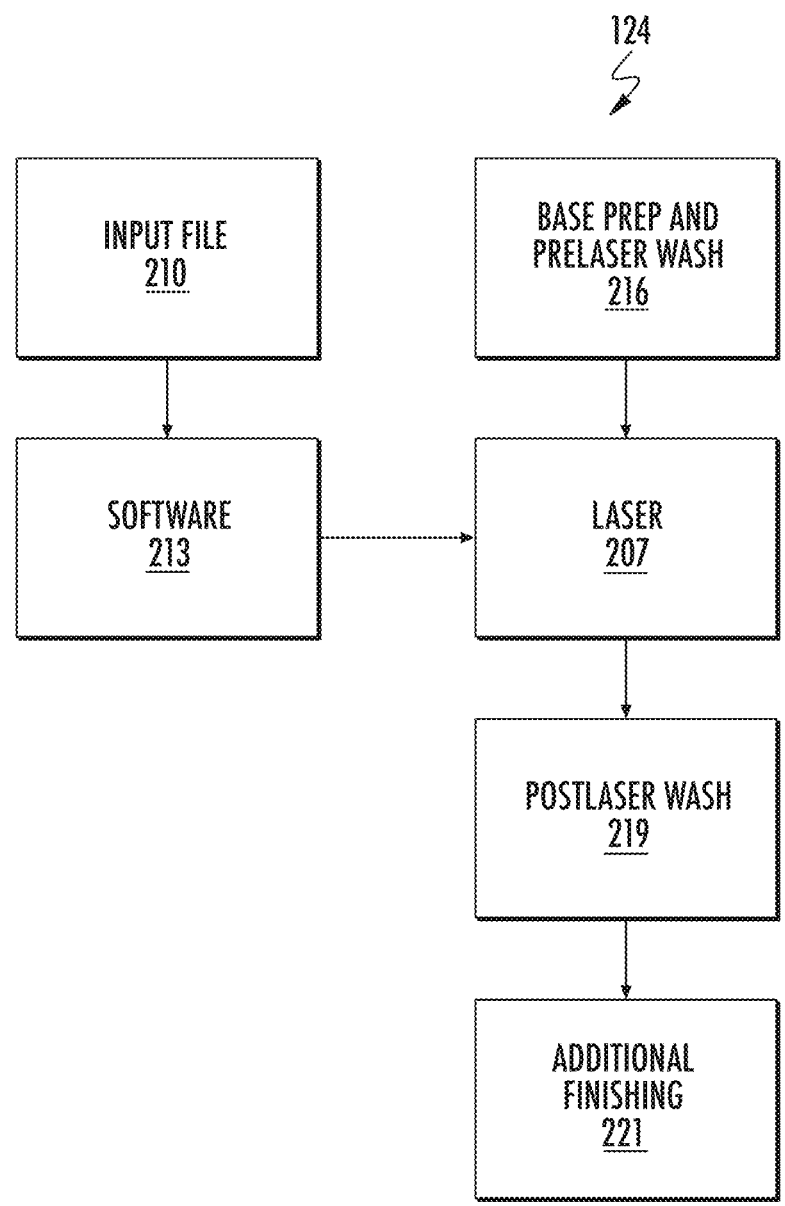
FIG. 2 shows a flow for a finishing technique that includes the use of a laser.

FIG. 2 shows a finishing technique that includes the use of a laser 207. A laser is a device that emits light through a process of optical amplification based on the stimulated emission of electromagnetic radiation. Lasers are used for bar code scanning, medical procedures such as corrective eye surgery, and industrial applications such as welding. A particular type of laser for finishing apparel is a carbon dioxide laser, which emits a beam of infrared radiation.

The laser is controlled by an input file 210 and control software 213 to emit a laser beam onto fabric at a particular position or location at a specific power level for a specific amount of time. Further, the power of the laser beam can be varied according to a waveform such as a pulse wave with a particular frequency, period, pulse width, or another characteristic. Some aspects of the laser that can be controlled include the duty cycle, frequency, marking or burning speed, and other parameters.

The duty cycle is a percentage of laser emission time. Some examples of duty cycle percentages include 40, 45, 50, 55, 60, 80, and 100 percent. The frequency is the laser pulse frequency. A low frequency might be, for example, 5 kilohertz, while a high frequency might be, for example, 25 kilohertz. Generally, lower frequencies will have higher surface penetration than high frequencies, which has less surface penetration.

The laser acts like a printer and "prints," "marks," or "burns" a wear pattern (specified by input file 210) onto the garment. The fabric that is exposed to the laser beam (e.g., infrared beam) changes color, lightening the fabric at a specified position by a certain amount based on the laser power, time of exposure, and waveform used. The laser continues from position to position until the wear pattern is completely printed on the garment.

In a specific implementation, the laser has a resolution of about 34 dots per inch (dpi), which on the garment is about 0.7 millimeters per pixel. The technique described in this patent is not dependent on the laser's resolution, and will work with lasers have more or less resolution than 34 dots per inch. For example, the laser can have a resolution of 10, 15, 20, 25, 30, 40, 50, 60, 72, 80, 96, 100, 120, 150, 200, 300, or 600 dots per inch, or more or less than any of these or other values. Typically, the greater the resolution, the finer the features that can be printed on the garment in a single pass. By using multiple passes (e.g., 2, 3, 4, 5, or more passes) with the laser, the effective resolution can be increased. In an implementation, multiple laser passes are used.

Jeans are dyed using an indigo dye, which results in a blue-colored fabric. The blue color is caused by chromophores trapped in the fabric which reflect light as a blue color. U.S. patent application 62/433,739, filed Dec. 13, 2016, which is incorporated by reference, describes a denim material with enhanced response characteristics to laser finishing. Using a denim material made from indigo ring-dyed yarn, variations in highs and lows in indigo color shading is achieved by using a laser.

Figure 3:
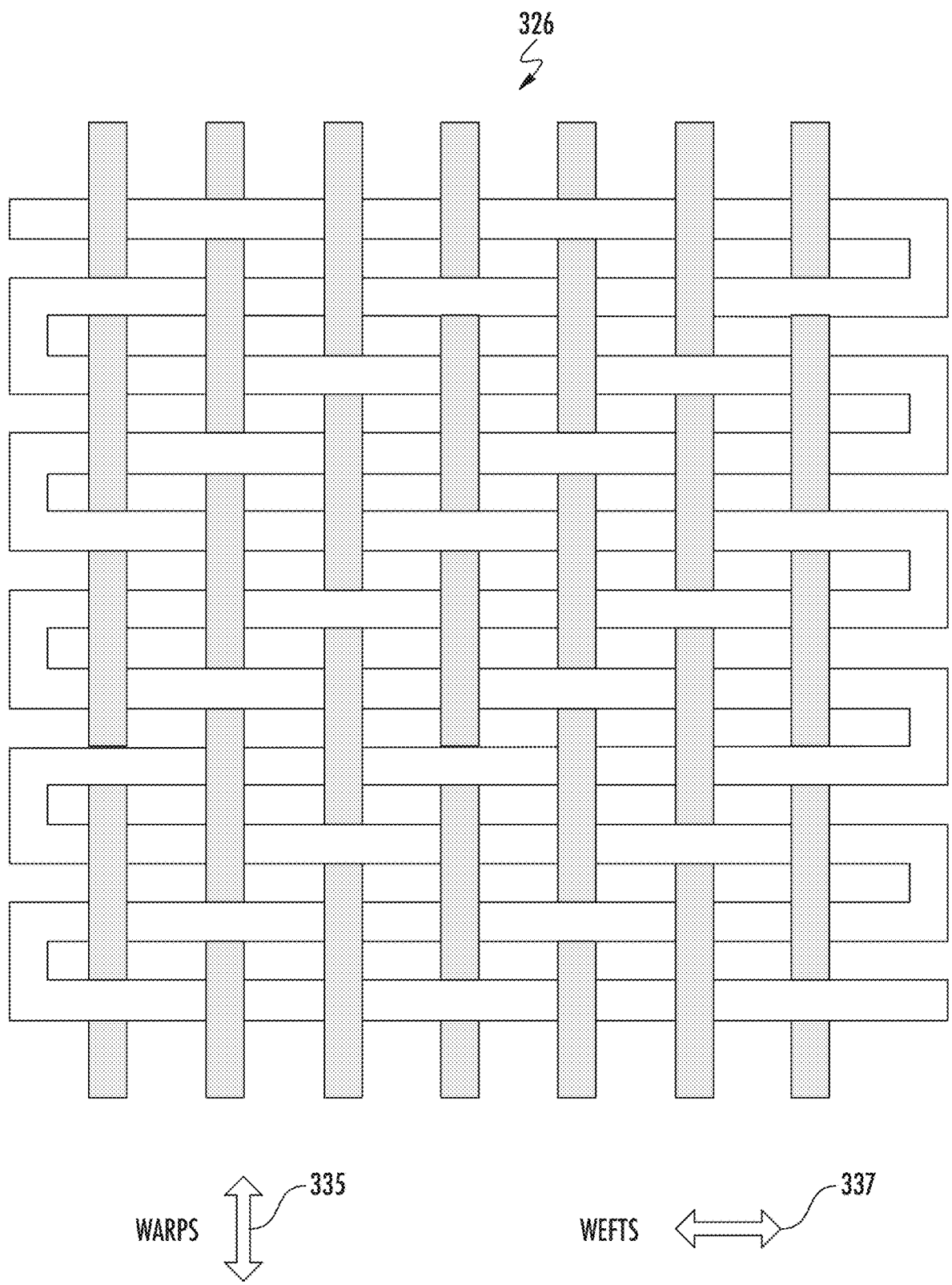
FIG. 3 shows a weave pattern for a denim fabric.

FIG. 3 shows a weave pattern of a denim fabric 326. A loom does the weaving. In weaving, warp is the lengthwise or longitudinal yarn or thread in a roll, while weft or woof is the transverse thread. The weft yarn is drawn through the warp yarns to create the fabric. In FIG. 3, the warps extend in a first direction 335 (e.g., north and south) while the wefts extend in a direction 337 (e.g., east and west). The wefts are shown as a continuous yarn that zigzags across the wefts (e.g., carried across by a shuttle or a rapier of the loom). Alternatively, the wefts could be separate yarns. In some specific implementations, the warp yarn has a different weight or thickness than the weft yarns. For example, warp yarns can be coarser than the weft yarns.

For denim, dyed yarn is used for the warp, and undyed or white yarn is typically used for the weft yarn. In some denim fabrics, the weft yarn can be dyed and have a color other than white, such as red. In the denim weave, the weft passes under two or more warp threads. FIG. 3 shows a weave with the weft passing under two warp threads. Specifically, the fabric weave is known as a 2×1 right-hand twill. For a right-hand twill, a direction of the diagonal is from a lower left to an upper right. For a left-hand twill, a direction of the diagonal is from a lower right to an upper left. But in other denim weaves, the weft can pass under a different number of warp threads, such as 3, 4, 5, 6, 7, 8, or more. In other implementation, the denim is a 3×1 right-hand twill, which means the weft passes under three warp threads.

Because of the weave, one side of the fabric exposes more of the warp yarns (e.g., warp-faced side), while the other side exposes more of the weft yarns (e.g., weft-faced side). When the warp yarns are blue and weft yarns are white, a result of the weave is the warp-faced side will appear mostly blue while the reverse side, weft-faced side, will appear mostly white.

In denim, the warp is typically 100 percent cotton. But some warp yarns can be a blend with, for example, elastane to allow for warp stretch. And some yarns for other fabrics may contain other fibers, such as polyester or elastane as examples.

In an indigo ring-dyed yarn, the indigo does not fully penetrate to a core of the yarn. Rather, the indigo dye is applied at a surface of the cotton yarn and diffuses toward the interior of the yarn. So when the yarn is viewed cross-sectionally, the indigo-dyed material will appear as a ring on around an outer edge of the yarn. The shading of the indigo dye will generally lighten in a gradient as a distance increases from the surface of the yarn to the center (or core) of the yarn.

During laser finishing, the laser removes a selected amount of the surface of the indigo-dyed yarn (e.g., blue color) to reveal a lighter color (e.g., white color) of the inner core of the ring-dyed yarn. The more of the indigo dyed material that is removed, the lighter the color (e.g., a lighter shade of blue). The more of the indigo dyed material that remains, the darker the color (e.g., deeper shade of blue). The laser can be controlled precisely to remove a desired amount of material to achieve a desired shade of blue in a desired place or position on the material.

With laser finishing, a finish can be applied (e.g., printed or burned via the laser) onto apparel (e.g., jeans and denim garments) that will appear similar to or indistinguishable from a finish obtained using traditional processing techniques (e.g., dry abrasion, wet processing, and oxidation). Laser finishing of apparel is less costly and is faster than traditional finishing techniques and also has reduced environmental impact (e.g., eliminating the use of harsh chemical agents and reducing waste).

FIGS. 4-7 show how the laser alters the color of ring-dyed yarn. FIG. 4 shows a laser beam 407 striking a ring-dyed yarn 413 having indigo-dyed fibers 418 and white core fibers 422. The laser removes the dyed fibers, which can be by vaporizing or otherwise destroying the cotton fiber via heat or high temperature that the laser beam causes.

FIG. 5 shows the laser using a first power level setting or first exposure time setting, or a combination of these, to remove some of the dyed fibers, but not revealing any of the white core fibers. The undyed fibers remain covered. There is no color change.

FIG. 6 shows the laser using a second power level setting or second exposure time setting, or a combination of these, to remove more of the dyed fibers than in FIG. 5. The second power level is greater than the first power level, or the second exposure time setting is greater than the first exposure time setting, or a combination of these. The result is some of the undyed fibers are revealed. There is a color change, subtle highlighting.

FIG. 7 shows the laser using a third power level setting or third exposure time setting, or a combination of these, to remove even more of the dyed fibers than in FIG. 6. The third power level is greater than the second power level, or the third exposure time setting is greater than the second exposure time setting, or a combination of these. The result is more of the undyed fibers are revealed. There is a color change, brighter highlighting.

As shown in FIG. 2, before laser 207, the fabric can be prepared 216 for the laser, which may be referred to as a base preparation, and can include a prelaser wash. This step helps improves the results of the laser. After the laser, there can be a postlaser wash 219. This wash can clean or remove any residue caused by the laser, such as removing any charring (which would appear as brown or slightly burning). There can be additional finish 221, which may be including tinting, softening, or fixing, to complete finishing.

Figure 8:
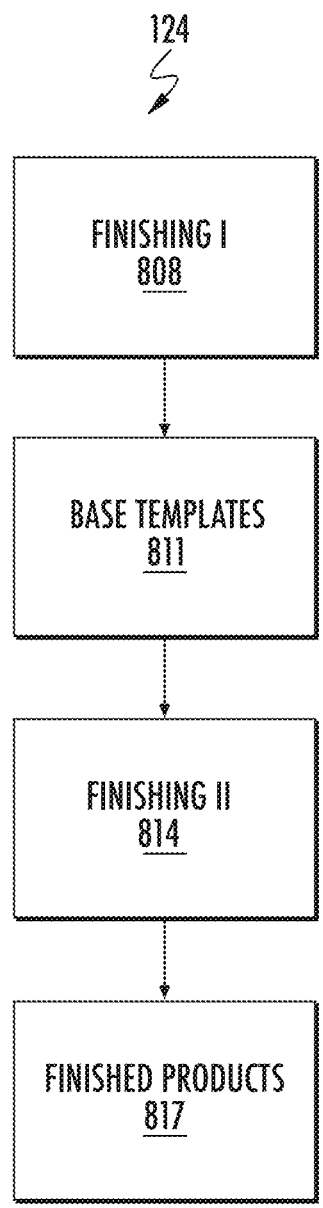
FIG. 8 shows a flow for finishing in two finishing steps and using base templates.

FIG. 8 shows a technique where finishing 124 is divided into two finishing steps, finishing I and finishing II. Finishing I 808 is an initial finishing to create base templates 811. With finishing II 814, each base template can be used to manufacture multiple final finishes 817.

Figure 9:
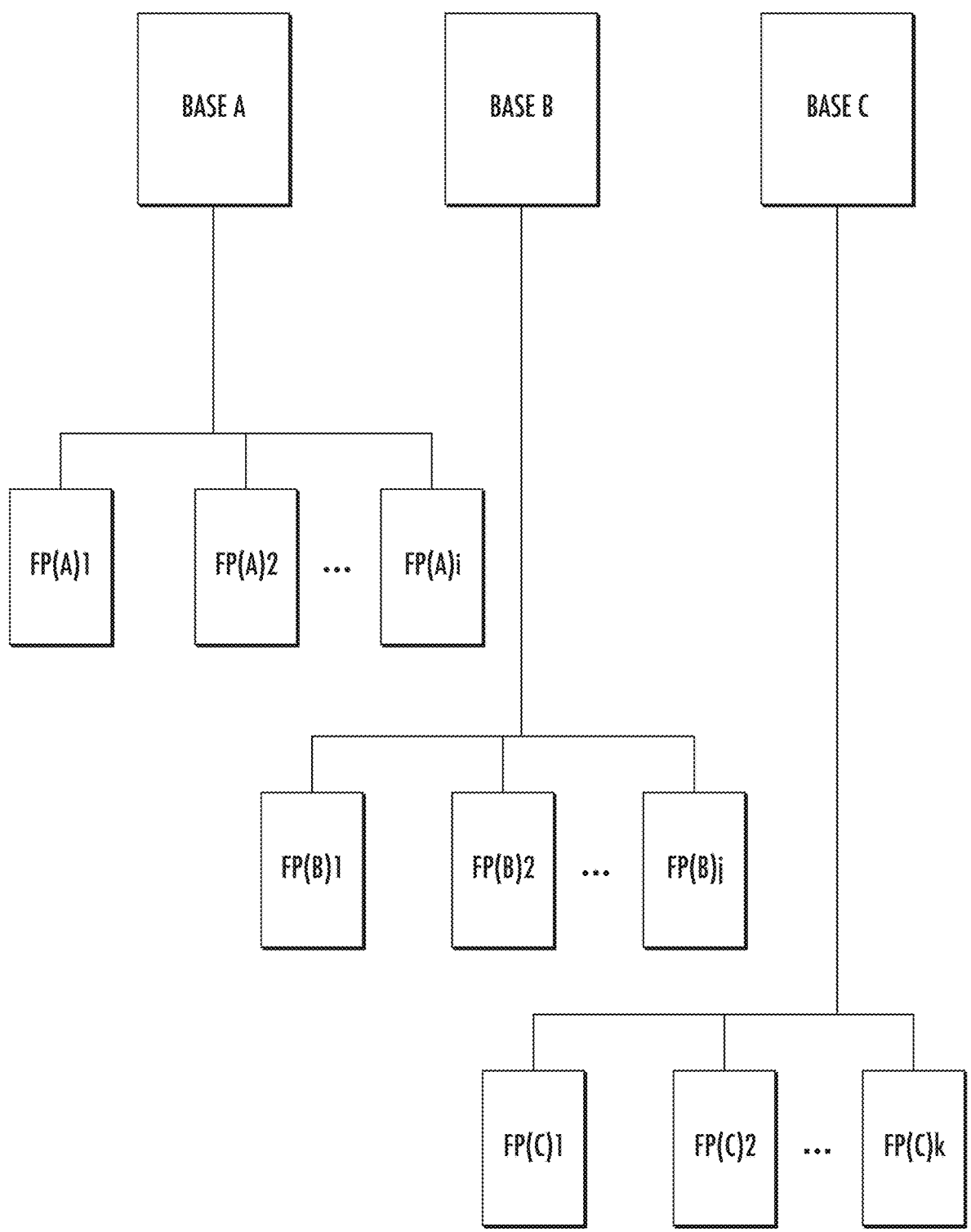
FIG. 9 shows multiple base templates and multiple resulting finished products from each of these templates.

FIG. 9 shows multiple base templates, base A, base B, and base C. These base templates may be referred to as base fit fabrics or BFFs. In an implementation, the base templates can be created during base prep and prelaser wash 216 (see FIG. 2). During finishing I, by using different wash 216 methods or recipes, each different base template can be created.

Finishing II can include laser finishing. Base A is lasered with different designs to obtain various final product based on base A (e.g., FP(A)1 to FP(A)i, where i is an integer). Base B is lasered with different designs to obtain various final products based on base B (e.g., FP(B)1 to FP(B)j, where j is an integer). Base C is lasered with different designs to obtain various final products based on base C (e.g., FP(C)1 to FP(C)k, where k is an integer). Each base can be used to obtain a number of different final designs. For example, the integers i, j, and k can have different values.

As described above and shown in FIG. 2, after finishing II, there can be additional finishing during postlaser wash 219 and additional finishing 221. For example, during the postlaser wash, there may be additional tinting to the lasered garments. This tinting can result in an overall color cast to change the look of the garment.

In an implementation, laser finishing is used to create many different finishes (each a different product) easily and quickly from the same fabric template or BFF or "blank." For each fabric, there will be a number of base fit fabrics. These base fit fabrics are lasered to produce many different finishes, each being a different product for a product line. Laser finishing allows greater efficiency because by using fabric templates (or base fit fabrics), a single fabric or material can be used to create many different products for a product line, more than is possible with traditional processing. This reduces the inventory of different fabrics and finishes raw materials.

For a particular product (e.g., 511 product), there can be two different fabrics, such as base B and base C of FIG. 9. The fabrics can be part of a fabric tool kit. For base B, there are multiple base fit fabrics, FP(B)1, FP(B)2, and so forth. Using laser finishing, a base fit fabric (e.g., FP(B)1) can be used to produce any number of different finishes (e.g., eight different finishes), each of which would be considered a different product model.

For example, FP(B)1 can be laser finished using different laser files (e.g., laser file 1, laser file 2, laser file 3, or others) or have different postlaser wash (e.g., postlaser wash recipe 1, postlaser wash recipe 2, postlaser wash recipe 3, or others), or any combination of these. A first product would be base fit fabric FP(B)1 lasered using laser file 1 and washed using postlaser wash recipe 1. A second product would be base fit fabric FP(B)1 lasered using laser file 2 and washed using postlaser wash recipe 1. A third product would be base fit fabric FP(B)1 lasered using laser file 2 and washed using postlaser wash recipe 2. And there can be many more products based on the same base fit fabric. Each can have a different product identifier or unique identifier, such as a different PC9 or nine-digit product code.

With laser finishing, many products or PC9's are produced for each base fit fabric or blank. Compared to traditional processing, this is a significant improvement in providing greater numbers of different products with fewer different fabrics and finishes (each of which in traditional processing consumes resources, increases costs, and takes time). Inventory is reduced. The technique of providing base fit finishes or fabric templates for laser finishing has significant and many benefits.

Figure 10:
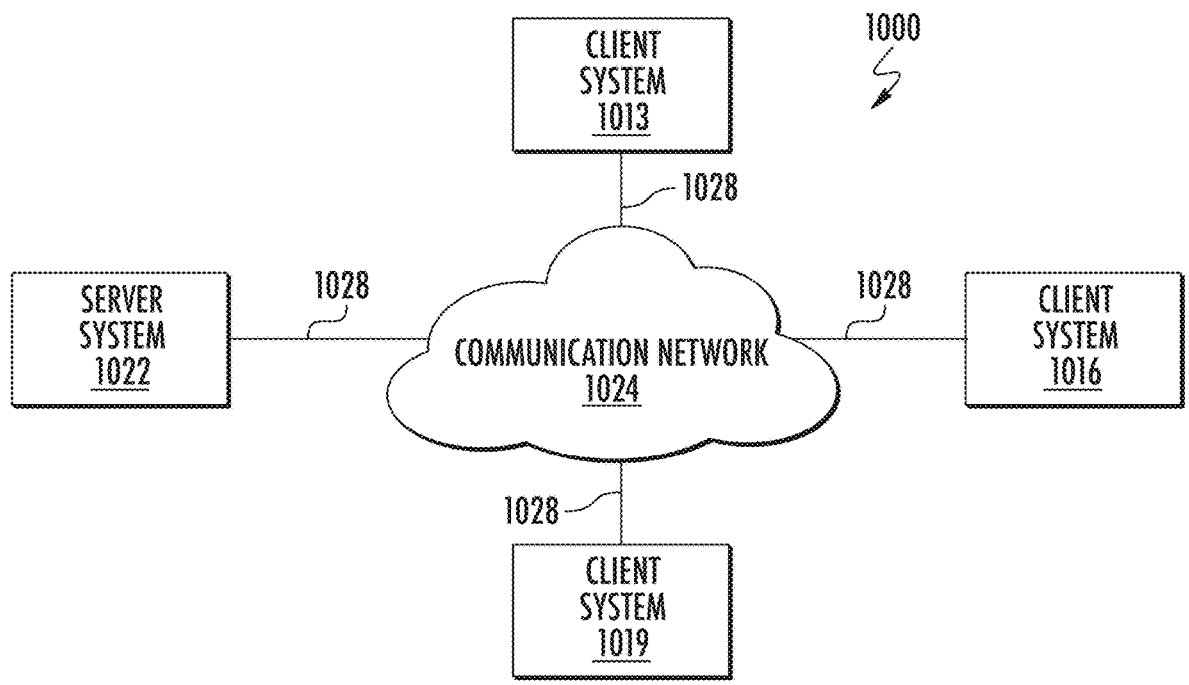
FIG. 10 shows a distributed computer network.

A system incorporating laser finishing can include a computer to control or monitor operation, or both. FIG. 10 shows an example of a computer that is a component of a laser finishing system. The computer may be a separate unit that is connected to a system, or may be embedded in electronics of the system. In an embodiment, the invention includes software that executes on a computer workstation system or server, such as shown in FIG. 10.

FIG. 10 is a simplified block diagram of a distributed computer network 1000 incorporating an embodiment of the present invention. Computer network 1000 includes a number of client systems 1013, 1016, and 1019, and a server system 1022 coupled to a communication network 1024 via a plurality of communication links 1028. Communication network 1024 provides a mechanism for allowing the various components of distributed network 1000 to communicate and exchange information with each other.

Communication network 1024 may itself be comprised of many interconnected computer systems and communication links. Communication links 1028 may be hardwire links, optical links, satellite or other wireless communications links, wave propagation links, or any other mechanisms for communication of information. Communication links 1028 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 10. These communication protocols may include VLAN, MPLS, TCP/IP, Tunneling, HTTP protocols, wireless application protocol (WAP), vendor-specific protocols, customized protocols, and others. While in one embodiment, communication network 1024 is the Internet, in other embodiments, communication network 1024 may be any suitable communication network including a local area network (LAN), a wide area network (WAN), a wireless network, an intranet, a private network, a public network, a switched network, and combinations of these, and the like.

Distributed computer network 1000 in FIG. 10 is merely illustrative of an embodiment incorporating the present invention and does not limit the scope of the invention as recited in the claims. One of ordinary skill in the art would recognize other variations, modifications, and alternatives. For example, more than one server system 1022 may be connected to communication network 1024. As another example, a number of client systems 1013, 1016, and 1019 may be coupled to communication network 1024 via an access provider (not shown) or via some other server system.

Client systems 1013, 1016, and 1019 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 1022 is responsible for receiving information requests from client systems 1013, 1016, and 1019, performing processing required to satisfy the requests, and for forwarding the results corresponding to the requests back to the requesting client system. The processing required to satisfy the request may be performed by server system 1022 or may alternatively be delegated to other servers connected to communication network 1024.

Client systems 1013, 1016, and 1019 enable users to access and query information stored by server system 1022. In a specific embodiment, the client systems can run as a standalone application such as a desktop application or mobile smartphone or tablet application. In another embodiment, a "Web browser" application executing on a client system enables users to select, access, retrieve, or query information stored by server system 1022. Examples of Web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 11:
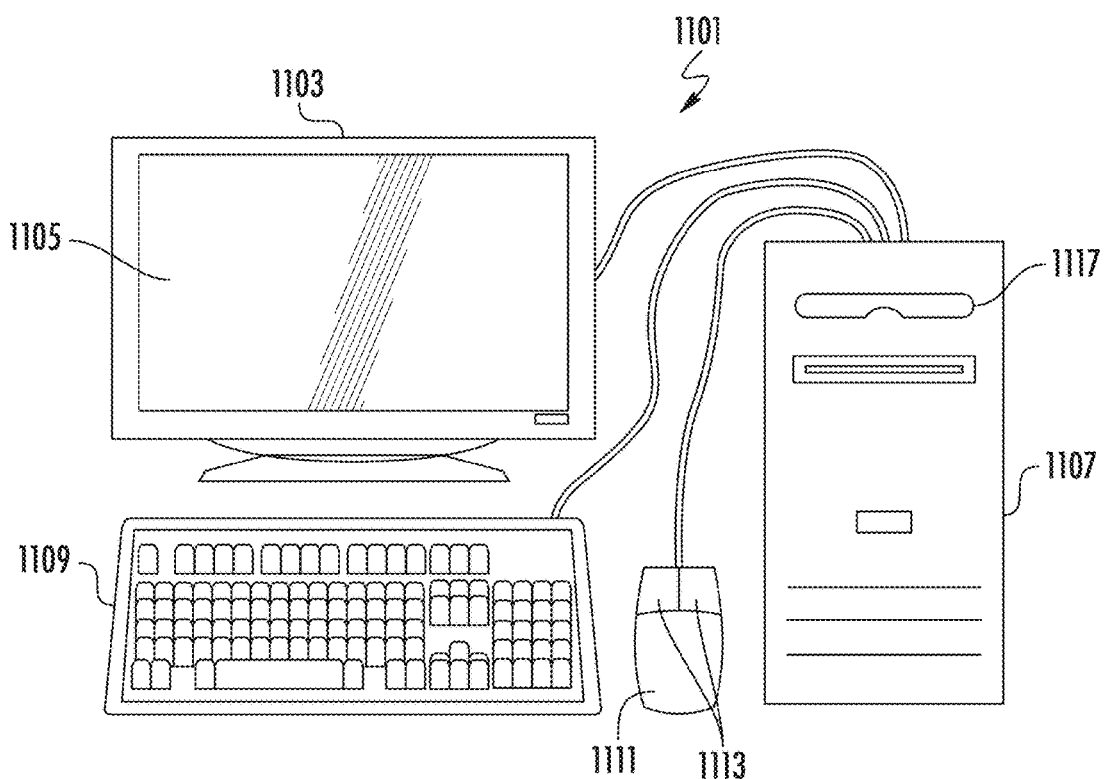
FIG. 11 shows a computer system that can be used in laser finishing.

FIG. 11 shows an exemplary client or server system of the present invention. In an embodiment, a user interfaces with the system through a computer workstation system, such as shown in FIG. 11. FIG. 11 shows a computer system 1101 that includes a monitor 1103, screen 1105, enclosure 1107 (may also be referred to as a system unit, cabinet, or case), keyboard or another human input device 1109, and mouse or another pointing device 1111. Mouse 1111 may have one or more buttons such as mouse buttons 1113.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad, Apple iPad Pro, or Apple iPad mini), Apple iPod (e.g., Apple iPod Touch), Samsung Galaxy product (e.g., Galaxy S series product or Galaxy Note series product), Google Nexus and Pixel devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front-facing camera or rear camera, or both) for taking pictures and video. For example, a smartphone or tablet can be used to take live video that can be streamed to one or more other devices.

Enclosure 1107 houses familiar computer components, some of which are not shown, such as a processor, memory, mass storage devices 1117, and the like. Mass storage devices 1117 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 1117. The source code of the software of the present invention may also be stored or reside on mass storage device 1117 (e.g., hard disk, magnetic disk, tape, or CD-ROM). As a further example, code of the invention may be transmitted via wires, radio waves, or through a network such as the Internet.

Figure 12:
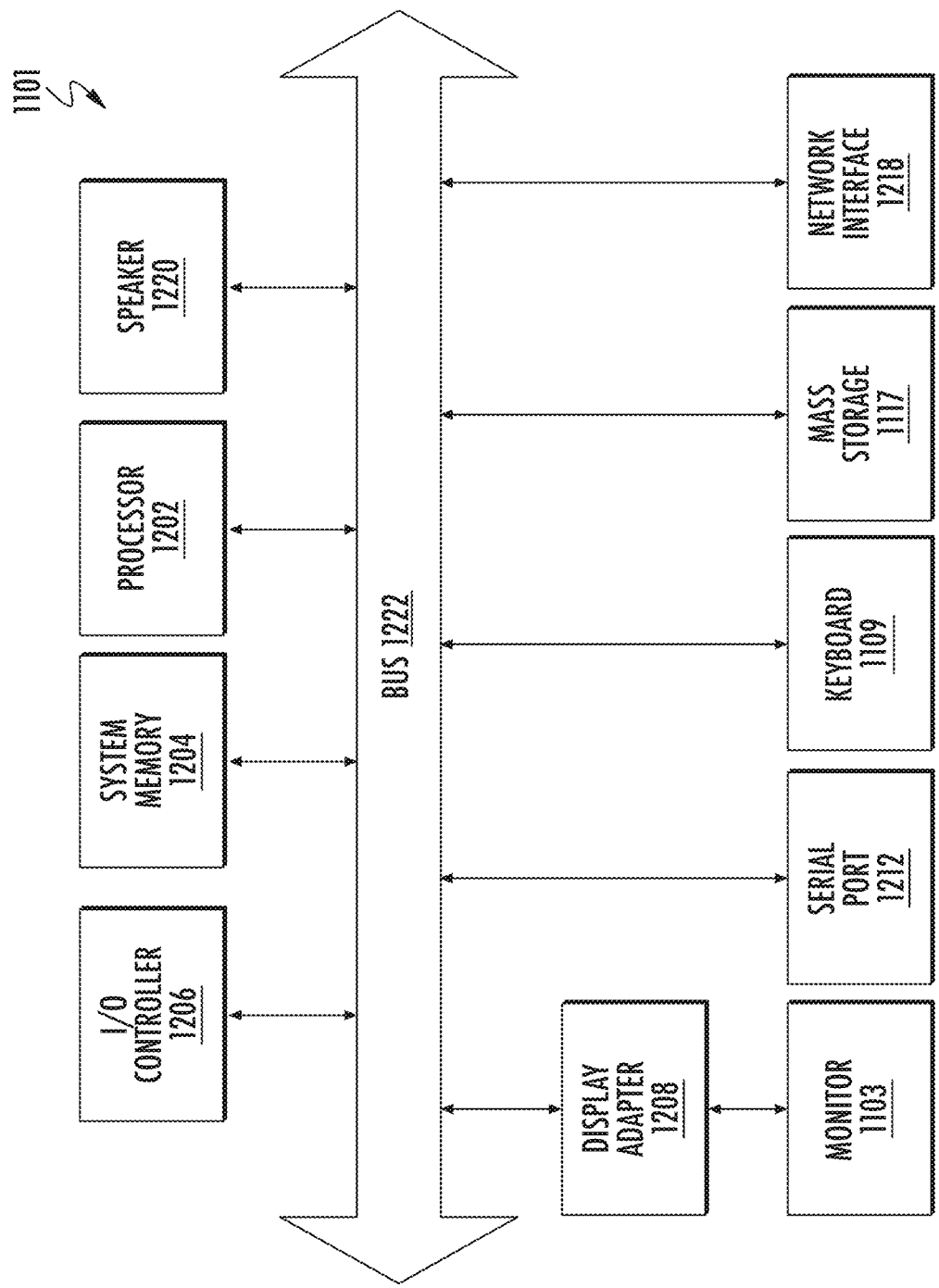
FIG. 12 shows a system block diagram of the computer system.

FIG. 12 shows a system block diagram of computer system 1101 used to execute the software of the present invention. As in FIG. 11, computer system 1101 includes monitor 1103, keyboard 1109, and mass storage devices 1117. Computer system 1101 further includes subsystems such as central processor 1202, system memory 1204, input/output (I/O) controller 1206, display adapter 1208, serial or universal serial bus (USB) port 1212, network interface 1218, and speaker 1220. The invention may also be used with computer systems with additional or fewer subsystems. For example, a computer system could include more than one processor 1202 (i.e., a multiprocessor system) or a system may include a cache memory.

Arrows such as 1222 represent the system bus architecture of computer system 1101. However, these arrows are illustrative of any interconnection scheme serving to link the subsystems. For example, speaker 1220 could be connected to the other subsystems through a port or have an internal direct connection to central processor 1202. The processor may include multiple processors or a multicore processor, which may permit parallel processing of information. Computer system 1101 shown in FIG. 12 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, MATLAB (from MathWorks, www.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Any trademarks or service marks used in this patent are the property of their respective owners. Any company, product, or service names in this patent are for identification purposes only. Use of these names, logos, and brands does not imply endorsement.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download Web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, a client can access the system through a Web application from one or more servers using a network connection with the server or servers and load the Web application in a Web browser. For example, a Web application can be downloaded from an application server over the Internet by a Web browser. Nonnative applications can also be obtained from other sources, such as a disk.

Figure 13:
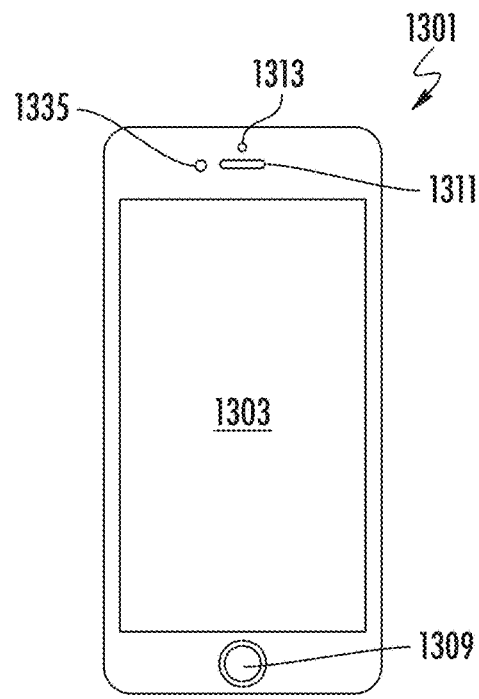
FIGS. 13-14 show examples of mobile devices.
Figure 14:
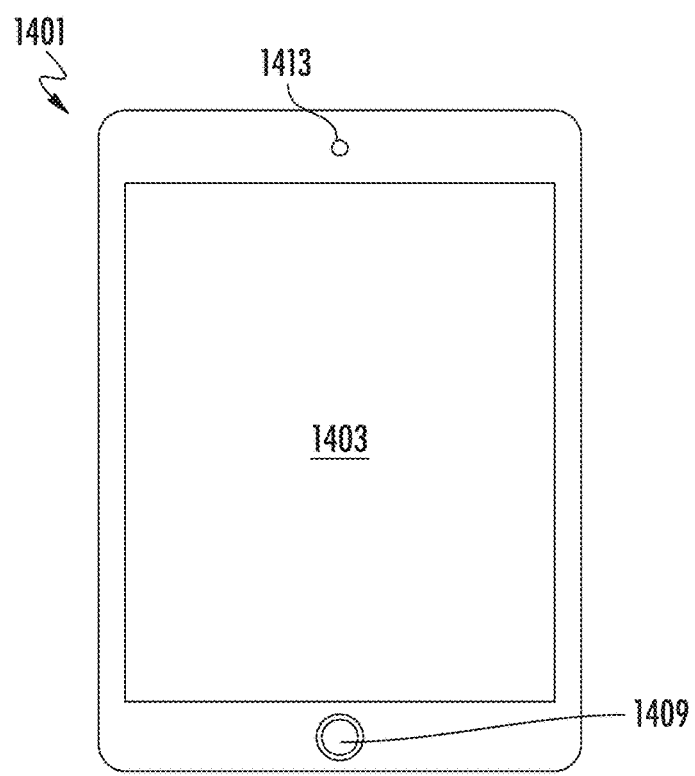

FIGS. 13-14 show examples of mobile devices, which can be mobile clients. Mobile devices are specific implementations of a computer, such as described above. FIG. 13 shows a smartphone device 1301, and FIG. 14 shows a tablet device 1401. Some examples of smartphones include the Apple iPhone, Samsung Galaxy, and Google Nexus family of devices. Some examples of tablet devices include the Apple iPad, Apple iPad Pro, Samsung Galaxy Tab, and Google Nexus family of devices.

Smartphone 1301 has an enclosure that includes a screen 1303, button 1309, speaker 1311, camera 1313, and proximity sensor 1335. The screen can be a touch screen that detects and accepts input from finger touch or a stylus. The technology of the touch screen can be a resistive, capacitive, infrared grid, optical imaging, or pressure-sensitive, dispersive signal, acoustic pulse recognition, or others. The touch screen is a screen and a user input device interface that acts as a mouse and keyboard of a computer.

Button 1309 is sometimes referred to as a home button and is used to exit a program and return the user to the home screen. The phone may also include other buttons (not shown) such as volume buttons and on-off button on a side. The proximity detector can detect a user's face is close to the phone, and can disable the phone screen and its touch sensor, so that there will be no false inputs from the user's face being next to the screen when talking.

Tablet 1401 is similar to a smartphone. Tablet 1401 has an enclosure that includes a screen 1403, button 1409, and camera 1413. Typically the screen (e.g., touch screen) of a tablet is larger than a smartphone, usually 7, 8, 9, 10, 12, 13, or more inches (measured diagonally).

Figure 15:
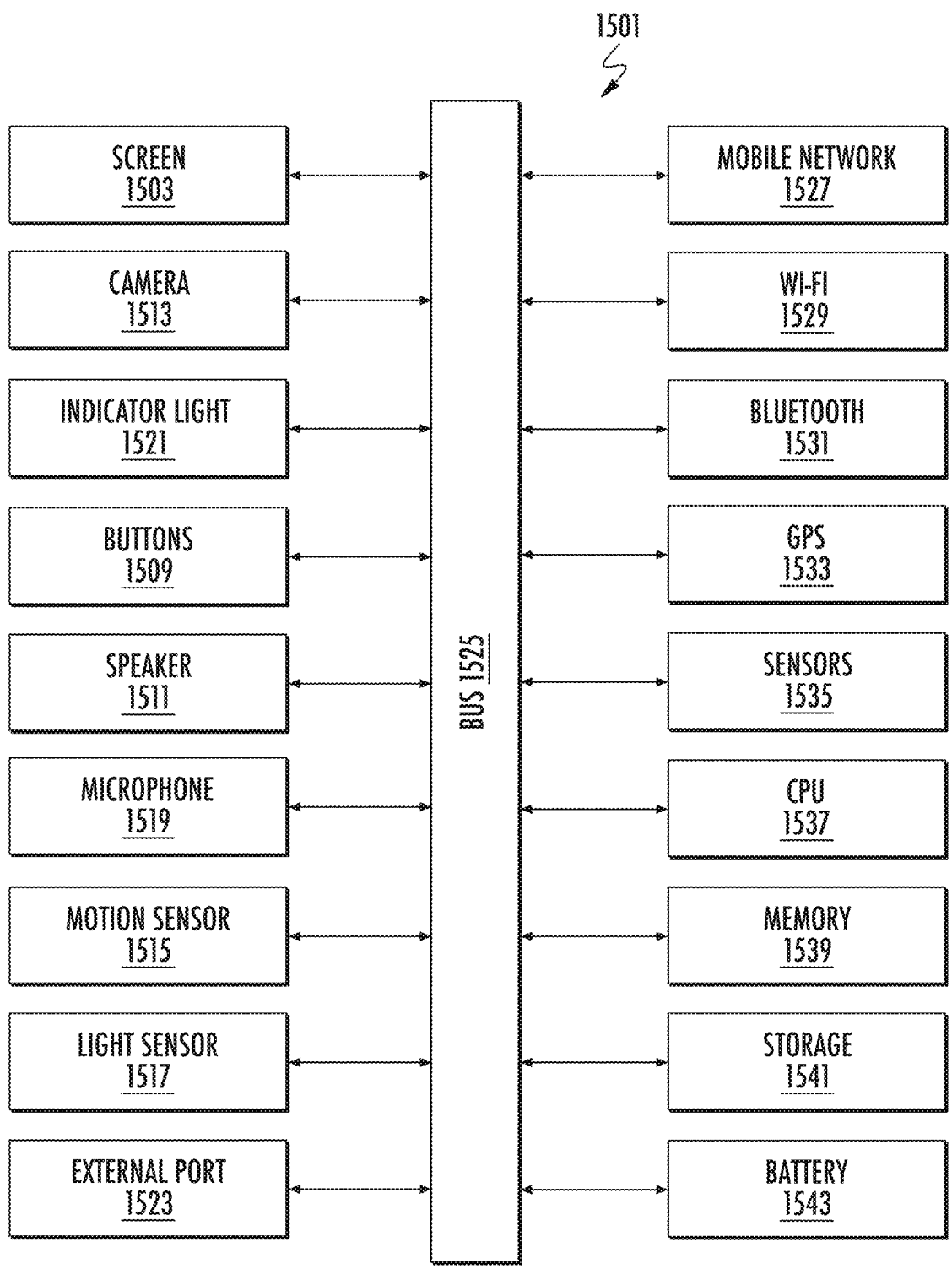
FIG. 15 shows a system block diagram of a mobile device.

FIG. 15 shows a system block diagram of mobile device 1501 used to execute the software of the present invention. This block diagram is representative of the components of smartphone or tablet device. The mobile device system includes a screen 1503 (e.g., touch screen), buttons 1509, speaker 1511, camera 1513, motion sensor 1515, light sensor 1517, microphone 1519, indicator light 1521, and external port 1523 (e.g., USB port or Apple Lightning port). These components can communicate with each other via a bus 1525.

The system includes wireless components such as a mobile network connection 1527 (e.g., mobile telephone or mobile data), Wi-Fi 1529, Bluetooth 1531, GPS 1533 (e.g., detect GPS positioning), other sensors 1535 such as a proximity sensor, CPU 1537, RAM memory 1539, storage 1541 (e.g. nonvolatile memory), and battery 1543 (lithium ion or lithium polymer cell). The battery supplies power to the electronic components and is rechargeable, which allows the system to be mobile.

Figure 16:
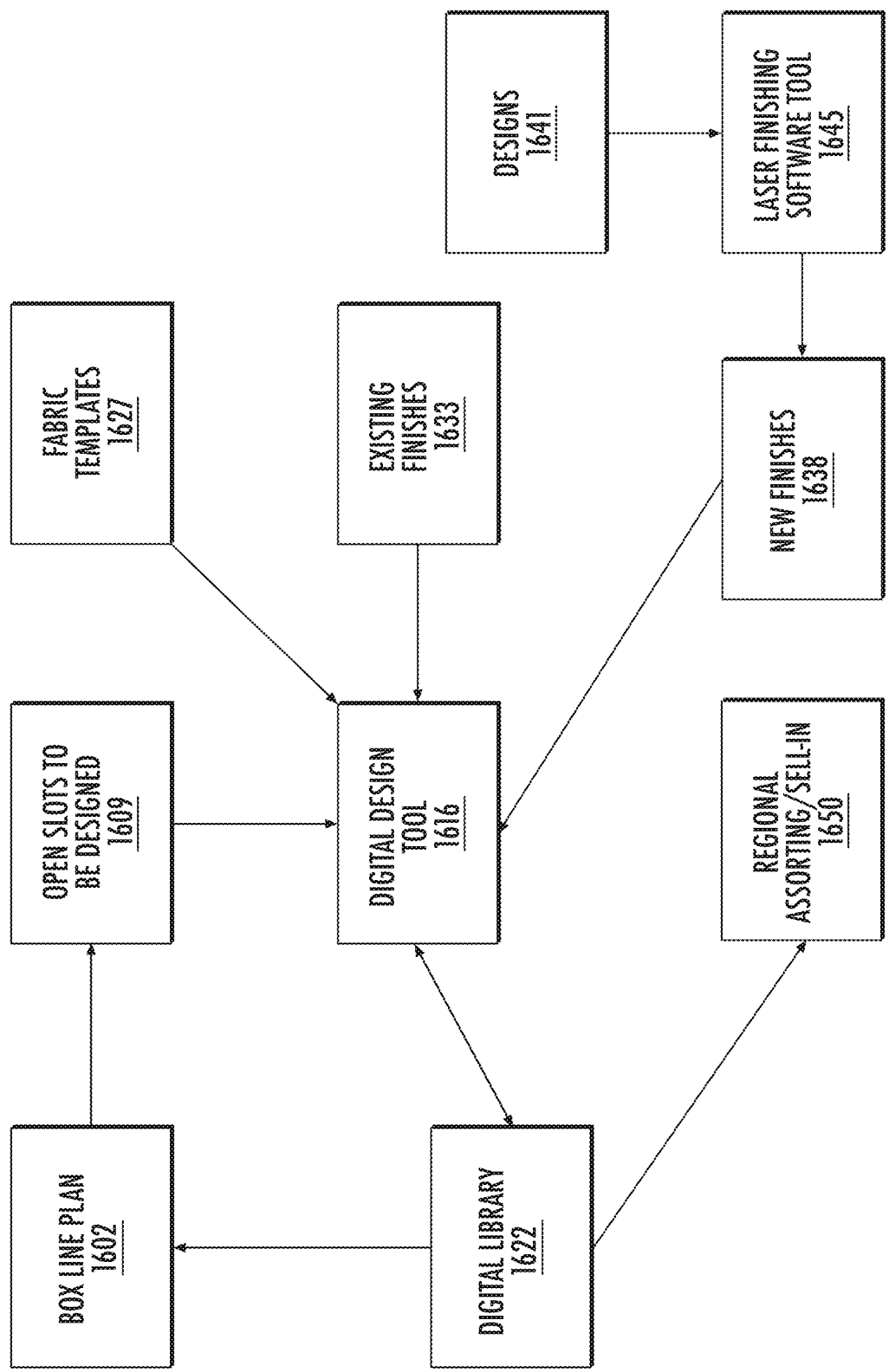
FIG. 16 shows a block diagram of a system for creating, designing, producing apparel products with laser finishing.

FIG. 16 shows a block diagram of a system for creating, designing, producing apparel products with laser finishing. A box line plan 1602 is an internal and interim tool for communication between a merchandising group and design group. Through the box line plan, merchandising can communicate what needs to be designed by the design group. The box line plan can have open slots to be designed 1609.

There is a digital design tool 1616 merchants and design can use to click and drag finish effects (e.g., laser files) and tint casts over images of base washes in order to visualize possible combinations and build the line visually before the garment finish is actually finished by the laser. The visualizations can be by rendering on a computer system, such as using three-dimensional (3D) graphics.

U.S. patent application 62/433,746, filed Dec. 13, 2016, which is incorporated by reference, describes a system and operating model of apparel manufacture with laser finishing. Laser finishing of apparel products allows an operating model that reduces finishing cost, lowers carrying costs, increases productivity, shortens time to market, be more reactive to trends, reduce product constraints, reduces lost sales and dilution, and more. Improved aspects include design, development, planning, merchandising, selling, making, and delivering. The model uses fabric templates, each of which can be used to produce a multitude of laser finishes. Operational efficiency is improved.

Designers can use the digital design tool to design products that are used to satisfy the requests in open slots 1609. Designs created using the digital design tool can be stored in a digital library 1622. Inputs to the digital design tool include fabric templates or blanks 1627 (e.g., base fit fabrics or BFFs), existing finishes 1633 (e.g., can be further modified by the tool 1616), and new finishes 1638. New finishes can be from designs 1641 (e.g., vintage design) captured using a laser finish software tool 1645, examples of which are described in U.S. patent applications 62/377,447, filed Aug. 19, 2016, and Ser. No. 15/682,507, filed Aug. 21, 2017. Digital library 1622 can be accessible by the region assorting and sell-in 1650. And the digital library can be used populate or satisfy the box line plan.

Figure 17:
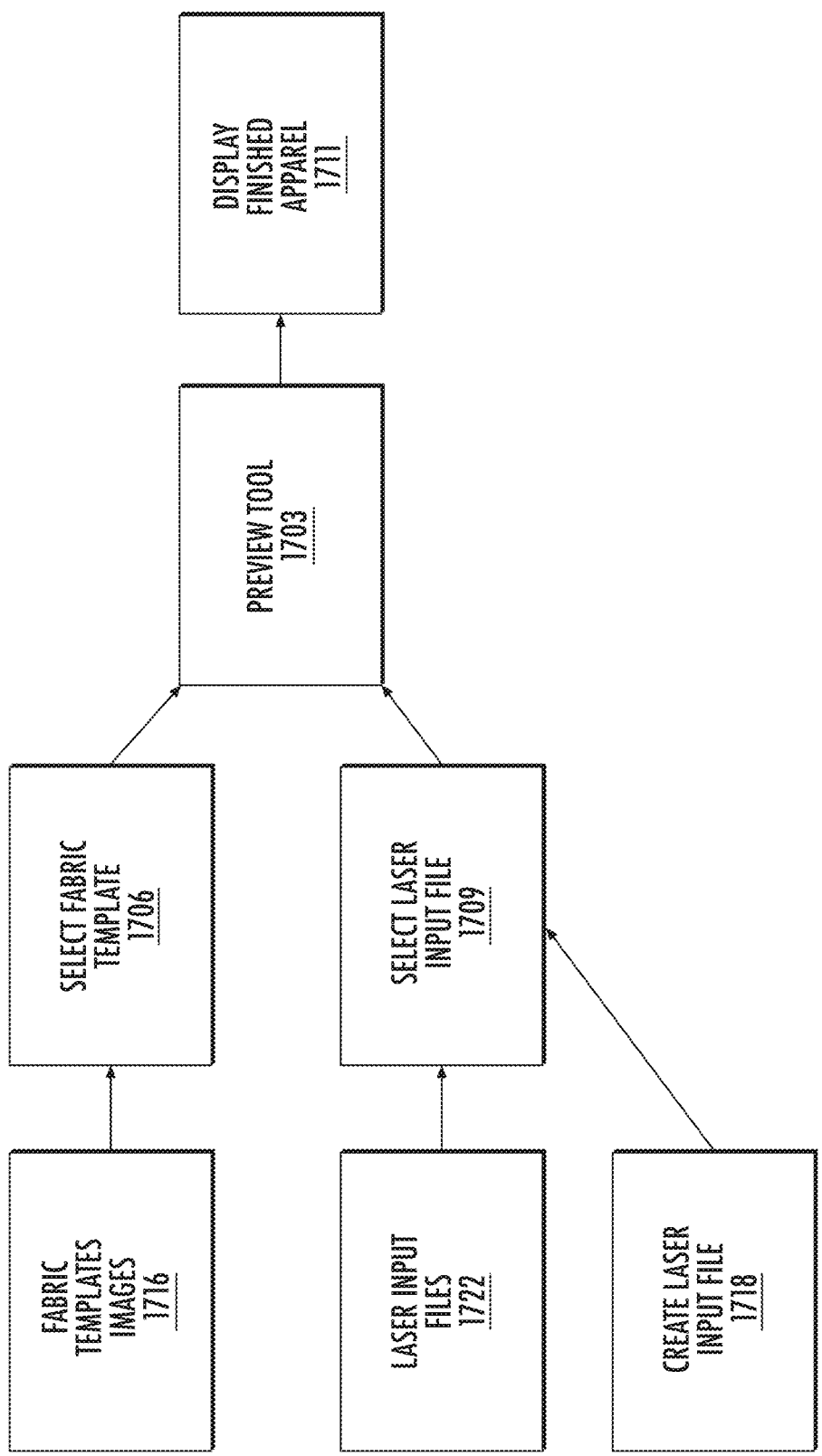
FIG. 17 shows a block diagram of a specific implementation of a preview tool.

FIG. 17 shows a block diagram of a specific implementation of a digital design tool, a preview tool 1703. Digital design tool 1616 can be representative of a collection of tools, such as an application suite, including desktop or mobile apps, or a combination.

Preview tool 1703 can be a single tool in a toolbox or toolkit used for laser finishing of garments, or the tool can be incorporated as a feature of another tool. The preview tool allows a user such as a clothing designer to preview on a computer screen or to generate a digital representation (e.g., image file, JPEG file, BMP file, TIFF file, GIF file, PNG file, PSD file, or others) of jeans in a selected base fit fabric or fabric template 1706 with a selected laser pattern 1709 (e.g., from a laser input file). With the digital representation, the user will be able to see or preview the jeans in the selected base fit fabric as if it had been burned with the selected laser input file, without needing to actually laser or burn the jeans.

With the preview tool, the appearance of the garment (e.g., jeans) will be of the finished garment product that the buyer or consumer will see (e.g., after postlaser wash). As discussed above, after laser finishing, the garment will have charred appearance, and damage holes will still be connected by fine yarns, and will not yet be tinted. After postlaser wash, the charring and yellowish hue due to the laser ash and residue will be washed away. The damage holes or openings will be opened and typically have a shredded appearance. The garment will have the selected tinting (e.g., color and level of color).

The preview tool displays on a screen or other visual output a preview image 1711 of the garment as it would appear to the consumer, after post laser wash. The preview image 1711 will be a photorealistic image in color. The preview image may be displayed in using a 8-bit or greater color depth, 16-bit or greater color depth, 24-bit or greater color depth, or 32-bit or greater color depth. This is in contrast to a computer screen at operator's console of a laser finishing machine, which typically only shows black and white images. The console is primarily used for alignment rather than design, and using black and white images can provide increased contrast (as compared to color images) which aids the operator in achieving proper alignment.

The console is directly attached or connected to the laser, while the preview tool is front end tool that executes remotely from the computer and connected via a network. The preview tool can be directly attached or connected to the laser, but typically not because laser finishing is typically performed at a different physical location from where garments are designed. For example, a design facility may be in San Francisco, while the laser finishing center may be Las Vegas or outside the United States (e.g., China, Mexico, Bangladesh, Sri Lanka, Vietnam, India, Malaysia, Indonesia, Egypt, Brazil, and others).

After a garment has been designed and previewed using the preview tool, the information can be transferred via the network to the laser finishing tool and its console. For example, the preview tool can execute on a desktop computer, mobile device (e.g., smartphone or tablet computer), or using a Web browser.

Some files are described as being of an image file type. Some examples of image file types or file formats include bitmap or raster graphics formats including IMG, TIFF, EXIF, JPEG, GIF, PNG, PBM, PGM, PPM, BMP, and RAW. The compression for the file can be lossless (e.g., TIFF) or lossy (e.g., JPEG). Other image file types or file formats include vector graphics including DXF, SVG, and the like.

Bitmaps or raster graphics are resolution dependent while vector graphics are resolution independent. Raster graphics generally cannot scale up to an arbitrary resolution without loss of apparent quality. This property contrasts with the capabilities of vector graphics, which generally easily scale up to the quality of the device rendering them.

A raster graphics image is a dot matrix data structure representing a generally rectangular grid of pixels, or points of color, viewable via a monitor, paper, or another display medium. A bitmap, such as a single-bit raster, corresponds bit-for-bit with an image displayed on a screen or output medium. A raster is characterized by the width and height of the image in pixels and by the number of bits per pixel (or color depth, which determines the number of colors it can represent).

The BMP file format is an example of a bitmap. The BMP file format, also known as a bitmap image file or a device independent bitmap (DIB) file format or simply a bitmap, is a raster graphics image file format used to store bitmap digital images, independently of the display device. The BMP file format is capable of storing two-dimensional digital images of arbitrary width, height, and resolution, both monochrome and color, in various color depths, and optionally with data compression, alpha channels, and color profiles.

The fabric template can be selected from a library of fabric template images 1716 or may be a new image uploaded or provided by the user. Each fabric template images is an image file of a pair of jeans in a base fit fabric or other material. For each jeans model or fit (e.g., models or fits 311, 501, 505, 511, 515, 541, 569, 721, and others), there would be one image in each different material or base fit fabric.

The laser input file can be selected from a library of laser input files 1722 (e.g., files created from vintage jeans or from a group of designers), may be a file 1718 created by the user, or may be a file uploaded or provided by the user. For example, the user may have created the laser pattern (contained within a laser input file) manually using a graphical or image editing tool (e.g., Adobe Photoshop and similar photo editing programs). Or the laser pattern may have been created by another, such as selected from a library of laser files. The laser pattern may be generated by a computer or automated process, such as may be used to obtain a laser pattern from vintage jeans. The user will be able to see the results of a burn, make any manual changes or alterations to the pattern (such as additional changes to a vintage jean pattern in a digital image file) and preview the results again. The preview tool allows a user to make and see changes, to the user can obtain feedback faster than having to laser jeans to see the results and also avoiding unneeded waste (e.g., preliminary versions of burned jeans).

Each digital representation can be saved in separate images, and a group or set of the images can be a called brief of collection of jeans. The preview tool can be used for merchandising, such as generating images of a proposed line of products for a particular season, and these images can be shared among members of a team to discuss any additions, changes, or deletions to a collection.

A specific version of the preview tool overlays a fabric template input file and a laser input file, and then generates an image to display them together as a representation of the laser-finished apparel. The laser input file is aligned to the garment in the fabric template input file, so that the positioning of features in the laser input file and at appropriate positions or places on the garment. The alignment may be performed by using alignment marks that are in the input files. The alignment may be an automated alignment or scaling, or a combination.

Brightness, intensity, opacity, blending, transparency, or other adjustable parameters for an image layer, or any combination of these, are selected or adjusted for the laser input file, so that when the laser input file is overlaid above the fabric template image, the look of the garment will appear to simulate the look of a garment that has been burned by a laser using that laser input file.

Adjustable parameters such as opacity can be used to blend two or more image layers together. For example, a layer's overall opacity determines to what degree it obscures or reveals the layer beneath it. For example, a layer with 1 percent opacity appears nearly transparent, while one with 100 percent opacity appears completely opaque.

Further, a dots per inch (dpi) of the combined image can be adjusted to also more properly simulate the look of a garment more closely with a burned garment. Dots per inch refers to the number of dots in a printed inch. The more dots, the higher the quality of the print (e.g., more sharpness and detail). By reducing the dpi of the image, this will reduce the image quality, resulting in a blurring of the image. In an implementation, the preview tool reduces a dpi of the combined image, to be of less dpi than the fabric template input file or the laser input file. By blurring the preview image, this results in an improved simulation that corresponds better to a burned laser garment. When burning a garment, the garment material or fabric typically limits the resolution of the result to less than that of the input file.

In an implementation, the dpi of the laser input file is about 72 dpi, while the dpi of the preview image is about 34 dpi. In an implementation, the dpi of the fabric template input file and laser input file are about 36 dpi or above, while the dpi of the preview image is about 36 dpi or lower.

Figure 18:
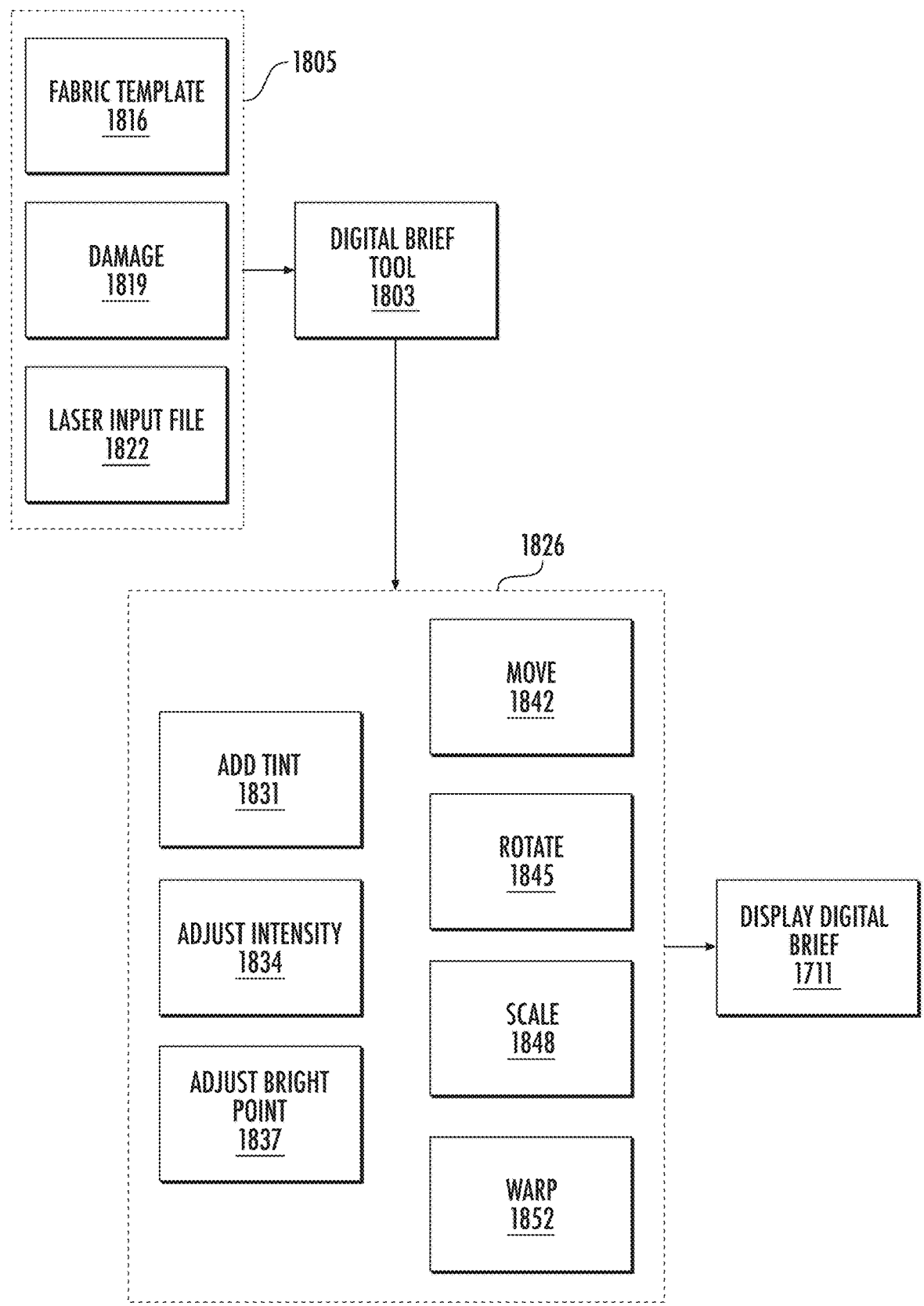
FIG. 18 shows a block diagram of a brief tool.

FIG. 18 shows a block diagram of a digital brief tool 1803, which also like preview tool 1703, provides a real-time preview of an appearance of pair of jeans when a finishing pattern is applied by burning using a laser input file. The digital brief tool has additional features to allow more flexible designing of jeans.

It should be understood that the invention is not limited to the specific flows and steps presented. A flow of the invention may have additional steps (not necessarily described in this patent), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data or situation.

The digital brief tool takes as input three types of digital assets 1805, fabric template input 1816, damage input 1819, and laser input file 1822. Fabric template input 1816 and laser input file 1822 are similar to the inputs for the preview tool. Damage input 1819 is an image of damage (e.g., holes, rips, shredded regions, or openings of various shapes and sizes) that can be burned by a laser into jeans. The digital brief tool overlays the damage and laser input files over the fabric template.

The user selects a fabric template input, which an image of a jeans style in a particular base fit fabric. The user can optionally select one or more damage inputs. If a damage input is selected, the damage input will be a layer that overlays the fabric template layer. As for the preview tool, the user selects a laser input file with laser pattern and overlays the fabric template layer. As the user selects the inputs, the user will be able to see in real time the inputs and any changes or updates in a preview image or brief.

After the inputs are selected, the user can select and perform one or more operations 1826 on the inputs using the digital brief tool. These operations including adding tint 1831, adjusting intensity 1834, adjusting bright point 1837, move digital asset 1842, rotate digital asset 1845, scale digital asset 1848, and warp digital asset 1852. As the user selects and performs one or more operations, the user will be able to see in real time the changes or updates in the preview image or brief.

After the fabric template input, the user can add tinting 1831. Tinting will adjust the hue of the color of the fabric template input. Tinting is representative of the tinting which can be added during the postlaser wash or finishing II, described above. The user will be able to select a tint color, and this tint color will be blended with the existing color of the fabric template input. The amount or intensity of the tinting can be increased or decreased, such as by using a slider bar.

The user can adjust intensity 1834. In an implementation, intensity adjusts a weight matrix by a percentage of each value in the array. In an implementation, intensity (or brightness) adjusts an opacity of a generated adjustment layer (see hue saturation lightness adjustment layer described below). The greater the opacity, the more opaque this layer will appear in the preview or brief image. The less the opacity, the less opaque this layer will appear in the preview or brief image; the layer will appear more transparent so that the layer beneath will show through more.

When increasing brightness, the opacity of the adjustment layer increases, and since the adjustment layer is above the fabric template input, the generated adjustment layer will become more prominent or visible, thus making this layer (which has the wear pattern) brighter. Similarly, when decreasing brightness, the opacity of the adjustment layer decreases, the generated adjustment layer will become less prominent or visible, thus making this layer (which has the wear pattern) less bright or fainter. The amount of the intensity can be increased or decreased, such as by using a slider bar.

The user can adjust the bright point 1837. Bright point adjusts the effect of the laser input file on the fabric template input. In an implementation, bright point adjustment changes a midpoint of a grayscale, creating a piecewise linear mapping of the pattern file.

Increasing the bright point will increase an effect of the laser pattern (e.g., causing greater laser pattern highlights) in the laser input file on the fabric template input, while decreasing the bright point does the opposite (e.g., diminishing laser pattern highlights). The bright point adjustment can be analogous to changing a pixel time or the time that the laser stays at a particular position for a given input from the laser input file. The amount of the bright point can be increased or decreased, such as by using a slider bar.

The user can move 1842 or reposition a selected digital asset. For example, a damage input (or fabric template or laser file) may be moved to a position desired by the user. The user can rotate 1845 a selected digital asset. For example, a damage input (or fabric template or laser file) may be rotated to any angle relative to the other layers as desired by the user.

The user can scale 1848 a selected digital asset. This scaling can be locked, maintaining the original aspect ratio of the digital asset, or can be unlocked, such that the user can change the aspect ratio. The user can warp 1852 a selected digital asset. With warping, the user can adjust an aspect ratio of a portion of the digital asset differently from another portion. For example, one portion of a damage input (or fabric template or laser file) can be squished (e.g., right and left edges of image pushed toward each other) while another portion is expanded (e.g., right and left edges of image pulled away from each other).

After the user has performed selected operations 1826, the digital brief tool shows an image of the jeans with the laser finishing pattern, including any tinting, damage, or other adjustments, as created by the user. This image can be saved and viewed again later. A user can create multiple designs, and these can be saved together as part of a collection.

Figure 19:
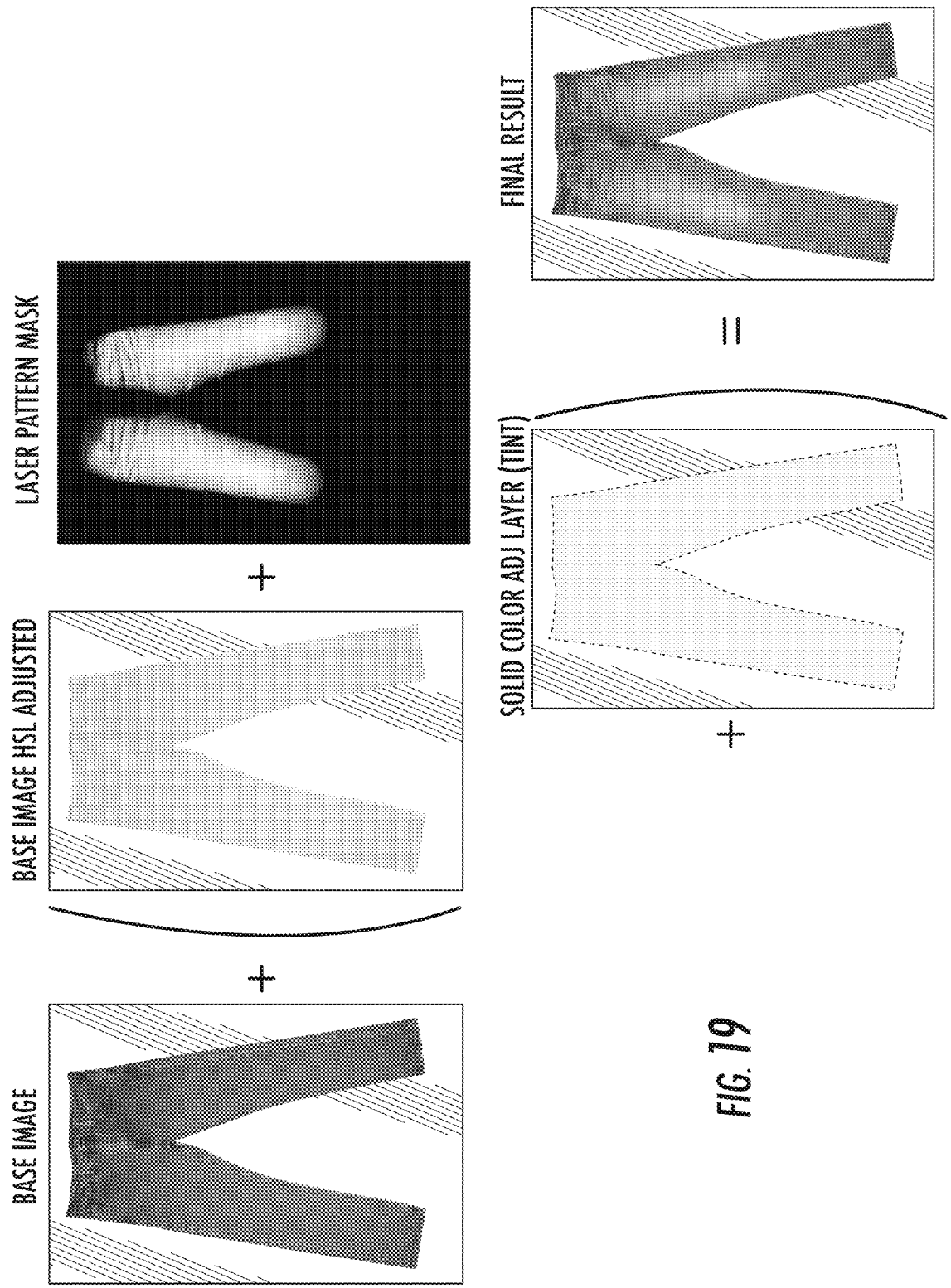
FIG. 19 shows a technique of generating a preview of a finished image using a brief tool.

FIG. 19 shows a technique of generating a preview of a finished image using a digital brief tool. A base image (or fabric template input) is selected. A hue saturation lightness (HSL) adjustment layer is created or generated for the selected base image. The HSL adjustment layer can be the base layer with an adjustment for hue saturation lightness. When tinting is selected, a solid color adjustment layer is created or generated. The solid color adjustment layer has a solid color (e.g., yellow, green, red, blue, or another color that is used for tinting the garment) that is in the same form or outline as the garment (e.g., pants), as indicated by the dotted lines in the figure.

To obtain a final result, which is the final image of the jeans with laser finishing pattern, a laser pattern mask is combined with the base image and HSL adjustment layer. A resulting combination will be based on intensity and bright point settings.

The laser pattern mask is a negative image or reverse image of the laser input file. For the laser input file, during laser burning, a white pixel means the pixel is not lasered (which results in the original indigo color of the fabric), and a black pixel means the pixel will be lasered at highest level (which results in the whitest color that can be achieved on the fabric). In an implementation, the laser input file has 256 levels of gray, and for levels between 0 (e.g., black) and 255 (e.g., white), then the amount of laser burning will be proportionally somewhere in between.

Figure 20:
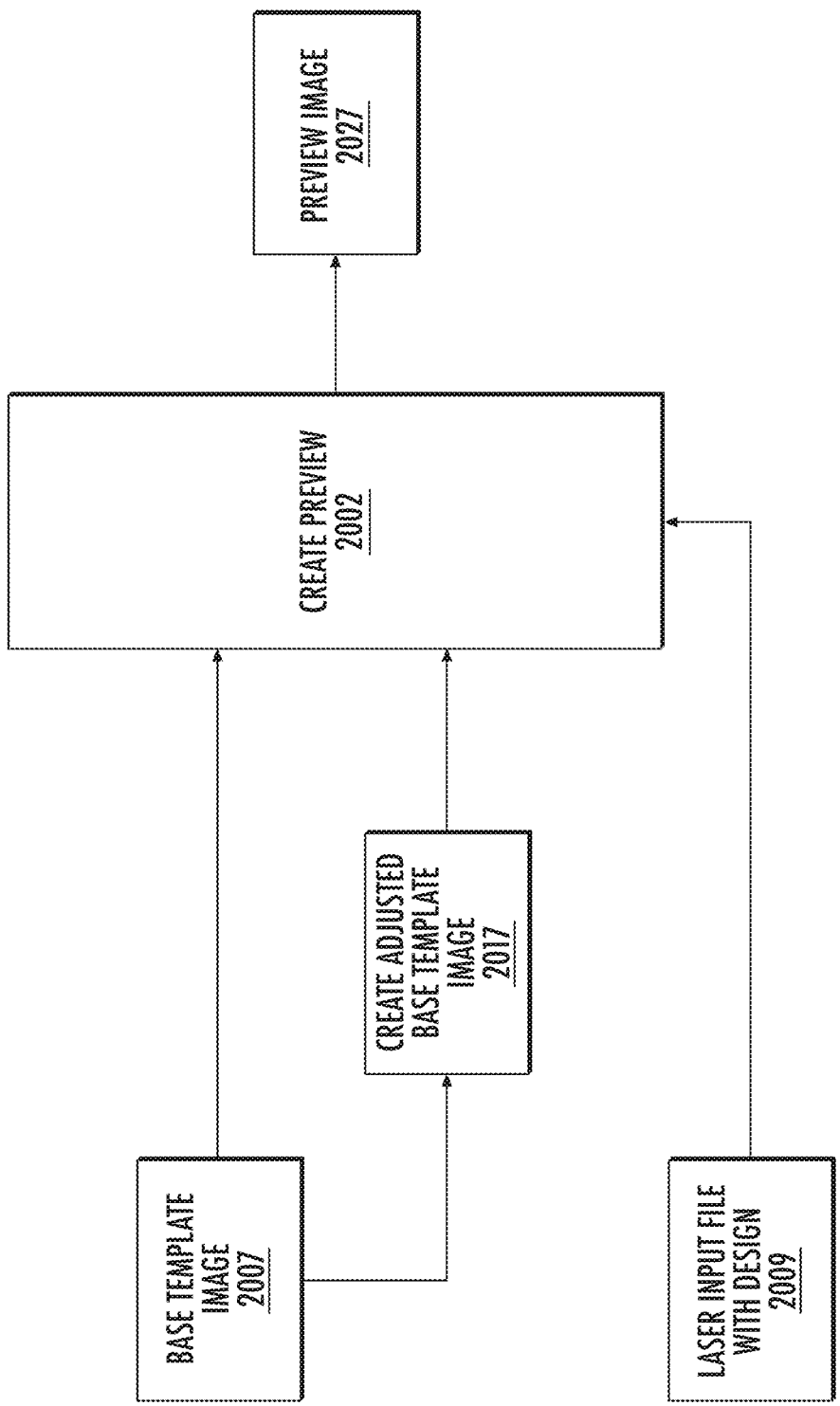
FIG. 20 shows a block diagram of a technique of generating a preview of a laser finishing pattern on a garment.

FIG. 20 shows a block diagram of a technique of generating a preview of a laser finishing pattern on a garment, such as jeans. The technique may be embodied in a preview generation tool 2001. Inputs to a create preview image process 2002 include a base template image 2007 and laser input file 2009. The base template image is used to create an adjusted base template image 2017, which is also input to the create preview image process. These create preview image process uses these three inputs to create a preview image 2027, which can be displayed on a computer screen for the user.

The adjusted base template image is created from the base template image by adjusting its hue, saturation, or lightness, or any combination of these. Compared to the original base template image, the adjusted base template image will appear washed out or bleached. In other words, the adjusted base template image will appear as if the garment in the base template image were fully bleached or lasered. The adjusted base template image can be an HLS adjustment layer as discussed above.

Digital Brief Tool. Implementations of a digital brief tool (or garment preview tool) may execute on Apple Inc.'s iPad Pro tablet computer device. Although the screens portray the digital brief tool as executing on an iPad Pro, other suitable electronic devices may execute the digital brief tool. For example, the digital brief tool may execute on a Windows device (e.g., Windows 10 tablet), an Android device, other iPad product family models (e.g., iPad or iPad mini), or many other devices.

The iPad Pro 12.9 is a tablet device with rectangular dimensions of 12 inches by 8.68 inch, and is 0.27 inches thick. The iPad Pro has a 12.9-inch screen, and has non-volatile memory storage of 64, 256, or 512 gigabytes. The iPad Pro has network connectivity via Wi-Fi and optionally cellular. The iPad Pro has an A10X Fusion chip with 64-bit architecture and an embedded M10 coprocessor. Some features of the digital brief tool can be accelerated by using specialized features available in the A10X Fusion chip or embedded M10 coprocessor, or both. An operating system of the iPad Pro is Apple iOS 11 (or greater when released). Further, the iPad Pro can be operated with a stylus, the Apple Pencil product. And in an implementation, the user can use the Apple Pencil with the digital brief tool.

The digital brief tool includes various features, allowing a designer to select, create, and visualize how an apparel item will look with certain characteristics, before the apparel item is produced. The digital brief tool may allow the designer, for one or more characteristics of a proposed apparel item, to assign one or more options to each of the characteristics. While assigning the options for characteristics, the digital brief tool allows the designer to see, based on currently assigned options, how the apparel item may appear when produced, in real time as changes are made.

Selecting gender, series, fit, fabric, or other characteristics in the digital brief tool may result in having only relevant options presented to the designer. For example, some characteristics or options may be specific to a particular gender. Upon selection of the particular gender, characteristics and options with the selected gender will appear for the designer to use for a proposed apparel item.

In an implementation, the digital brief tool is adapted for use with producing jeans. For example, the following figures may include various characteristics and options relevant to designing and stylizing of jeans. However, the digital brief tool may be adapted for use with other apparel items, such as shirts, jackets, pants, or socks.

Some specific implementations of a digital brief tool are discussed in U.S. application Ser. Nos. 16/177,387, 16/177, 412, and 16/177,407, filed Oct. 31, 2018, which are incorporated by reference.

Figure 21:
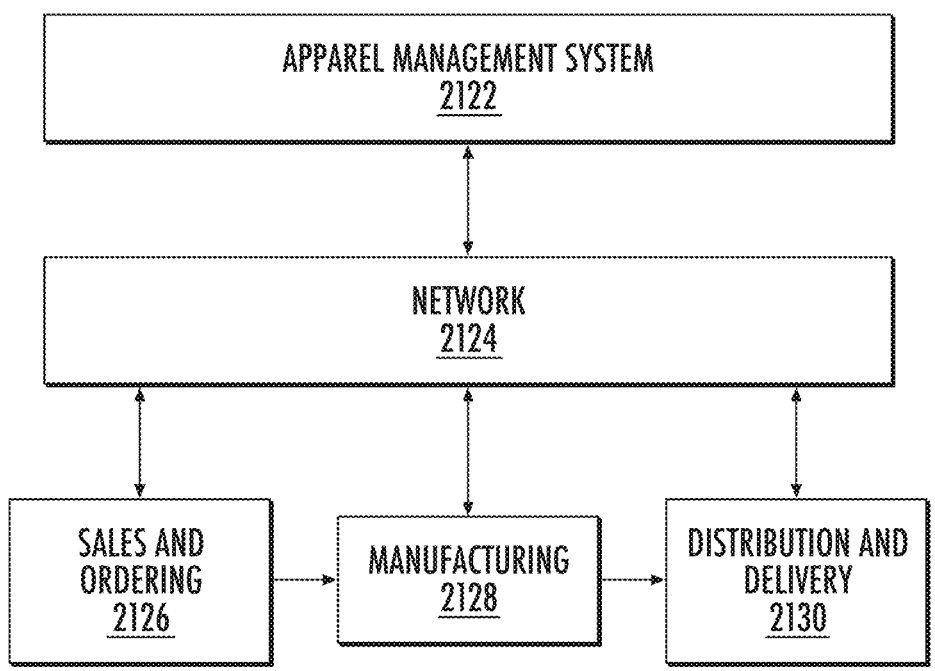
FIG. 21 shows a system for apparel manufacturing and sales.

Apparel Management System. FIG. 21 shows a system for apparel manufacturing and sales, where the apparel can include garments that have been finished using laser finishing. There is an apparel management system 2122, which controls operation of the system. The apparel management system is connected by a network 2124 to components of the system, including sales and ordering 2126, manufacturing 2128, and distribution and delivery 2130 components. The network can be a computer network, such as the Internet. The apparel management system is sometimes referred to as apparel manufacturing and sales system.

Using the sales and order component, a customer can preview and selects garments to order. The customer can be a buyer for a retail store, internal buyer for retail sales of a region, regional salesperson, or another customer. The sales process can include using a variety of tools to assist a customer with showing available products, selecting products to purchase, keeping an order within budget, accessing a history of previous orders, and customizing and selecting fits, styles, and sizes of products. As an example, the customer can view products and order via a digital showroom. Further, the customer can also order via a Web site managed by the apparel management system. After the customer completes the order, the order is sent via the network (e.g., Internet) to the apparel management system.

The sales and ordering system can include one or more computer systems, such as one or more of computer system 1101, mobile device 1301, tablet computer 1401, other computer systems, or any combination of these computer systems. One or more of these computer systems can store and operate computer code that implements the operations of the sales and ordering system that are described in this patent.

The products are shown digitally, which reduces the number of physical samples that may be manufactured. For example, a sample garment (i.e., physical garments) does not need to be manufactured in each available size, and in some implementations where garments are displayed digitally, no sample garments are manufactured. Reducing and potentially eliminating the manufacture of sample garments where garments are presented digitally can significantly reduce or eliminate the cost of presenting sample garments to customers. The garment industry has a long tradition of manufacturing sample garments for numerous customers across large geographic regions, such as for the United States, for the Americas, for Europe, for Asia, for the African continent, and other regions. The reduction or elimination of the manufacture of sample garments for numerous buyers across numerous geographic locations provides for tremendous cost savings in the general manufacture of garments.

The apparel management system sends the order to the manufacturing component, where the order is made. Manufacturing can include cutting the fabric material, assembling or sewing together the cut panels, and finishing the apparel item using a laser. An apparel manufacturer can have numerous manufacturing centers, and the apparel management system will send the order to a manufacturing center that is appropriate for the customer and order. The determination is based on a location of the customer (e.g., shipping time to a customer from a manufacturing center) and the apparel item selected (e.g., availability of material). The system ensures the order will be fulfilled efficiently in a short amount of time.

In an implementation, the laser finishing is done after the garment is assembled. Specifically, the material is cut, assembled into a garment, and then the garment is finished using a laser. The finishing is based on style or customization selected by the customer in the order, for example, using the apparel management system.

In another implementation, the laser finishing is before the garment is assembled. Specifically, before the material is cut, fabric rolls or sheets of material are finished using the laser. The finishing is based on style or customization selected by the customer in the order. Then the material is cut into panels, and the panels are assembled into the garment.

After manufacture of the garments of the order is complete, the apparel management system controls distribution, shipping, and delivering of the ordered garments to the customer. The apparel management system can send the customer tracking information for the order so that the customer can track the order.

Depending on various factors which may delay manufacture of some items, an order with multiple items may be sent to the customer in multiple partial shipments rather than a single complete shipment. The items not shipped at the same time will be shipped later when available. The apparel management system handles communicating with the customer regarding delays and provides an estimate of when the customer can expect to receive the items of the order.

Figure 22:
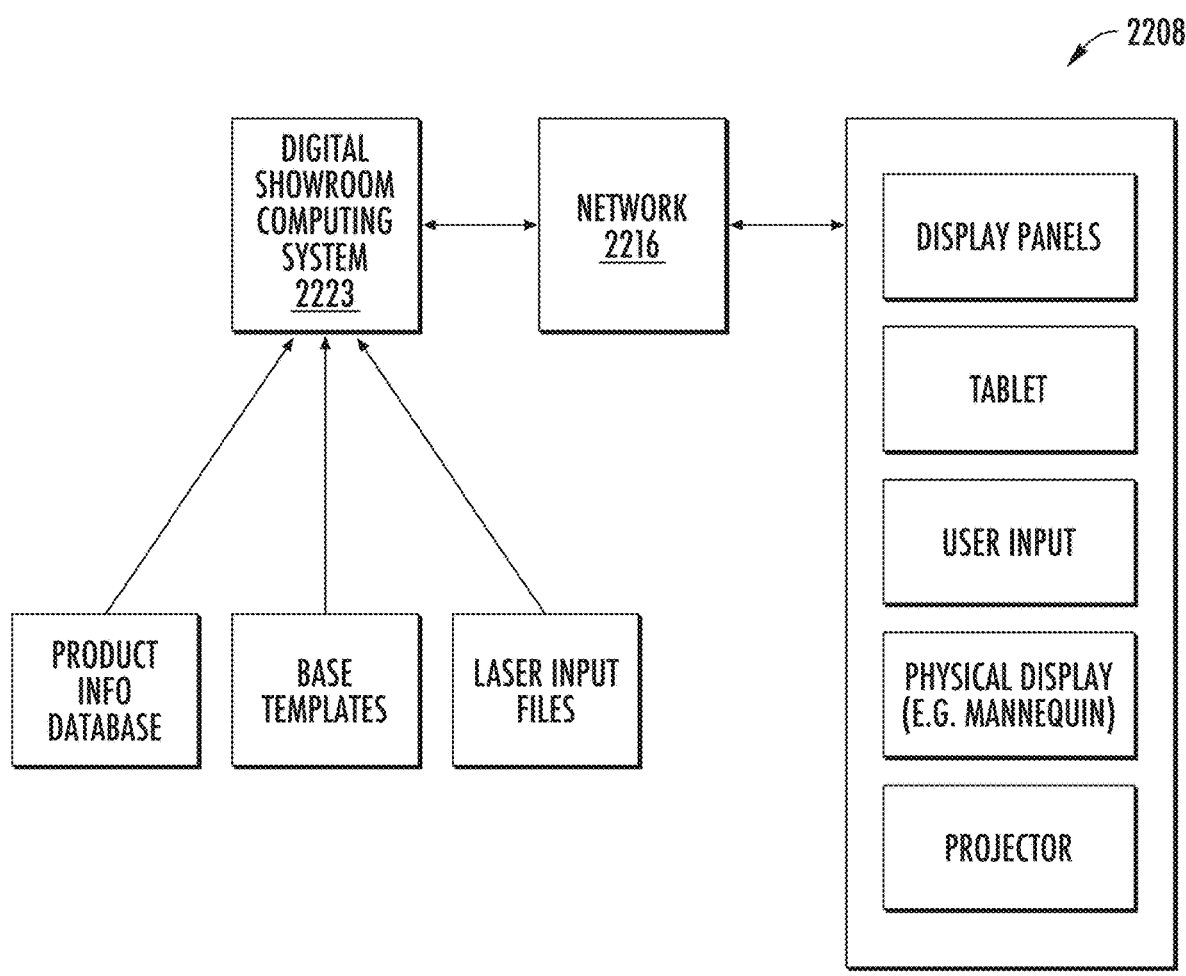
FIG. 22 shows a block diagram of a digital showroom system.

Digital Showroom Tool. FIG. 22 shows a block diagram of a digital showroom system, in an implementation, The digital showroom system can be part of the sales and ordering component 2126 of the apparel manufacturing and sales system 2122. A digital showroom 2208 is a sales showroom where customers can visit and see apparel products, select products, and then enter orders. The digital showroom can include large display panels or projectors for customers to view, one or more tablet devices, user input devices (e.g., keyboard, mouse, pointer, touch screen, or touch panel), physical displays (e.g., mannequins, models, sample base fabric templates, and other samples), and one or more projectors for use with the physical displays.

The digital showroom 2208 is connected via a network 2216 to a digital showroom computing system 2223, which controls operation of the devices and tools available in the digital showroom. The network can be a computer network. The digital showroom computing system has access to a product info database (e.g., product lifecycle management (PLM) database), base templates, and laser input files. Previews of garment products can be shown on the display panels, tablet, or on the physical displays, or any combination of these.

The digital showroom can include large display panels or projectors for customers to view, one or more tablet devices, user input devices (e.g., keyboard, mouse, pointer, touch screen, or touch panel), physical displays (e.g., mannequins, models, sample base fabric templates, and other samples), and one or more projectors for use with the physical displays.

The digital showroom 2208 is connected via a network 2216 to a digital showroom computing system 2223, which controls operation of the devices and tools available in the digital showroom. The network can be a computer network. The digital showroom computing system has access to a product info database (e.g., product lifecycle management (PLM) database), base templates, and laser input files. Previews of garment products can be shown on the display panels, tablet, or on the physical displays, or any combination of these.

Figure 23:
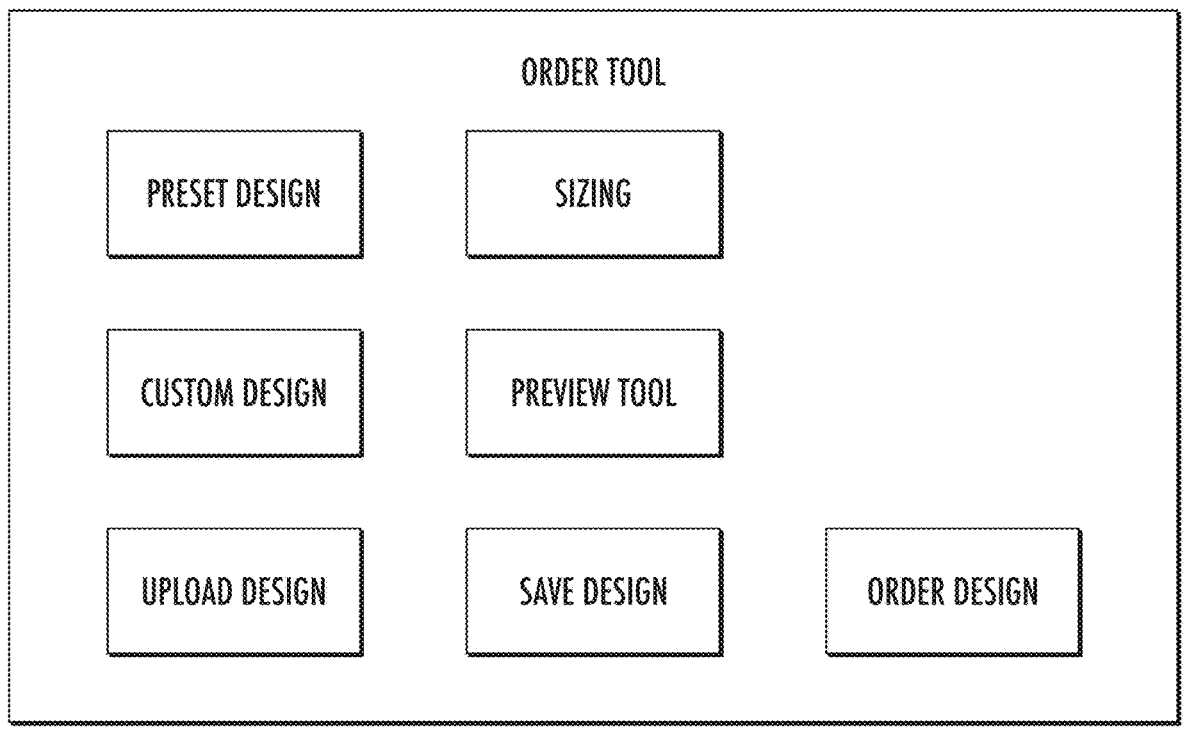
FIG. 23 shows an order tool.

Order Tool. FIG. 23 shows an order tool 2301, which can be a tool that is part of the digital showroom system. Using the order tool, the customer can order a garment for manufacture and delivery. The order tool allows the customer to select a design, preview the design, and order the design. The customer can select a preset design, make a custom design, or make semicustom design. A semicustom design is a design based on a previous design, such as a preset design or a previously saved design, which is modified to obtain a new design. The tool also allows the customer to upload a design or a portion of a design to be manufacture. For example, an image can be captured by a camera, which is then uploaded via the order tool. The order tool allows selection of sizing.

Surface Projection. FIGS. 24-29 describe a projector preview tool. The projector preview tool allows a user to design garments, such as using the digital brief tool, and see the designed garment projected onto a surface in real life. The surface does not need to be flat. In fact, the projector tool may use a mannequin of a person or a part of a person, to project with light onto the surface of the mannequin. This gives the user a good idea of how the apparel may appear in the real world, without manufacturing the garment. This tool can be used to project a wear pattern or another finishing pattern (e.g., from a laser input file) onto a physical pair of jeans in a particular base fabric template being worn by a mannequin, person, or another physical object. Then the user will be able to physically see what the jeans will look like after laser finishing.

To allow a preview of a product preview, the user or viewer is able to project a selected wear pattern (e.g., laser input file) onto a garment (e.g., base fabric template) in the room. In order to maintain a realistic image preview the image is altered (e.g., warped or distorted) such that it will show up correctly when projected on a nonflat surface. In addition, the image will be reinverted to show high intensities as brighter. This is because the laser input file is a negative image, where dark pixels will result in the bright points on lasered jeans. Once the image can be projected, an image sensor will help determine the accuracy of the preview and optimize the brightness values being projected if needed. The image sensor is an optional feature, and may be omitted if additional feedback and enhancement of the projected results are not desired.

Figure 24:
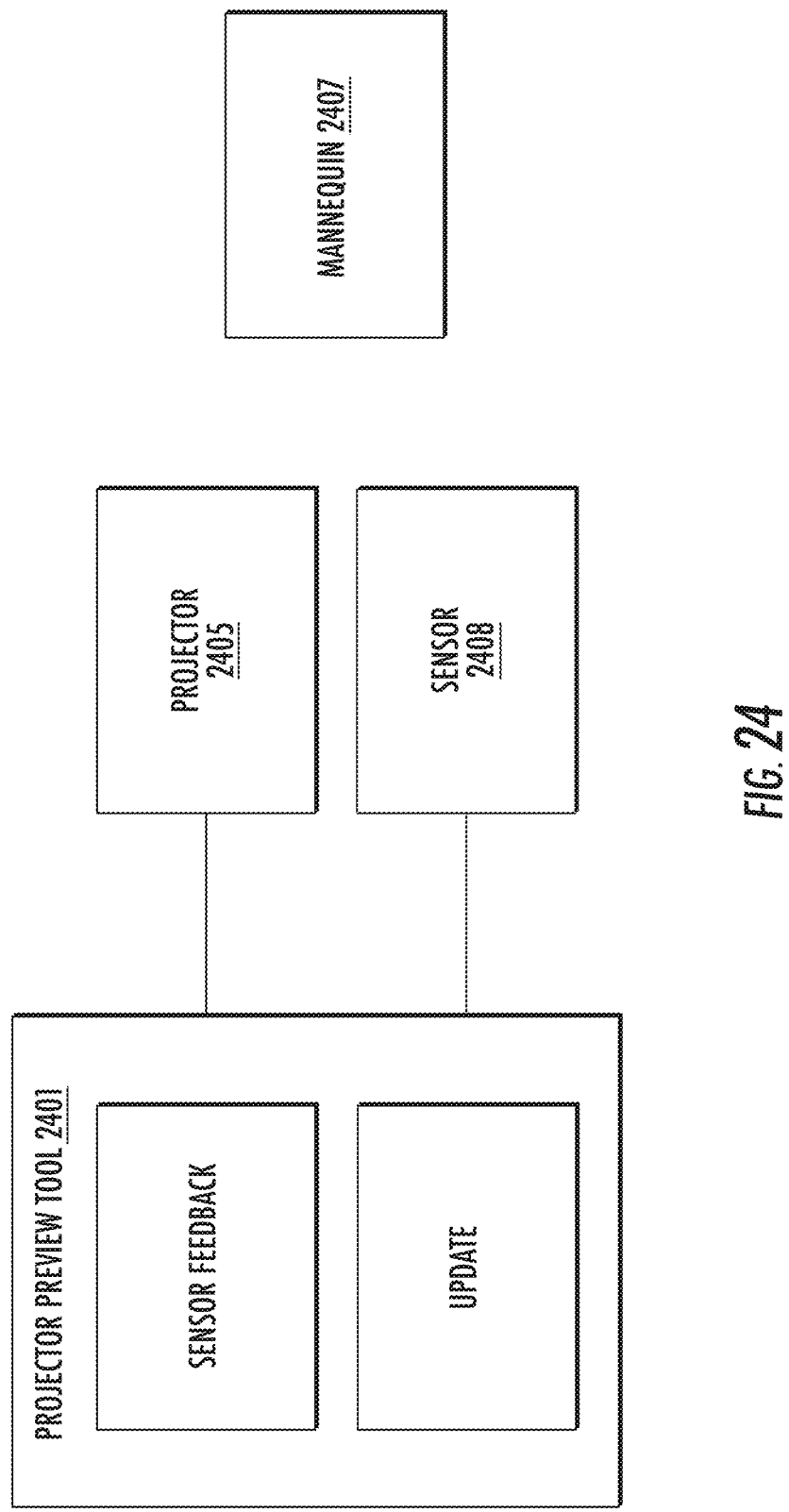
FIG. 24 shows a system diagram for a system that includes a projector preview tool.

FIG. 24 shows a system diagram for a system including the projector preview tool 2401. The tool is coupled to a projector 2405 that projects light onto a mannequin 2407. The tool is also coupled to a sensor 2408 that is capturing images of the mannequin 2407, such as when the projector 2405 is projecting onto the mannequin 2407. The tool includes a sensor feedback and updates features. The sensor feedback feature receives images from the sensor 2408. The update feature processes images and determines, based on the images, whether or not the projector 2405 should modify the projected image.

Figure 25:
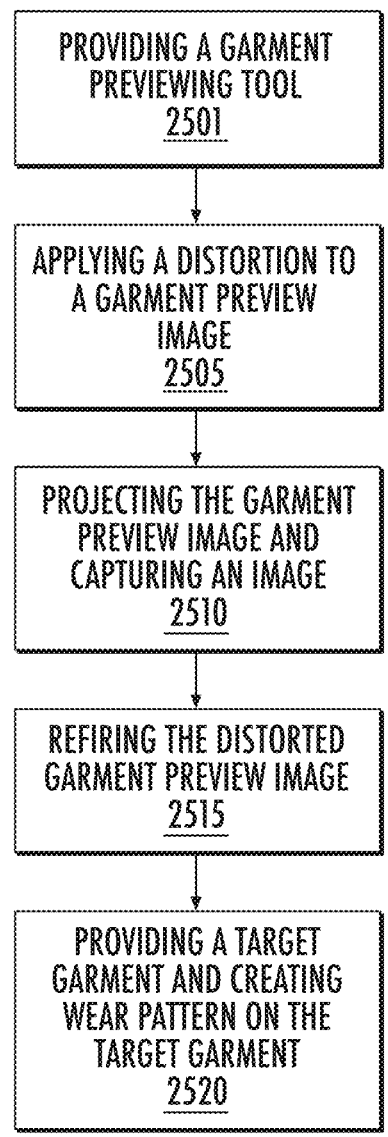
FIG. 25 shows a flow diagram for a system that includes the projector preview tool.

FIG. 25 shows a flow diagram for a system including the projector preview tool. In a step 2501, the system includes providing a garment previewing tool. The garment previewing tool may be the digital brief tool, as described elsewhere in this application. The digital brief may provide various options for a user, such as providing options for the user to select a base garment image. For example, the base garment image may be a jeans base garment. The base garment image may be composed of any material suitable for laser finishing. The user may also select a wear pattern, associated with a laser pattern file that may be processed to create the wear pattern onto a target garment corresponding to the base garment image. The user may also modify the position, the sizing, or a combination, of the wear pattern. For example, as the base garment image is shown, the user may modify the position, the sizing, or the combination, of the wear pattern. In response to, or in near real-time, the system may show the user the modifications, without needing to first manufacture the target garment. Using the garment previewing tool, the user may also add a garment feature and modify the sizing or positioning of the garment feature. Some garment features included with the garment previewing tool includes a label, fastener, buckle, embellishment, embroidery, grommet, heat transfer pattern, lace, patch, printing, foil, ribbon, tab, foil, rivet, sequin, pocket, thread, or zipper.

In a step 2505, the system includes applying a distortion to a garment preview image. The garment preview image may be a garment preview image of a jeans base image and selected wear pattern, with modified sizing or modified positioning, or a combination, generated with the garment previewing tool. The distortion may approximate how the jeans base image and selected wear pattern, with modified sizing or modified positioning, or a combination, needs to be modified to appear on a three-dimensional mannequin. The 3D mannequin may be an incomplete body, such as just the legs, top, torso, upper body (e.g., torso, arms, neck, or other upper body portions) or any combination of these. For example, the lights will mimic how the garment preview image will appear, when modified to adapt to the contours and shape of the 3D mannequin.

In an implementation, before projecting, the system may use a structured light technique to determine contours of the three-dimensional mannequin. For example, the structured light may include a known light pattern. By shining the known light pattern onto the 3D mannequin, the system determines how the light pattern is appearing and can determine the contours of the 3D mannequin.

In a step 2510, the system includes projecting the garment preview image and capturing an image. For example, the garment preview image, as projected onto the 3D mannequin, is captured using a camera.

In a step 2515, the system includes refining the distorted garment preview image. For example, the system may determine whether the results of the garment preview image on the 3D mannequin, based on the captured image, is within a tolerance of how the garment preview image should appear. As a example, the system determines whether the preview image is properly projected as either too large (so that the garment preview image extends past edges of the 3D mannequin), too small (so that the garment preview image does not extend to edges of the 3D mannequin), improperly centered, does not match a contour of the three-dimensional mannequin, warp, brightness level, color balance, saturation level, hue, or any combination of these. The step of projecting the garment preview image and capturing the image may be repeated. For example, as updates are made to the distorted garment preview image, the system may calculate a difference ratio of the distorted garment preview image to how it should appear. If the difference ratio is greater than a threshold, steps 2505, 2510, and 2515 may be repeated.

In a step 2520, the system includes providing a target garment and creating a wear pattern on the target garment. The target garment includes a real-world version of the base garment selected by the user. For example, the target garment is a pair of jeans, adapted for laser finishing. From the input with modified sizing or positioning from the user, the target garment is finished with the wear pattern. The target garment may be created using the garment preview image identified above. The garment preview image may be generated before creating the wear pattern on the target garment.

Figure 26:
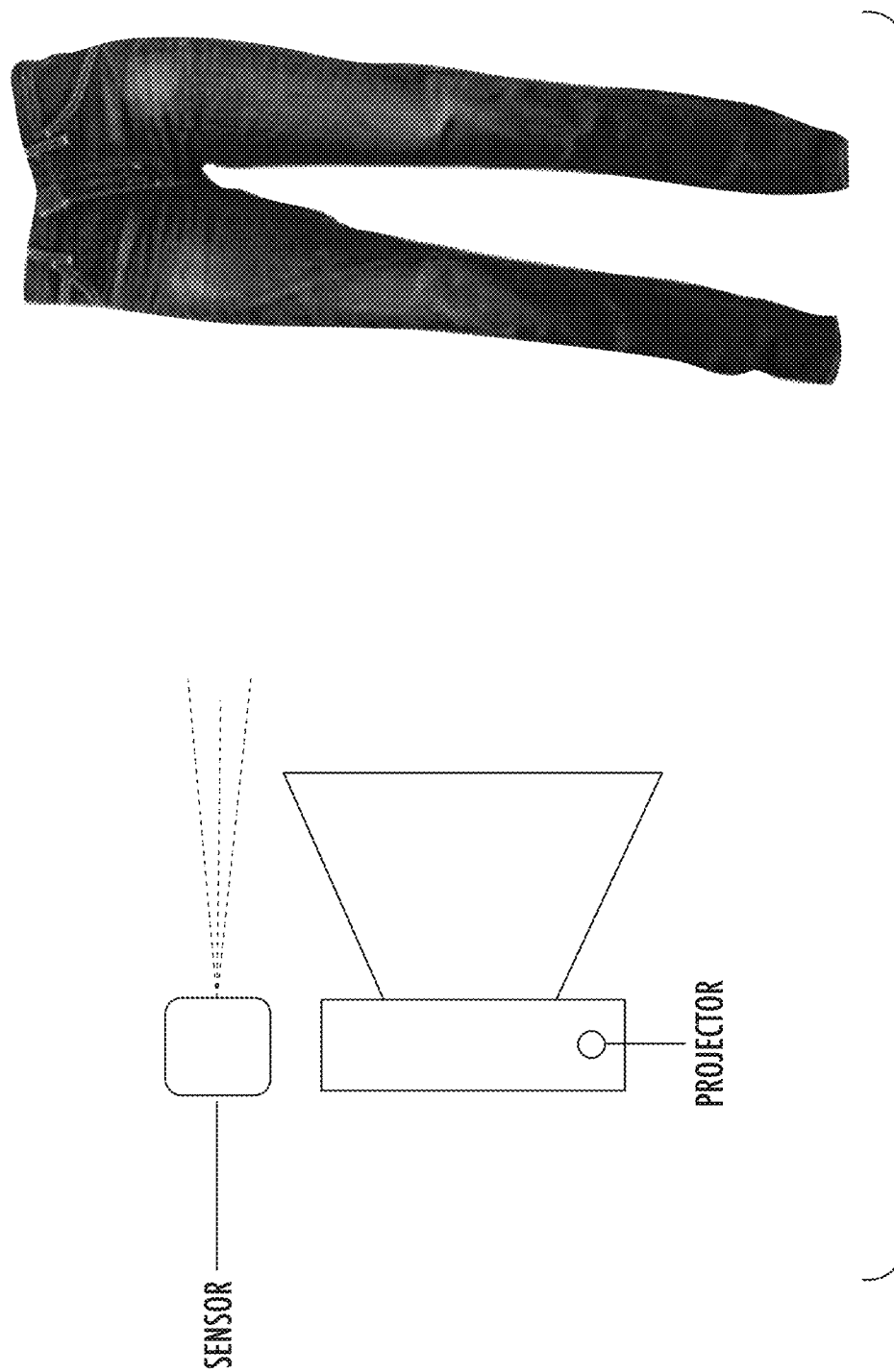
FIG. 26 shows a projector used to project a wear pattern onto jeans.

FIG. 26 shows a projector 2601 used to project a wear pattern onto jeans. The projector takes as input a laser input file with wear pattern. The jeans are placed on a mannequin or model 2605. Different mannequins may be used by the projector preview tool for different purposes. There may be different mannequins for different sizes and shapes of garments. For example, different mannequins may be used for garments that are meant to be looser or baggier or for different fit types (e.g., skinny, straight, athletic).

In an implementation, the tool uses a structured light technique to calibrate a projector. In this technique, a known pattern is projected onto a mannequin. The results of the projection are captured by the camera. Because the pattern of light being projected is known, a warping of the projected pattern around the mannequin can be used to calculate a size and a shape of the mannequin. Based on the results of the calculation, initial measurements for how to warp a garment image to appear are made.

Since the jeans are being worn, there will be surface contours and the jeans will not be flat. And the jeans may be angled with respect to the projector lens. However, the laser input file is for jeans when flat, not worn. This is because the jeans will be lasered while flat. In order to project the laser input file correctly onto the worn jeans, a mathematical transformation is performed. This transformation alters (e.g., warps or distorts) the image file. This results in an accurate projector preview of the worn jeans with a laser finishing pattern.

There can also be a sensor 2603 which receives feedback on the projected image, and makes adjustments or corrections to make the projected image more accurate. For example, the jeans may be worn by a model who walks across the room or to different locations in the room, and the projector and sensor will work together to make changes so that the wear pattern will be accurately displayed on the jeans.

Figure 27:
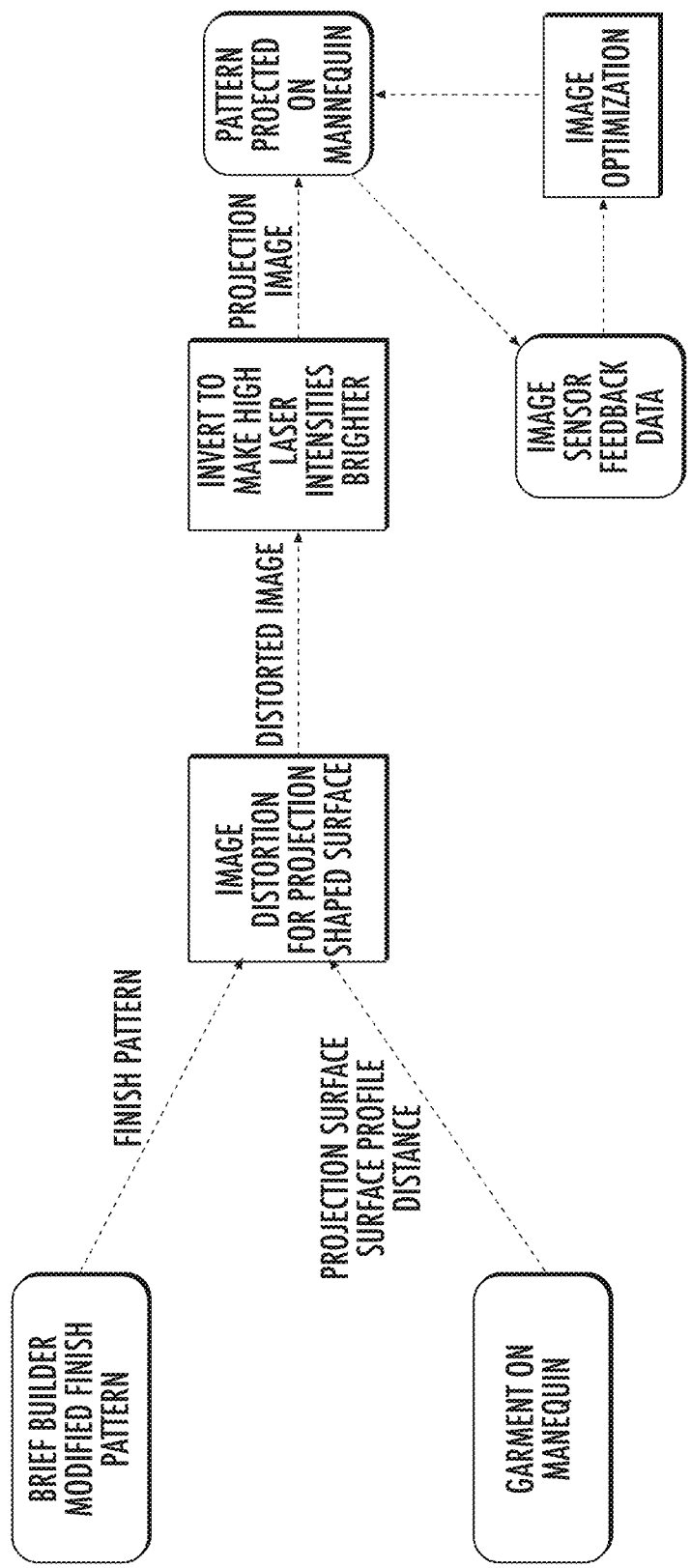
FIG. 27 shows flow for a projector preview tool.

FIG. 27 shows flow for a projector preview tool. As inputs, there are a finish or wear pattern (e.g., laser input file) and a garment (e.g., base fabric template) on a mannequin or model. For the garment on a mannequin, a projection surface is determined, a surface profile is determined, and a distance is determined. These are input to an image distortion for projection on shaped surface process to generate an altered (e.g., warped or distorted) image. The image is inverted to make high laser intensities brighter. The inverted image is used as a projection image to project the pattern onto the mannequin.

There can also be a feedback loop for image optimization. An image sensor gathers feedback data from the projected pattern. This feedback data is used to optimize the image. More detail is provided below in FIG. 29.

FIG. 28 shows a technique of shape projection. With a 3D mapping of the finish pattern, multiple views can be produced through rotations about a specified axis. There is a matrix for rotation Z, rotation Y, and rotation X. There is a matrix for scaling in three dimensions. There is a matrix for translation in three dimensions. By matrix multiple, these matrices are used to calculated new X, Y, and Z coordinates at a desired rotation angle. As an example, a vector X, Y, Z is multiplied by the rotation Z matrix to determine new X, Y, Z coordinates rotated by theta degrees about Z.

In FIG. 28, the variables are: $\theta$=rotation angle about Z; $\beta$=rotation angle about Y; $\alpha$=rotation angle about X; Sx=scale factor in X; Sy=scale factor in Y; Sz=scale factor in Z; Tx=translation in X; Ty=translation in Y; Tz=translation in Z; X=current X position; Y=current Y position; and Z=current Z position.

Figure 29:
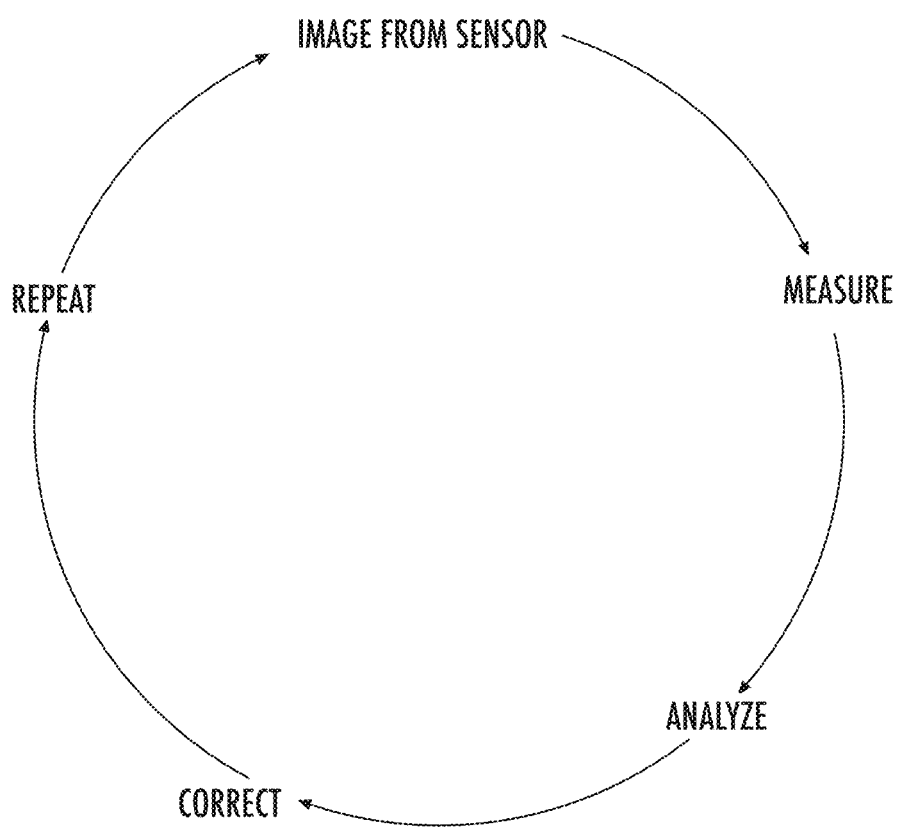
FIG. 29 shows a feedback technique to optimize or enhance the accuracy of the projector preview.

FIG. 29 shows a feedback technique to optimize or enhance the accuracy of the projector preview. This may be represented as a feedback loop 2901. For the image from the sensor, an image is taken of the projector preview output. For measure, the result will be scaled and overlaid to an internal image for a comparison of what the projector should be displaying. For analyze, determine the corrections (e.g., pixel-based brightness adjustments) used to bring output closer to intended output. For correct, perform brightness corrections. For repeat, repeat until projector output is within tolerance of the intended image.

Figure 30:
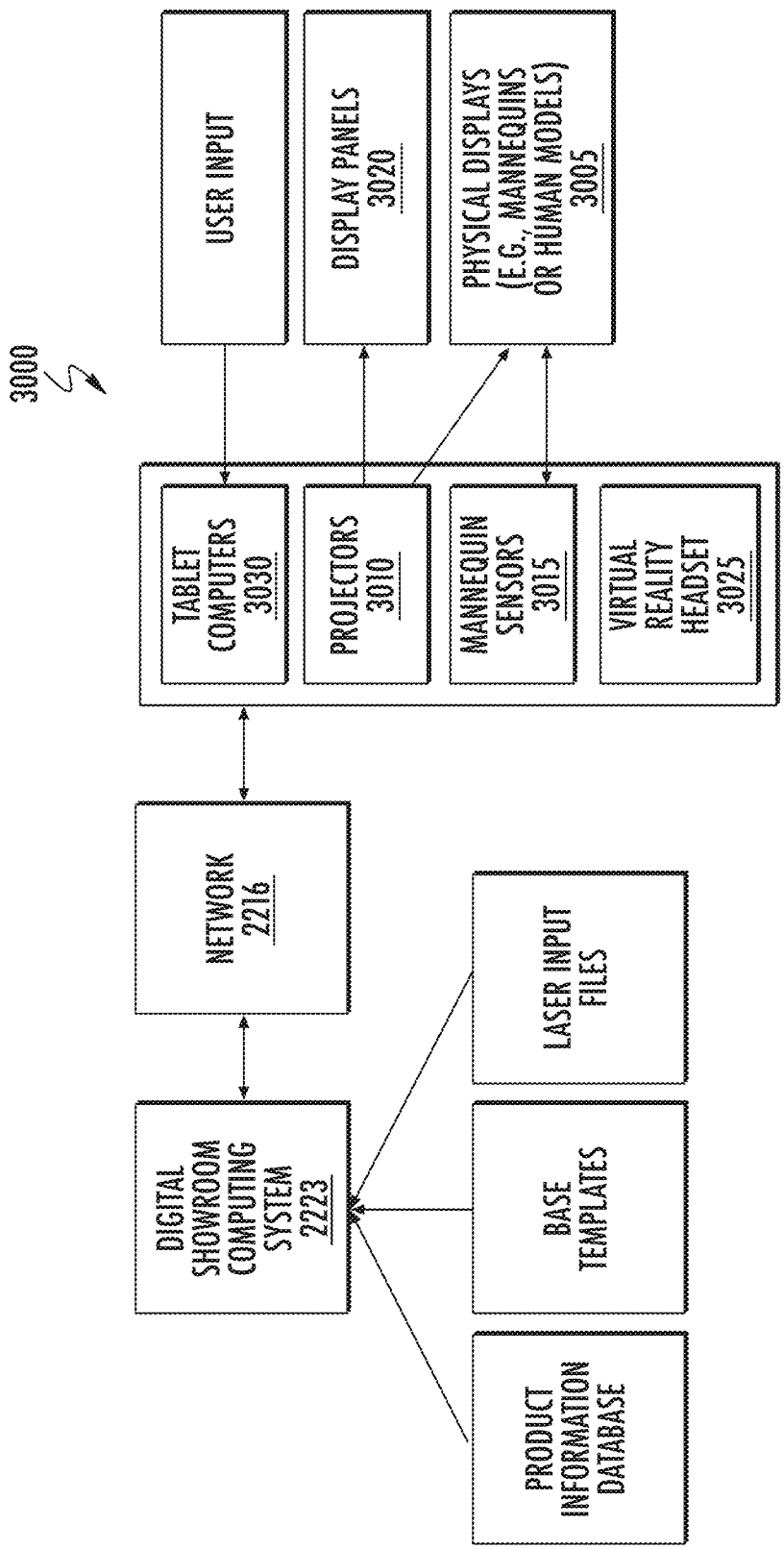
FIG. 30 shows a block diagram of a digital showroom 3000, in an implementation.

FIG. 30 shows a block diagram of a digital showroom 3000, in an implementation. Digital showroom 3000 may be similar to digital showroom 2208 described above where digital showroom 3000 is a sales showroom in which customers can preview apparel products, select products for purchase, and then enter purchase orders for the selected products.

Digital showroom 3000 can be part of the sales and ordering component 2126 of the apparel manufacturing and sales system 2122 or can be part of other systems, such an assortment tool builder (described below), a sell-in tool (described below), or other tools that operates one or more of the digital showroom computing system 2223, the control computer systems 2609 (e.g., a tablet computer), or other computer systems.

Digital showroom 3000 may include a number of physical displays 3005. The physical displays may include mannequins, human models, or both. The physical displays may include a number of mannequins, such as two or more mannequins, on which one style of garment may be positioned or on which a variety of styles of garments may be positioned. For example, different styles of jeans may be placed on the different mannequins allowing customers to preview a variety of finishing patterns on the different jeans allowing for fewer garment changes on the mannequins while allowing for a large variety of garments to be previewed.

The digital showroom may include a number of projectors 3010 that can project a variety of garment options (e.g., finishing patterns) onto the garments on the physical displays. For example, different styles of jeans may be placed on the different mannequins allowing customers to preview a variety of finishing patterns on the different jeans allowing for fewer garment changes on the mannequins while allowing for a large variety of garments to be previewed. Digital showroom 3000 may include a number of sensors 3015 that can operate in conjunction with the projectors to calibrate the projectors. The showroom may also include one or more virtual reality (VR) headsets 3020. The VR headsets are described further below.

Digital showroom 3000 may include a number of display panels 3025 on which a variety of garments may be projected from the number of projectors. The display panels may be relatively large panels, such as having dimensions of 1×1 meters (i.e., 1 meter high and 1 meter wide), 1×2 meters, 2×2 meters, 5×5 meters, 10×10 meters, or other lengths.

The digital showroom can include one or more computer systems 3030, user input devices (e.g., keyboard, mouse, pointer, touch screen, or touch panel). The computer systems may include personal computers, tablet computers, graphical processor systems, other computer systems, or any combination of these systems. Each computer system 3030 can be any of the computer systems described above, such as system 1012, 1016, 1019, 1022, 1101, 1301, 1401, 1501, or other systems. The computer systems may be connected to the digital showroom computing system 2223 via network 2217 as described above with respect to FIG. 22. The computer system may store and operate computer code to control images or video that is displayed on the display of the computer systems, transferred to the projectors, VR headsets, or other components for projection by the projectors onto the physical displays and display panels and for display by the VR headset.

Figure 31:
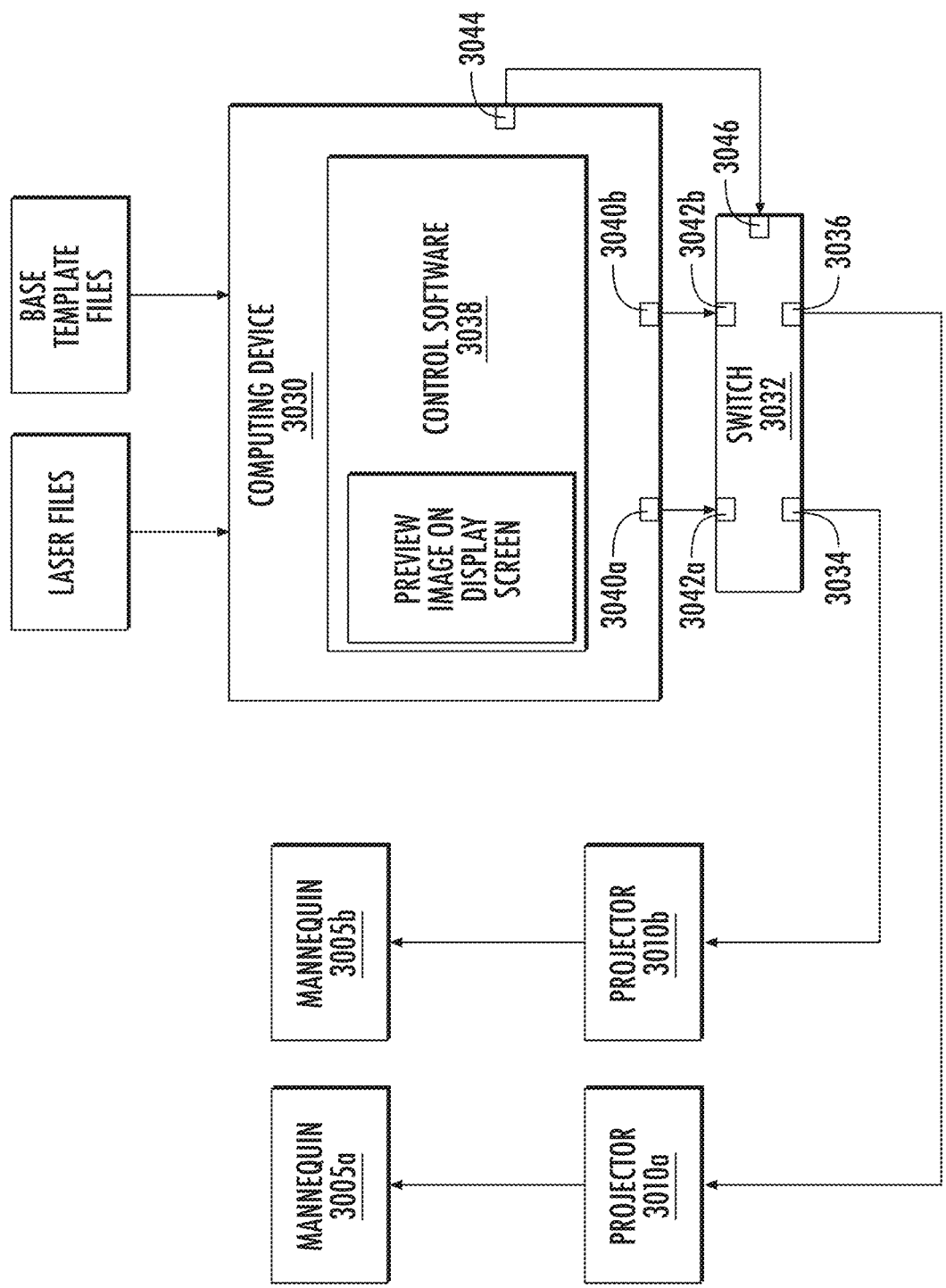
FIG. 31 shows a system block diagram of digital showroom 3000.

FIG. 31 shows a system diagram of a digital showroom. This digital showroom is a facility where an apparel manufacturer or seller can show garments or a collection of garments to a buyer or purchaser (e.g., buyer for retail or online stores). The buyer will be able to see the physical items and make decisions about items to purchase for the upcoming season or other period of time.

The digital showroom has mannequins 3005a and 3005b, which will allow the buyer to physically view a garment. In a specific implementation, the garments are jeans, shorts, shirts, jackets, or other garments with a particular pattern (e.g., wear pattern), which the apparel manufacture will produce on a garment using laser finishing. The laser-finished garments can be placed on a mannequin for the buyer to see. Alternatively, only base templates of the garments are placed on a mannequin. These base template garments do not have a laser finished pattern on them. Rather, a projector (e.g., 3010a or 3010b) is used to project the pattern onto the garment. The buyer will be able to see the physical item with the pattern, as if the garment had been laser finished. This allows the seller to show sample garments without having to manufacture each different item in a catalog of items presented to the buyer.

When the buyer wants to view an item with a different pattern, then the projector can project the different pattern selected by the buyer onto the garment instead. This allows the buyer to see the different item without the seller having to change the garment on the mannequin.

Although the above example describes how different laser patterns can be displayed on base template garments using a projector. The projector can also show garments that differ not only by the laser pattern, but by, for example, tinting, damage, and other visible features.

In an implementation, the digital showroom has two or more mannequins, which allows a buyer to see multiple garments at the same time. Each mannequin may have the same pose or different pose to allow for a variety of views. One pose may be a front view, another pose may be a side view, another pose may be a back view, another pose may be legs together, another pose may be legs spread apart, another pose may be one leg off the ground, another pose may be knees bent, another pose may be one or both legs bent, another pose may be squatting, another pose may be a hip view, another pose may be a seated view, another pose may be a running view, another pose may be a jumping view, another pose may be a kicking view, and other poses.

By having multiple mannequins, this permits the buyer to make a side-by-side comparison of garments. In an implementation, the showroom has 2, 3, 4, 5, 6, 7, or 8, or other number of mannequins. A first base template can be placed on a first mannequin (e.g., 3005a), while a second base template can be placed on a second mannequin (e.g., 3005b). The first base template is different from the second base template. The first mannequin will be used to show garments associated with the first base template, while the second mannequin will be used to show garments associated with the second base template.

In an implementation, a first base template can be placed on a first mannequin having a first pose, while a first base template can be placed on a second mannequin having a second pose, different from the first pose. For example, the first pose can be a front view while the second pose can be a back view. There can be two additional mannequins for a second base templates, front and back views.

This figure shows how showroom information is transmitted, received, and used in the digital showroom and shows components that control the transmission, receipt, and use of the showroom information.

The digital showroom has computer or computing device 3030 which the seller and buyer use to select garments to view on the mannequins. The computing device can also be used to select and order garments. In an implementation, the computing device is a tablet computer, such as an Apple iPad, with a touchscreen interface. Via software (e.g., control software 3038) The buyer will be able to select and view preview images on the screen of the device.

The computing device is connected to a network, such as an internal network or the Internet, to access files such as laser files (which include a wear or other laser-finishing pattern) and base template files, which are used to generate the on-scree preview image). The connectivity can be wireless (such as Wi-Fi or a cellular or mobile broadband network).

The computing device has an output port (e.g., Apple Lightning port) that can be used to directly output to video to projectors 3010a and 3010b. For example, the output port can be connected to a video display splitter (e.g., USB-C, Thunderbolt, or other display output splitter). Additional adapters may be used from the display splitter to the interfaces used on the projectors, such as VGA, DVI, HDMI, or DisplayPort.

The control software has a routing or switching table or database to determine which laser file should be used for a display output (or projector). For example, this table will identify a first base template is associated with mannequin 3005a and a second base template is associated with mannequin 3005b. Also, this table can identify poses associated with the mannequins. When the user selects a particular garment to view, the control software will determine which base template (e.g., first or second base template) the selected garment uses and which laser file. Then, the control software refers to the routing table to determine which mannequin and projector is associated with the selected base template. Then, the control software directs the appropriate projector to project the selected laser file onto the mannequin with the selected base template.

In an implementation, first and second mannequins have first base template, but the first mannequin has a first pose, a front view, and the second mannequin has a second pose, a back view. This information is reflected and stored in the routing table. Upon selection of a garment to view using the first base template, the control software selects the appropriate wear or laser pattern for the selected garment. The control software directs the first projector to display a front laser pattern of the first mannequin and the second projector to display a back laser pattern, which is associated with the front laser pattern. The laser files for front and back are typically in stored different files.

In an implementation, first and second mannequins have first base template, but the first mannequin has a first pose, a first frontal view (e.g., standing), and the second mannequin has a second pose, a second frontal view (e.g., jumping). This information is reflected and stored in the routing table. Upon selection of a garment to view using the first base template, the control software selects the appropriate wear or laser pattern for the selected garment. After the appropriate laser pattern is identified, the control software performs graphical transformations or manipulates on the laser pattern to match the first pose (e.g., standing view). And this first manipulated laser pattern is displayed on the first mannequin via the first projector. The control software further performs graphical transformations or manipulates on the laser pattern to match the second pose (e.g., jumping view). And this second manipulated laser pattern is displayed on the second mannequin via the second projector.

In an implementation, first and second mannequins have first base template, but the first mannequin has a first pose, a first frontal view (e.g., standing), and the second mannequin has a second pose, a second frontal view (e.g., jumping). This information is reflected and stored in the routing table. Upon selection of a garment to view using the first base template, the control software selects the appropriate wear or laser pattern for the selected garment. Instead of the control software performing graphical transformations or manipulations as discussed in the above example, the graphical transformations or manipulations for the poses have been previously calculated or determined. Then based on the routing table, the control software would select a first manipulated laser pattern (previously calculated and stored) appropriate for the first pose to display on the first mannequin. The control software would select a second manipulated laser pattern (previously calculated and stored) appropriate for the second pose to display on the second mannequin. Then, the control software would not need to perform the graphical transformations or manipulations.

In an implementation, the routing or switching table can be implemented with additional hardware such as an external graphics board or another computing device or computer (which includes a graphics board). Typically, a single graphics board has multiple output ports and can display to multiple displays or projectors. Multiple graphics boards can also be used to allow for greater numbers of previews, depending on the number of projectors and mannequins in a showroom.

In an implementation, the first computing device 3030 is connected to a switch 3032, and the switch is connected to the projectors. The connections can be wired connections, wireless connections, or a combination of wired and wireless connections. If the showroom includes two or more computing devices, these computing devices may each be connected to a switch that is connected to two or more projectors. The connection from the computing device to the switch may include one or more connections.

In an implementation, a first connection may connect a first video output port 3040*a* of the computing device to a first video input port 3042*a* of the switch. In a further implementation, a second connection may connect a second video output port 3040*b* of the computing device a second video input port 3042*b* of the switch. A third connection may connect a control port 3044 of the computing device to a control port 3046 of the switch. Both the first and third connections may be through a single connector type and through a single cable. Both the first and third connections may alternatively be wireless connections.

In an implementation where the computing device is a tablet computer (e.g., an iPad or an iPad pro), the tablet computer may include the first video output port but may not include the second video output port. The first video output port may be the Lightning port of an iPad tablet or may be a USB output port of other types of tablet computers. The output from the tablet computer can drive the switch (e.g., external graphics or computer). In an implementation, the tablet computer can be a user-friendly interface that drives a computer or switch having the graphic card, which connects to the projectors. The tablet computer can be connected wirelessly thought a network or the Internet to the computer or switch.

In an implementation where the computing device is a personal computer, the personal computer includes the first, second, or both video output ports. The first and second video output ports can be the video output ports of one video board or two different video boards. The video output ports of a personal computer can be HDMI output ports, DVI ports, DisplayPorts (DPs), VGA ports, USB ports (e.g., USB-C ports), or other types of video ports, or may be wireless ports.

Switch 3032 can be a software switch, a hardware switch, or a combination of software and hardware components that form the switch. The switch can be a software multiplexer, a hardware multiplexer, or a combination of software and hardware components that form the multiplexer. The switch can be an internal switch or an external switch of the computing device. In an implementation where the computing device is a tablet computer that may have one video output port, the switch is an external switch. In an implementation where the computing device is a personal computer, the switch can be an internal switch or an external switch.

In an implementation, the switch includes a first video board 3024 and a second video board 3026. The video boards can include video cards that are located in the computing device. For example, in an implementation where the computing device is a personal computer, the video boards may be video cards that are included in the computing device. In an implementation where the computing device (e.g., a tablet computer, such as an iPad) includes one video board, the switch may be components that is an external component and is not included in the computing device.

In an implementation where the projectors include video processing capability, such as projectors that are personal computer projectors or that include graphical processing capabilities (e.g., include graphical processing units) the switch may not include video boards. That is, the computing device and switch may be adapted to transfer image files or video files to the personal computer projectors where the personal computer projectors include video boards that drive image or video output.

In an implementation, the switch is a GPU computing device that can receive image or video files from the computing device and drive images or video to the projectors for projection from the projectors onto the mannequins or display screens.

The computing device in operation with the switch and one of the projectors (e.g., projector 3010*a*) can drive and project an image or video onto one mannequin (e.g., mannequin 3005*a*) while the other projector (3010*b*) does not project an image or video onto the other mannequin (e.g., mannequin 3050*b*). The computing device in operation with the switch and one of the projectors (e.g., projector 3010*b*) can drive and project an image or video onto one mannequin (e.g., mannequin 3005*b*) while the other projector (3010*a*) does not project an image or video onto the other mannequin (e.g., mannequin 3050*a*).

The computing device in operation with the switch and one of the projectors (e.g., projector 3010*a*) can drive and project a first image or first video onto one mannequin (e.g., mannequin 3005*a*) while the computing device in operation with the switch and the other projector (e.g., projector 3010*b*) can drive and project a second image or second video onto the other mannequin (e.g., mannequin 3005*b*). The computing device in operation with the switch and one of the projectors (e.g., projector 3010*b*) can drive and project the first image or first video onto one mannequin (e.g., mannequin 3005*b*) while the computing device in operation with the switch and the other projector (e.g., projector 3010*a*) can drive and project the second image or second video onto the other mannequin (e.g., mannequin 3005*a*).

The computing device can control the above described modes of image or video transfer via one or more control signals output from the control output port 3044 and received by the control signal input port 3046 of the switch. For example, in an implementation where the computing device includes one output port 3040*a*, but does not include output port 3040*b*, the first image or first video can be transferred from the output port 3040*a* to the input port 3042*a* of the switch, and the control signal can be used by the switch to direct the first image or first video to the first video board 3034*a*. And the second image or second video can be transferred from the output port 3040*a* to the input port 3042*a* of the switch, and the control signal can be used by the switch to direct the second image or second video to the first video board 3034*a* or to the second video board 3034*b*. A set of control signals can also be transmitted from the control output port to the control input port so that the first image or first video is directed to the second video board 3036 and the second image or second video is directed to the first video board 3034.

Sets of control signals can also be transmitted from the control output port to the control input port so that an image or video is directed to the first or second video board and no image or video is directed to the other of the first or second video board. Thus, only one of the first video board or the second video board will drive an image or video to one of the projectors for projection onto a mannequin and the other of the projectors will not receive an image or video and will remain dark (e.g., not project an image or video onto the other of the mannequins).

The table below is a sample implementation, which summarizes the operating states of switch 3032 where one or more images, videos, or both an image and a video may be input into input ports 3042a and 3042b from output ports 3040a and 3040b of the computing device. The table summarizes how the images may be output from output ports 3034 and 3036 (e.g., output ports of video boards 3034 and 3036) of the switch to the projectors that are connected to the output ports. In an implementation where no image or video is output from an output port of the switch, the projector connected to that output port may not project an image or video and may be "dark." Thus, the mannequin that is associated with the dark projector may not have an image or video projected onto the mannequin by the projector and may also be "dark." The table shows example control signals that can be transmitted by the computing device for configuring the switch.

TABLE

| Control Signal | Switch Input 1 (Input Port 3042a) | Switch Input 2 (Input Port 3042b) | Switch Output 1 (Output from Video Board 3034) | Switch Output 2 (Output from Video Board 3036) |
|---|---|---|---|---|
| 000 | Image 1 | No Image Input | Image 1 | No Image Output |
| 001 | Image 1 | No Image Input | No Image Output | Image 1 |
| 010 | Image 1 | Image 2 | Image 1 | Image 2 |
| 011 | Image 1 | Image 2 | Image 2 | Image 1 |
| 100 | No Image Input | Image 2 | Image 2 | No Image Output |
| 101 | No Image Input | Image 2 | No Image Output | Image 2 |

Other combinations of images or video can be transmitted when the showroom includes more than two projectors and more than two mannequins or human models. The switch can include additional input ports, additional output ports, or a combination of more input and output ports when the showroom includes two or more mannequins or human models. In an implementation, the switch can be a two input and two output multiplexer. A multiplexer with more or fewer inputs and more or fewer output may be included and used in the showroom. For example, a multiplexer with more or fewer input ports, output ports, or both may be included and used in the showroom when more or fewer mannequins or human models are used in the showroom. In an implementation, the switch is a one input and two output switch wherein input port 3042a and input port 3042b are a single input port and the output ports 3040a and 3040b of the computing device are a single output port. The switch can route input received on the single input port to either of the output ports.

The showroom can include more than one switch that is connected to the computing device or connected to other computing devices. For example, the showroom may include more than two switches when the showroom includes more than two mannequins. The switches may be connected to one or more tablet computers, one or more personal computers, one or more GPU computing devices, or other computing devices.

In an implementation, the mannequins or human models in the room may be in different poses or different rotational orientations (vertical rotations, horizontal rotation, or both). The images or video transmitted through the switch can be for the different poses. For example, when two mannequins are in the showroom that are in different poses, a first image (image 1) can be for a mannequin having a first pose and the second image (image 2) can be for a mannequin having a second pose. The computing device operating with the switch (e.g., as shown in the table) can direct images for the poses to the projectors associated with the posed mannequins.

The computing device can store and operate computer code 3038 for the showroom. Computer code 3038 may include the preview tool 1703, the digital brief tool 1803, other tools (e.g., an assortment tool builder (described below), a sell-in tool (described below), or any combination of these tools. The preview tool or the other tools allow for the selection of a base garment and finishing options (finishing pattern, damage, tint, or other options) for the base garment. The base garments and options for the base garments may be displayed as user selectable options in one or more menus (e.g., touch menus) on the display of the computing device.

After a base garment is selected from a menu, a base garment image for the base garment is displayed on the display of the computing device as a preview image. If the base garment template is on mannequin 3005a, then the control software operating on the computing device, the switch, and projector 3010a will operate to project the base image for the selected base garment template onto this mannequin. If the base garment template is on mannequin 3005b, then the control software operating on the computing device, the switch, and projector 3010b will operate to project the base image (see FIG. 19) for the selected base garment template onto this mannequin. The computing device may receive and store information that identifies either mannequin 3005a or 3005b as the particular mannequin that the base garment template is located on.

After one or more options are selected for the base garment from one or more menus, the base image and one or more option images are displayed on the display of the computing device as a preview image (i.e., final result image). This preview image may be formed from a preview image file that is a combination of a base image file for the base image, the base image HSL adjusted file for the base image HSL adjusted image, a laser pattern mask file (i.e., a laser file) for the laser pattern mask file input file, a solid color adjusted (tint) file for a solid color adjust laser (tint) image, a damages file for a damage image, or any combination of the optional files.

After one or more options are selected for the base garment from one or more menus, the preview image (e.g., the final result image) is projected onto mannequin 3005a if the base garment template is on this mannequin. The control software operating on the computing device, the switch, and projector 3010a will operate to project this preview image onto mannequin 3005a. If the base garment template is on mannequin 3005b, then the control software operating on the computing device, the switch, and projector 3010b will operate to project this preview image onto mannequin 3005b. The computing device may receive and store information that identifies either mannequin 3005a or 3005b as the mannequin that the base garment template is located on.

The above-described steps may be repeated for one or more another base garment templates that are located on one or more other mannequins so that other preview images (base image, final result images, or both) can be projected onto these one or more base garment templates. The above-described steps may also be repeated for the projection of one or more preview images (base image, final result images, or both) one or more human models or onto one or more of the display screens in the showroom.

As described briefly above, the control software may receive an input that identifies the base garments that are on the mannequins. The control software may also receive information that identifies the particular mannequins that the garments are on. For example, pairs of jeans may be both mannequins 3005*a* and 3005*b*. The pairs of jeans may have different styles, such as the 501™ style of jeans, the 502™ style of jeans, or other styles of jeans.

The control software may receive first information that identifies the garments on the mannequins as jeans having styles 510™ and 502™ and may receive second information for the 501™ style of jeans being on mannequin 3005*a* and the 502™ style of jeans being on mannequin 3005*b*. In an implementation where the control software receives information for the styles of garments that are on the mannequins, the control software may display finishing options for these styles of garments. The control software might not display finishing options for other types of garments (e.g., for jeans having style 514™ that are not on a mannequin). In an implementation, one garment may be on a mannequin and no garment may be on the other mannequin. The first information, the second information, or both may include information that indicates that one of the mannequins does not have a garment on the mannequin.

The received input that identifies the garment or garments (e.g., type and styles) on the mannequins and identifies the particular mannequins that the garment or garments are on, may be a user input received via a user input device (e.g., a touch interface of the display screen), may be an input received via network 2216 from the digital showroom computing system 2223, or other input device 2223.

After the control software receives the first and second information that identifies the garment or garments that are on one or more of the mannequins and identifies the particular mannequin or mannequins that the garment or garments are on, the computing device 3030, the control software 3038, the switch 3032, and the projectors may operate to one or more preview images of the garment or garments on the preview screen of the computing device, mannequins, display screen in the showroom, or any combination of these without additional user input or input from other computer systems.

Figure 32:
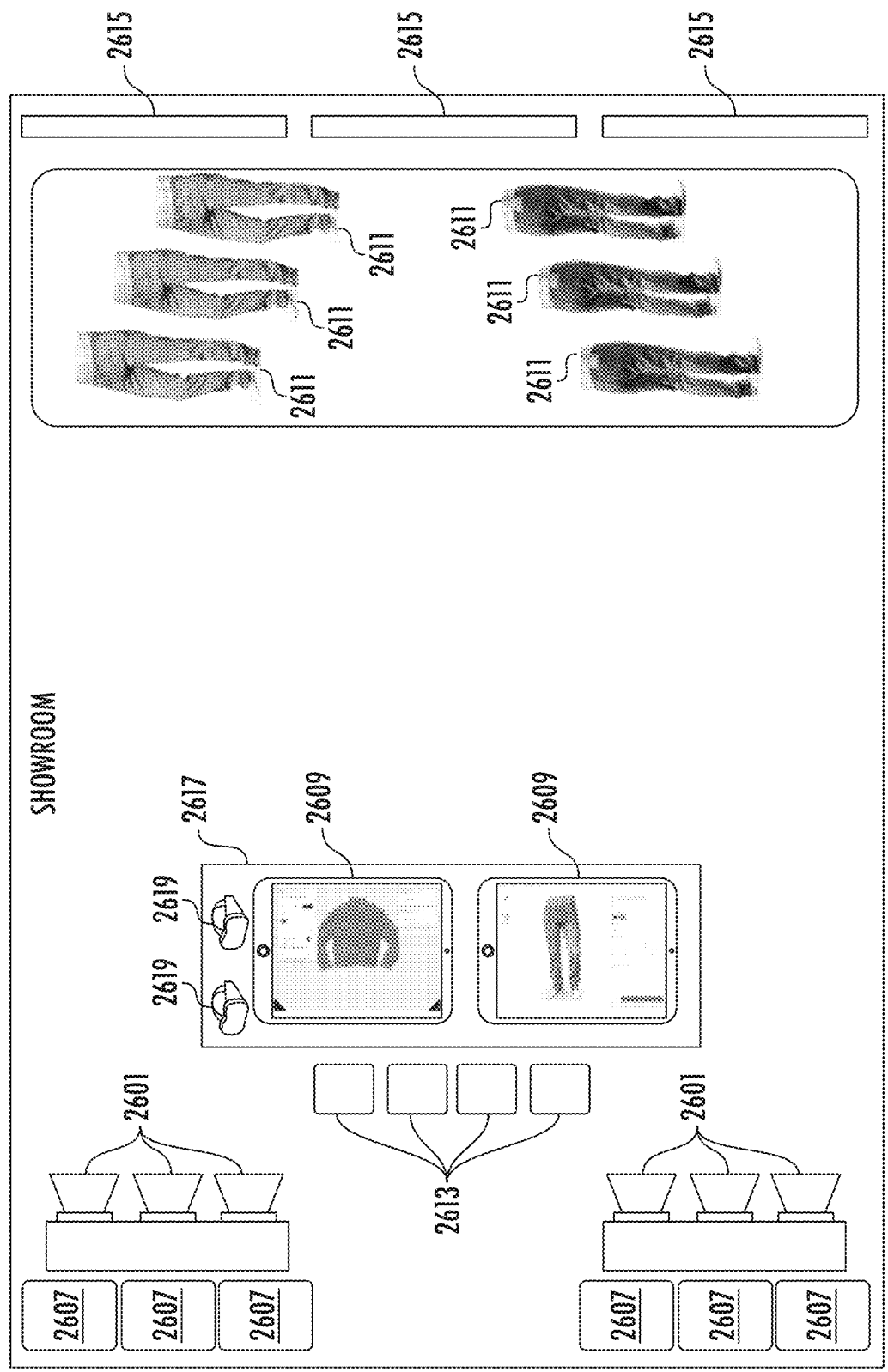
FIG. 32 shows the showroom in which garments are digitally displayed and may be previewed, in an implementation.

FIG. 32 shows the showroom in which garments are digitally displayed and may be previewed, in an implementation. The showroom may be showroom 2208, 3000, other showrooms, or any combination of these showrooms. The showroom includes one or more projectors 2601, one or more sensors 2607, one or more control computer systems 2609, seating 2613, one or more mannequins 2611, one or more display screens 2615. The projectors, the sensors, and the computer systems can be any of the projectors, sensors, and computer systems described in this patent and may operate as described in this patent. The showroom may include a table 2617 on which the control computer system may be located for use.

The showroom may be located in a building, in a trailer, in a tent, on a stage, or in another structure. The showroom may be located in an outdoor location.

In an implementation, the seating 2613 is positioned between the mannequins 2611 and the one or more projectors 2601 from a downward view of the showroom as shown in FIG. 32. In other implementations, the projectors may be over the seating or in front of the seating. The seating, projectors, and sensors each face the mannequins. The seating 2613 may also be positioned between the mannequins 2611 and the one or more display screens 2613 from the downward view of the showroom shown in FIG. 32.

The seating may be positioned near the table and the one or more control computer systems. A person seated on a seat at the table may operate the control computer system. The control computer system may in-turn control one or more of the projectors, one or more of the sensors, or both.

The projectors are directed toward the mannequins and the display screens, and are adapted to project images or video onto the mannequins, display screens, or both. In an implementation, one projector is oriented in the showroom to project images, video, or both onto one of the mannequins. That is, each projector is associated with one of the mannequins and can project images, video, or both onto the mannequin that is associated with the projector. For example, the showroom can include six projectors and six mannequins and a first projector is adapted to project images or video onto a first mannequin, a second projector is adapted to project images or video onto a second mannequin, a third projector is adapted to project images or video onto a third mannequin, a fourth projector is adapted to project images or video onto a fourth mannequin, a fifth projector is adapted to project images or video onto a fifth mannequin, and a sixth projector is adapted to project images or video onto a sixth mannequin. In the implementation, the first projector does not project images or video onto the second, third, fourth, fifth, or the sixth mannequin. The second projector does not project images or video onto the first, third, fourth, fifth, or the sixth mannequin. The third projector does not project images or video onto the first, second, fourth, fifth, or the sixth mannequin. The fourth projector does not project images or video onto the first, second, third, fifth, or the sixth mannequin. The fifth projector does not project images or video onto the first, second, third, fourth, or the sixth mannequin. The sixth projector does not project images or video onto the first second, third, fourth, or the fifth mannequin. One or more switches 3032 may be adapted to direct the images or video from one or more computing devices to the projectors as described above, for example, with respect to the table. While the above describes a showroom including six mannequins or human model and six projectors, the showroom can include more or fewer mannequins, human model, and projectors.

The projectors can be attached to a back wall of the showroom, a sidewall of the showroom, to a ceiling of the showroom, to scaffolding, to a lighting truss (sometimes referred to as a stage truss, e.g., a flown truss), to projector stands in the showroom, or any combination of these locations, structures, or both. The sensors can be attached to the projectors, combined with the projections, or located adjacent to the projectors. The sensors can be attached to the back wall of the showroom, to one or more sidewalls of the showroom, to a ceiling of the showroom, to scaffolding, to a lighting truss (sometimes referred to as a stage truss, e.g., a flown truss), to the projector stands in the showroom, or any combination of these locations, structures, or both.

The sensors are positioned on or near the projectors so that the sensor can collect light emitted or reflected from the mannequins and can have a viewing angle that is similar to the projection angle that the projectors may project through. Thus, the sensors can detect the orientations of the mannequins with respect to the project locations and can detect a distance between the projectors and the mannequins. As described above with respect to FIG. 26A, each sensor 2607 may use a structured light technique to calibrate a projector. In an implementation, a structured light technique includes a sensor projecting structured light (e.g., a grid of light) onto a mannequin and detecting the structured light (e.g., the distorted grid) after the structured light reflects from the mannequin. The distorted grid carries information for an angular orientation of the mannequin with respect to the project. The distorted grid can include information for a tilt (e.g., top tilting down or bottom tilting up) of the mannequin, a rotation (e.g., left-right rotation, such as a rotation about an axis running from a top to the bottom of the mannequin) of the mannequin where the axes of rotations for the tilt and the rotation can be perpendicular.

A sensor can provide angular orientation information, size information, or both to a projector. As described above, the projector can use the received information to alter (e.g., warped) an image that is projected onto a mannequin so that the projected image fits onto the mannequin or a garment on the mannequin in a corrected angular orientation, a corrected size, or both.

In an implementation, a unique garment is located on each mannequin. For example, a first garment having a first style (e.g., 501™ jeans) may be positioned on a first mannequin. A second garment having a second style (e.g., 502™ jeans) may be positioned on a second mannequin. A third garment having a third style (e.g., 514™ jeans) may be positioned on a third mannequin.

In an implementation, two garments that have the same style are positioned on two mannequins were the two mannequins have different orientations with respect to the projectors associated with the mannequins. A first one of the mannequins may have a front that faces the first projector so that a front of the garment (e.g., front of a pair of jeans or a jacket) faces the first projector, and a second one of the mannequins may have a back that faces the second projector so that a back of the garment (e.g., back of a pair of jeans or a jacket) faces the second projector. In other implementations, a front and side of the two garments may face the projectors, a back and a side of the two garments may face the projectors, or other the two garments having other orientations may face the projectors.

The digital brief tool, the preview tool, or other tools (e.g., an assortment tool builder (described below), a sell-in tool (described below), other tools, or any combination of these tools) operating on one or both of the computing systems 2609 may receive information for the particular style of garment that is on each mannequin. The information may be entered by a user using the tool, for example, via a touch interface. The information may be received from the digital showroom computing system 2223. For example, the tool may receive information that a pair of 501™ jeans are positioned on a first mannequin, a pair of 502™ jeans are located on a second mannequin, and a pair of 514™ jeans are located on a third mannequin.

Based on the information received by the tool regarding the particular styles of garments that are on the mannequins, the tool may transmit image information to each projector where the image information that is transmitted and received by a projector is for the particular garment that in on the mannequin that the projector is associated with. For example, the tool may transmit first image information for a first garment having a first style (e.g., 501™ jeans) to a first projector that is associated with a first mannequin on which the first garment is located. The tool may transmit second image information for a second garment having a second style (e.g., 502™ jeans) to a second projector that is associated with a second mannequin on which the second garment is located. The tool may transmit third image information for a third garment having a third style (e.g., 514™ jeans) to a third projector that is associated with a third mannequin on which the third garment is located. The first, second, and third image information (e.g., laser files) may include image information that is specific for the first, second, and third garments. For example, the first image information (e.g., a first laser file) may include a finishing pattern for 501™ jeans, second image information (e.g., a second laser file) may include a finishing pattern for 502™ jeans, and third image information (e.g., a third laser file) may include a finishing pattern for 514™ jeans.

In another example, the tool may transmit first image information (e.g., a first laser file) for a first garment having a first style (e.g., 501™ jeans) to a first projector that is associated with a first mannequin on which the first garment is located and a front of the garment is facing the projector. The tool may transmit second image information (a second laser) for a second garment having the first style (e.g., 501™ jeans) to a second projector that is associated with a second mannequin on which the second garment is located and a back of the garment is facing the projector. The first image information may be for the front of the garment and the second image information may be for the back of the garment.

The projectors may then transmit one or more images or video onto the mannequins that are associated with the projectors using the image information received. The images or video projected onto the mannequins and the garments on the mannequins can include finishing patterns that can be laser formed on the garment by a laser using one of the laser files. The images or video may include color for a garment. A garment on a mannequin that has a neutral color may appear to have a variety of color based on the color projected onto the garment. Thus, a garment can appear to have a variety of finishing patterns, damage, colors, or any combination of these options. Thus, a potential customer viewing garments in the studio can preview a variety of garments based on the images projected onto the garment by a projector where the variety of garments do not need to be fabricated. In an implementation, a garment on a mannequin may have a color other than a neutral color, such as indigo, green, red, yellow, or other colors.

In an implementation, a three-dimensional image of a garment with a finishing pattern displayed on a display of a computing device 2609 and a garment on a mannequin or human models with the finishing pattern projected onto the garment have the approximately same appearance or matching appearance. The image and garment have approximately the same appearance or approximately matching appearance because the garment on the mannequin or human model has the same garment style as the garment displayed on the display, and at least in one implementation, the same laser file for a selected finishing pattern is used for both generating the three-dimensional image of the garment on the display and for projecting the finishing pattern onto the garment on the mannequin. The flexibility of providing a user selectable option for selecting different finishing patterns for different garments and providing preview of the garments on the display screen and on the mannequins, human models, display screen, in virtual reality headsets, on digital displays allows for manufacturers, designers, and customers to have realistic previews of garments that can be customized with finishing patterns without actually having to manufacture the garments with the finishing patterns. Large numbers of example garments have typically been manufactured for fashion shows and sales that occur at different geographic locations where a unique set of garments is provide to each location for preview. The cost of such manufacturing is relatively large. Providing for display of garments in three-dimensional view on computer displays, on mannequins, human models, display screen, electronic displays, in virtual reality headsets allows for large cost savings from not manufacture sets of garments for fashion shows and sales meetings.

In an implementation, the projectors can project images of garments onto the display screens 2613. The images may include base images combined with finishing pattern images. In an implementation, the studio includes a number of projectors such that the projectors can project images of garments, finishing patterns, damage, or any combination of these options onto both the mannequins and the display screens.

In an implementation, the display screens 2613 are located higher in the studio than the stage and the mannequins. The display screen may be located above the stage, above the mannequins, or both. The displays may be attached to a back wall of the showroom, a sidewall of the showroom, a ceiling of the showroom, a scaffolding, a lighting truss, a projector stands in the showroom, or any combination of these locations, structures, or both. Each projector may be adapted to project one or more images of one or more garments onto one or more display screens.

In an implementation, the showroom includes one or more virtual reality headsets. The virtual reality headsets may receive image information for garments from one or more tools operating on the one or more control computer systems 2609, the digital showroom computing system 2223, or other computer systems. The virtual reality headsets may display a variety of garments having a variety of finishing patterns. The virtual reality headsets may also display a retail space with garments having a variety of finishing patterns. The garments may be displayed in the retail space on garment racks, on tables, on display screen, or other places in the retail space. Thus, a customer of garments can view customized garments in their own retail shop in the virtual reality headset. Virtual reality headsets are described further below. the FIGS. 33-41 show screens for a sell-in tool. The sell-in tool is used by an apparel manufacturer to show customers the manufacturer's products available for sale, and for the customer to order any desired products. The customer may build an assortment of products that the customer would like to purchase when using the sell-in tool. The sell-in tool may display images or video of products that a customer may select for purchase and add to their assortment. The sell-in tool can aid a customer in their assortment build by displaying previous orders and showing various analytics for the customer's previous order or current assortment.

Figure 33:
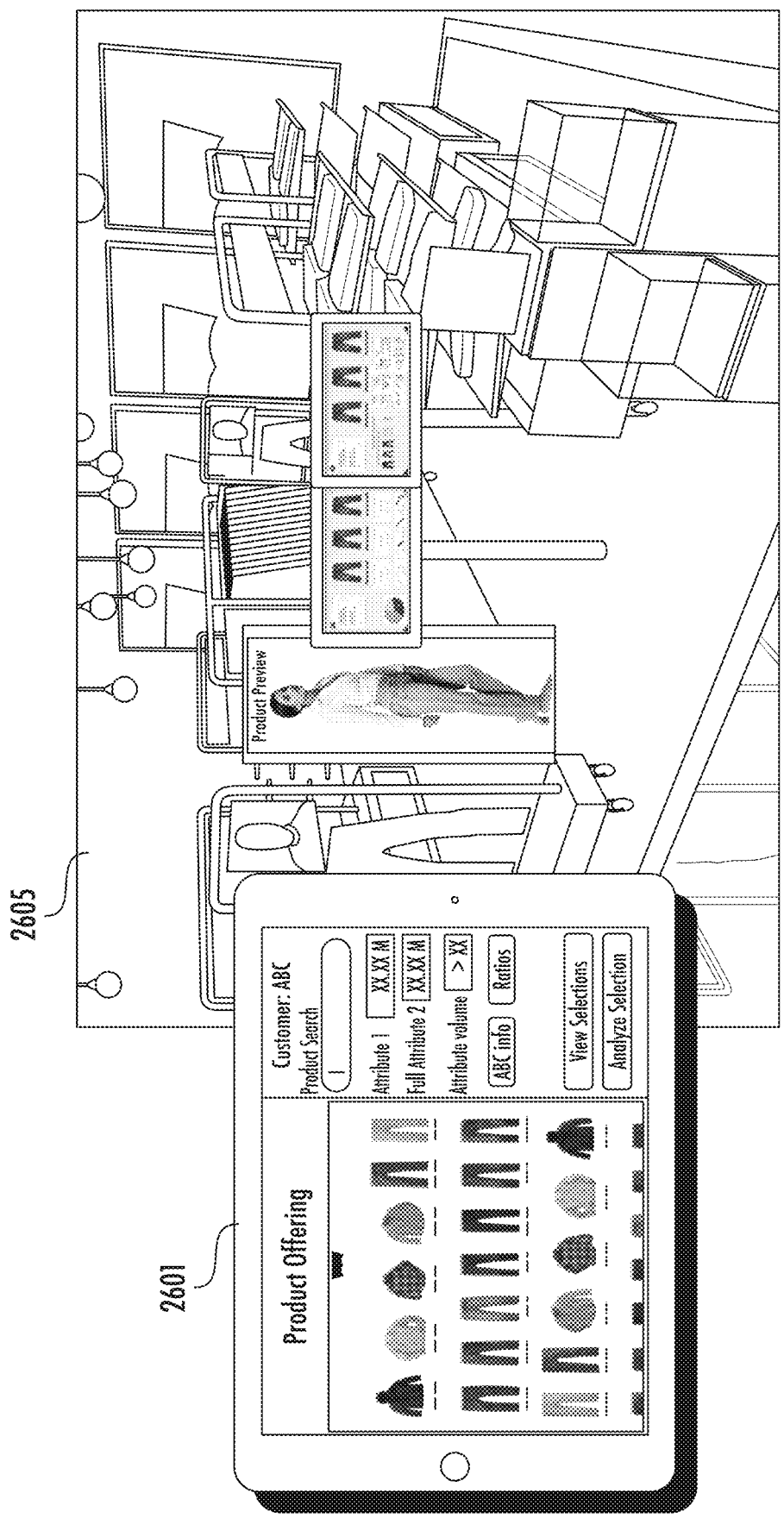
FIG. 33 shows two forms of a sell-in tool where the two forms include a version on tablet or handheld device 2601 and a version for a digital showroom 2605 with the large screen display panels shown in the digital showroom.

FIG. 33 shows two forms of a sell-in tool where the two forms include a version on tablet or handheld device 2601 and a version for a digital showroom 2605 with the large screen display panels shown in the digital showroom. The digital showroom may be the digital showrooms described above. The tablet version may be used by global and regional merchants for local sales and product replenishment. The digital showroom version can have much of the same functionality as the tablet version for presentation in a full showroom setting. The showroom can have additional features such as full-size previews using static images, videos, mannequins, live models, display screen, or other displays. Showroom video and images can be from the customer or the apparel manufacturer (e.g., LS&Co.). The sell-in tool version for the digital showroom and the tablet version may be any of the computer systems described above, such as iPad tablet computers (iPad Pro, iPad Air, or other tablet computers), large screen display panels driven by one or more personal computers, or other computer systems.

Figure 34:
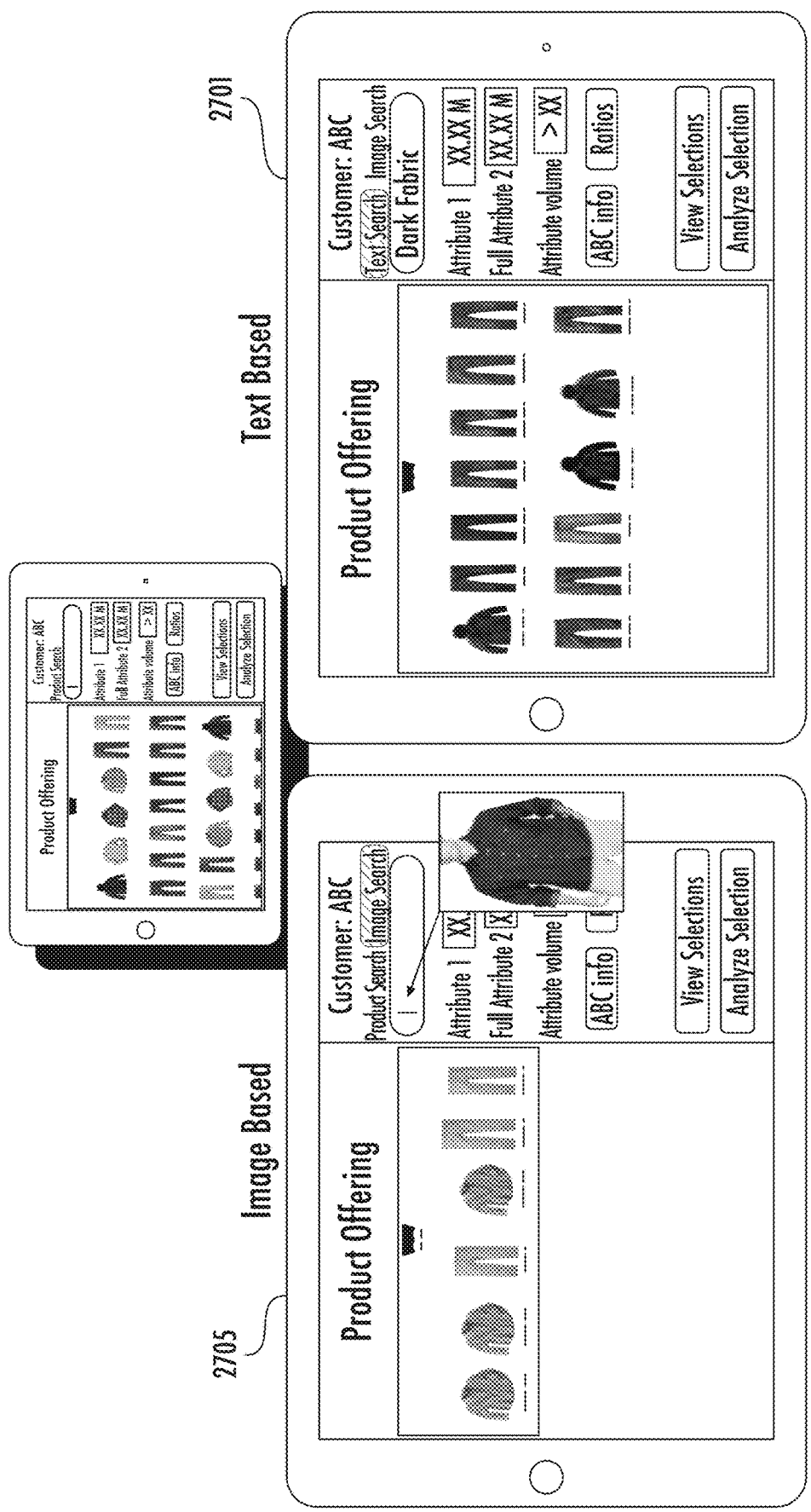
FIG. 34 shows an advanced search feature of the tablet version of the sell-in tool. This feature is also available in the showroom version.

FIG. 34 shows an advanced search feature of the tablet version of the sell-in tool. This feature is also available in the showroom version. The search tool allows the customer to search and sort the product offerings by text keyword 2701 or images 2705. In an implementation, a menu is displayed on a display screen of the table version of the sell-in tool where product offerings are displayed and a text box is displayed in which text, such as keywords, may be entered as search parameters for garments or garment features (e.g., dark fabric).

In an implementation, a menu is displayed on a display screen of the table version of the sell-in tool where product offerings are displayed and a data entry box is displayed in which information for images may be entered for an image search for garments or garment features.

Figure 35:
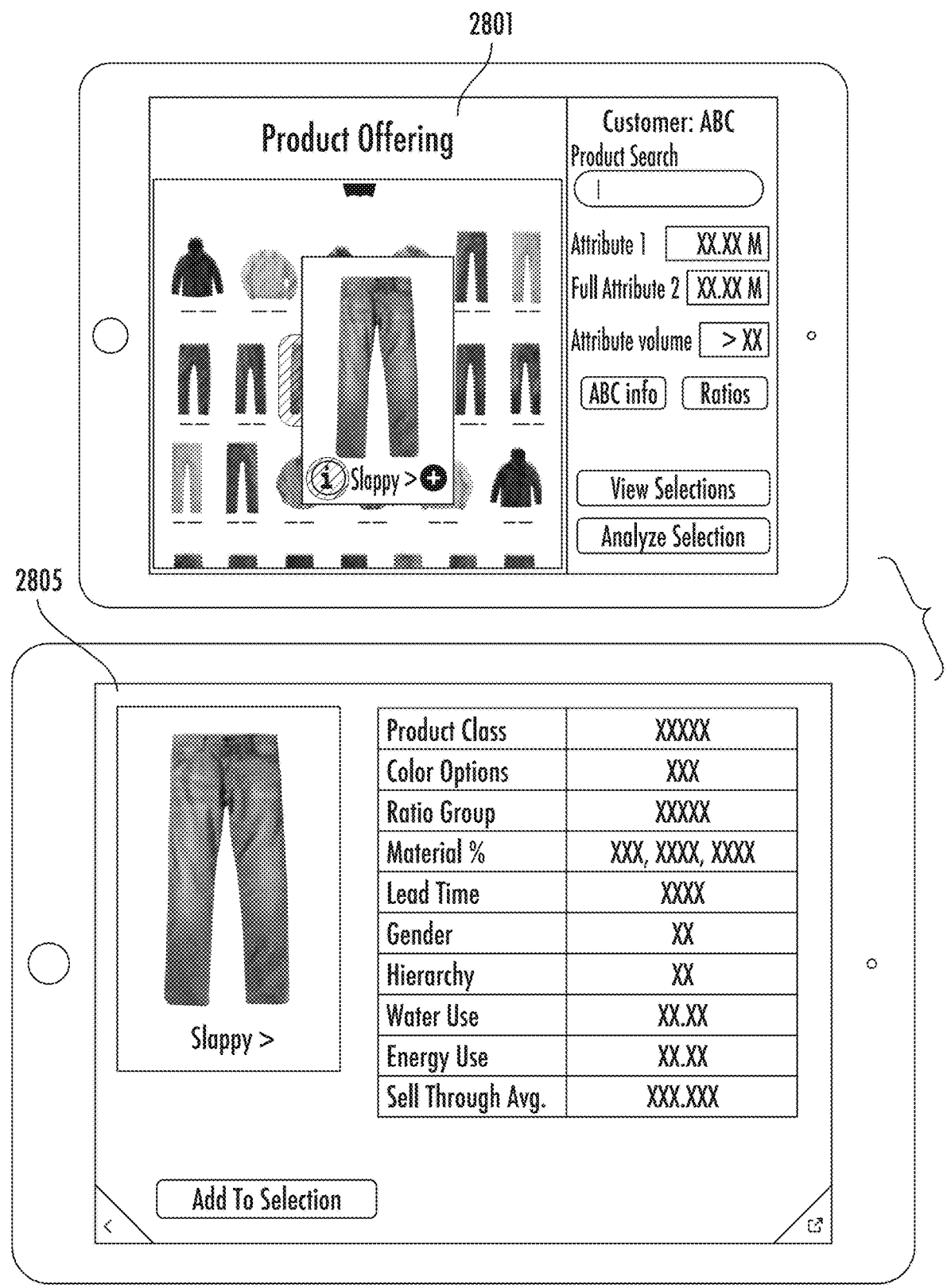
FIG. 35 shows searching for product information using the sell-in tool. In a screen 2801, a user can soft select a product to get a slightly larger view.

FIG. 35 shows searching for product information using the sell-in tool. In a screen 2801, a user can soft select a product to get a slightly larger view. The views of the selected products can be three-dimensional views of selected products, which can be displayed with screen selectable options for adding a selected option to an assortment of products for purchase or potential purchase. From this point, they can add the product to the selection or look at product information. In a screen 2805, this is a sample as to what product information might be shown for a product, such as jeans. Any of the product offering screens described can include one or more menus that include user selectable options for customizing a garment with finishing patterns that can be laser formed on the garments, a tint, or damage. Any of the product offering screens can display preview images (e.g., three-dimensional preview images) for selected garments. Any of the preview images can be displayed with any of the selected customizing options for finishing pattern, tint, or damage. Product offering options, preview images, and menus for customization options can be displayed on a single screen of the sell-in tool. Any images or video of a selected garment can be projected onto mannequins, human models, the display screen, or in a VR headset for preview. The garments can be displayed in preview images before or after being added to an assortment of garments, and can be images of the garments can be projected onto mannequins, human models, the display screen, or in a VR headset before or after being added to an assortment of garments.

Figure 36:
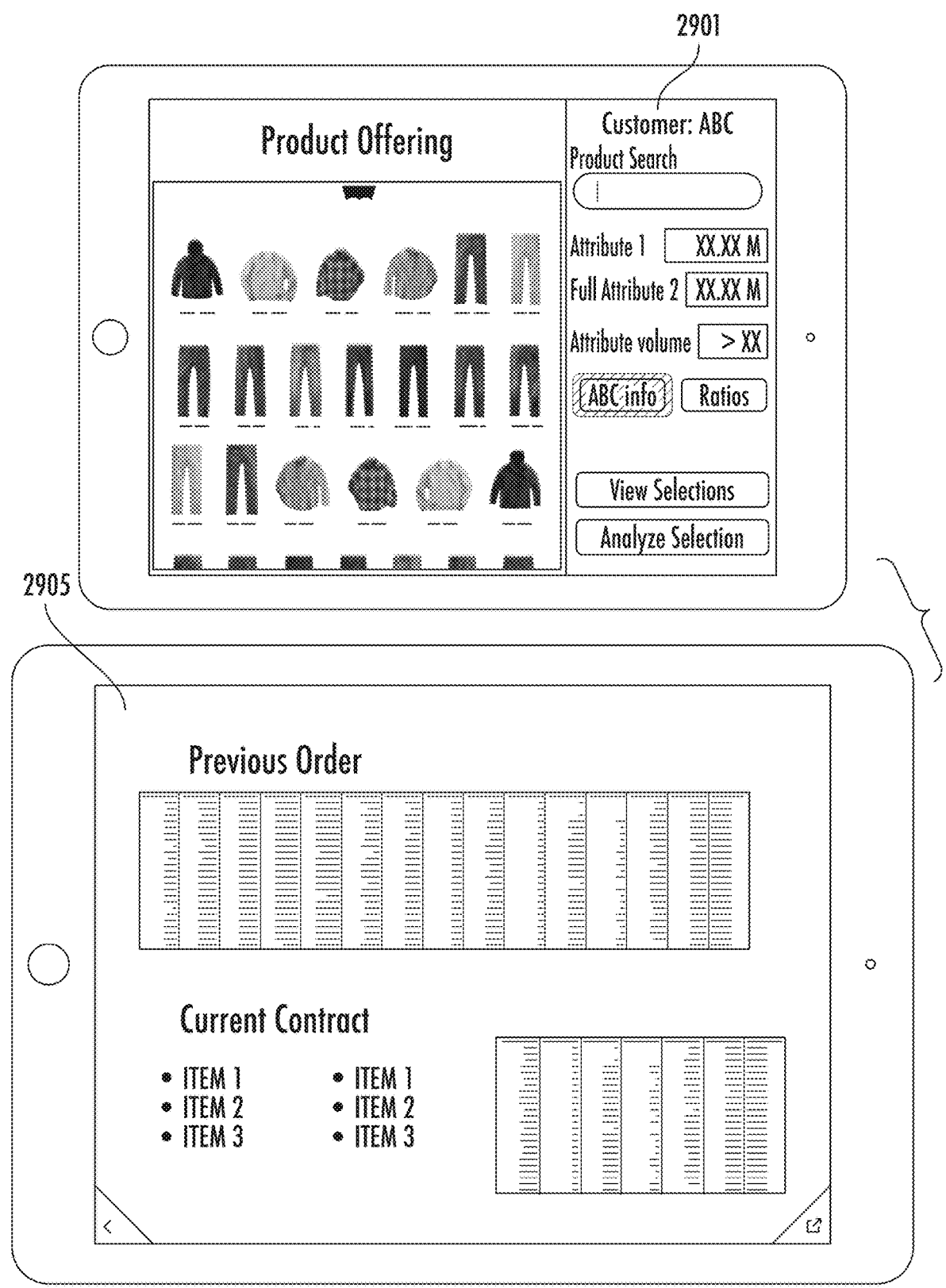
FIG. 36 shows searching 2901 for customer information using the sell-in tool.

FIG. 36 shows searching 2901 for customer information using the sell-in tool. A customer has some settings in the sell-in tool preset by the specifics of their contract or otherwise specified. The customer may view these details as well as their previous order details 2905. The customer may also provide feedback on their last order to help down select current offering.

Figure 37:
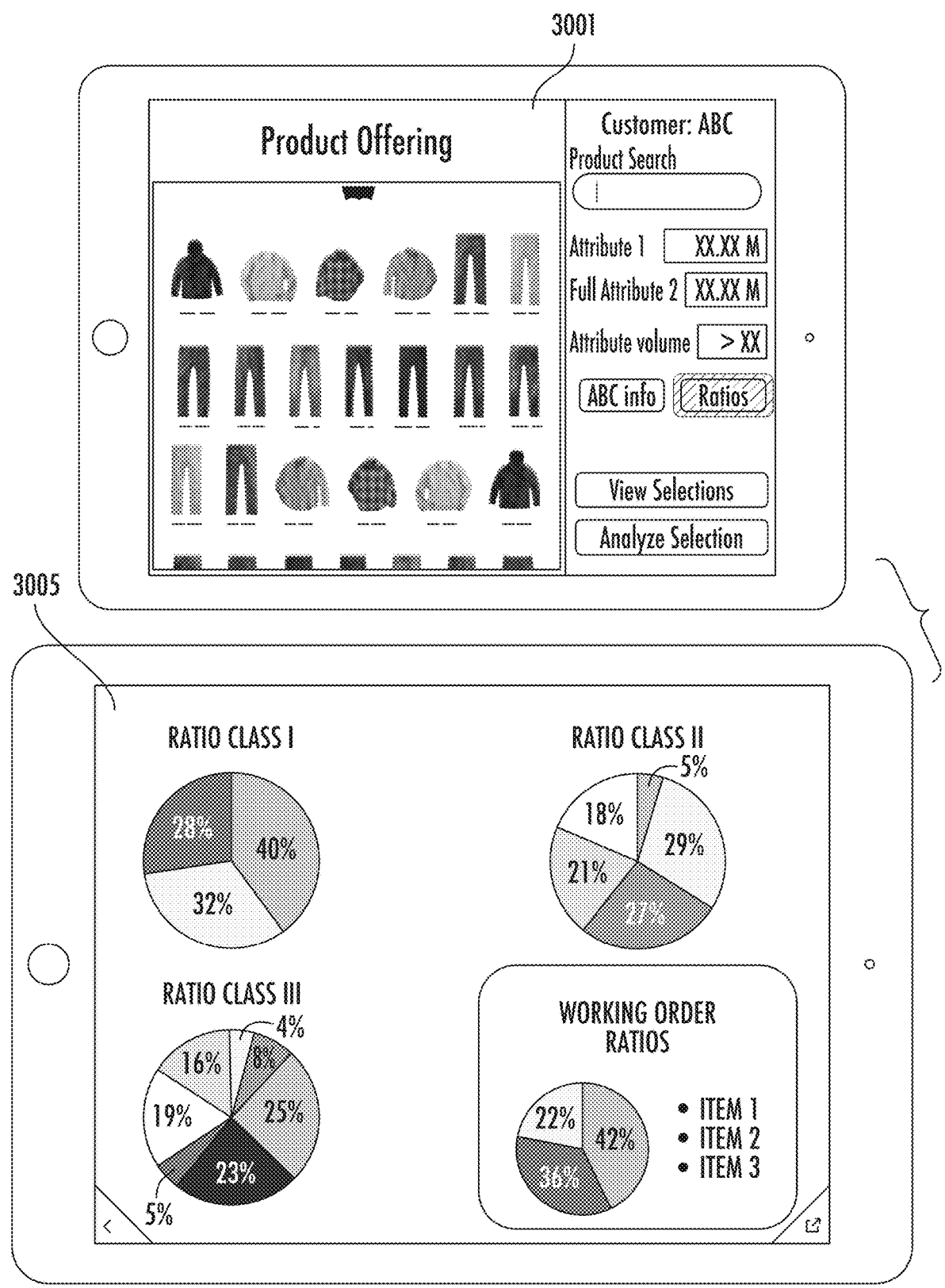
FIG. 37 shows metrics 3005 (including graphics and charts) that can be shown to a customer.

FIG. 37 shows metrics 3005 (including graphics and charts) that can be shown to a customer. The customer may decide to take advantage of discounts created by adhering to product selections 3001 which fulfill the manufacturer's internal base fit fabric ratios, though it may not be communicated to the customer in this way. They can see the ratio categories available and also see how their current selection is rated at any time during the sell-in process.

Figure 38:
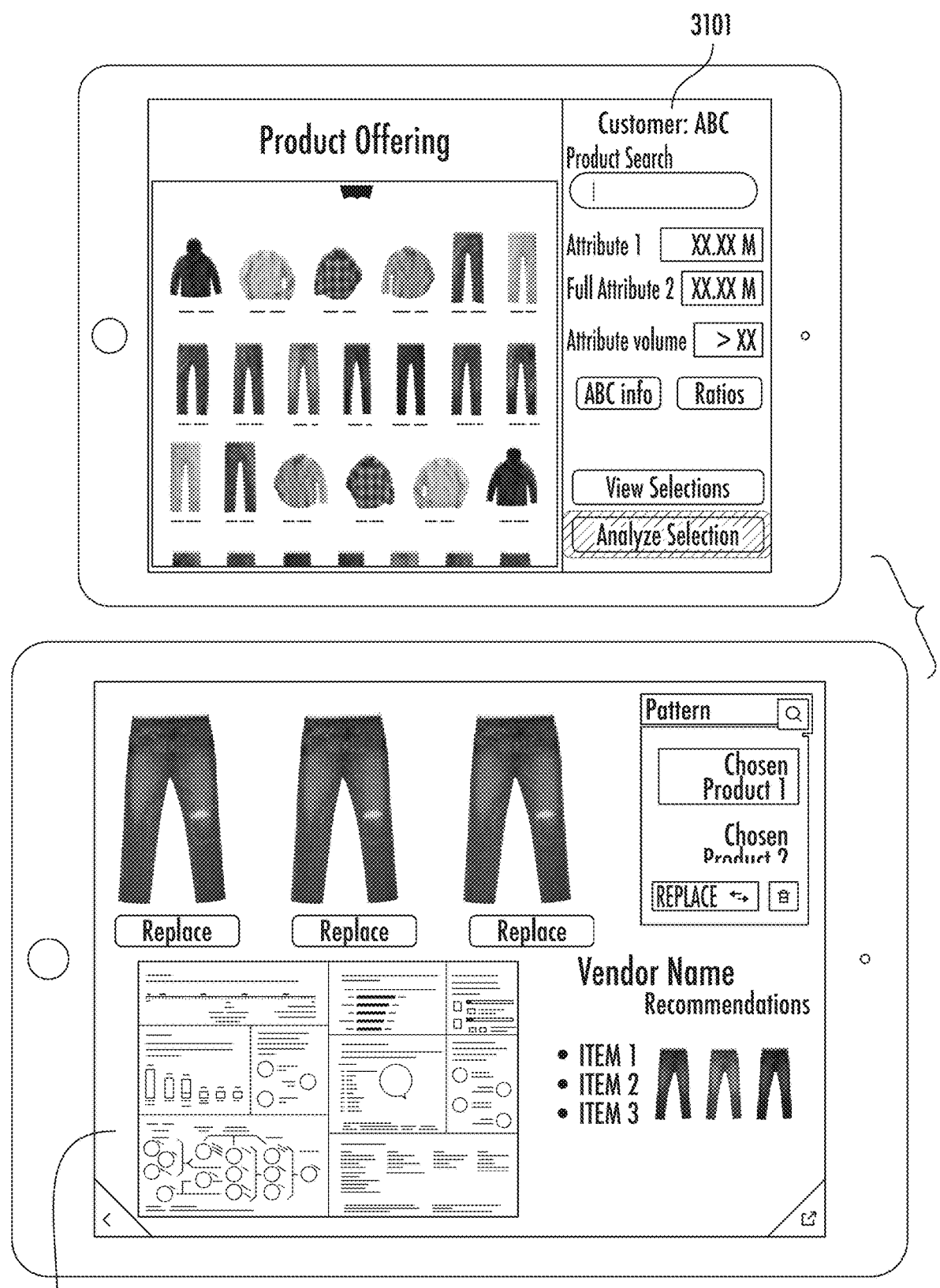
FIG. 38 shows an analyze selection feature 3105 of the sell-in tool.

FIG. 38 shows an analyze selection feature 3105 of the sell-in tool. A customer may choose to analyze their current product selection 3101 (e.g., collection of garments selected for purchase). This manufacturer's data-based analysis will look at projected sell through, revenue, cost percentages, and projected line gaps. In this tool, the customer is given the option to analyze either part of the entire selection and change out products as desired.

Figure 39:
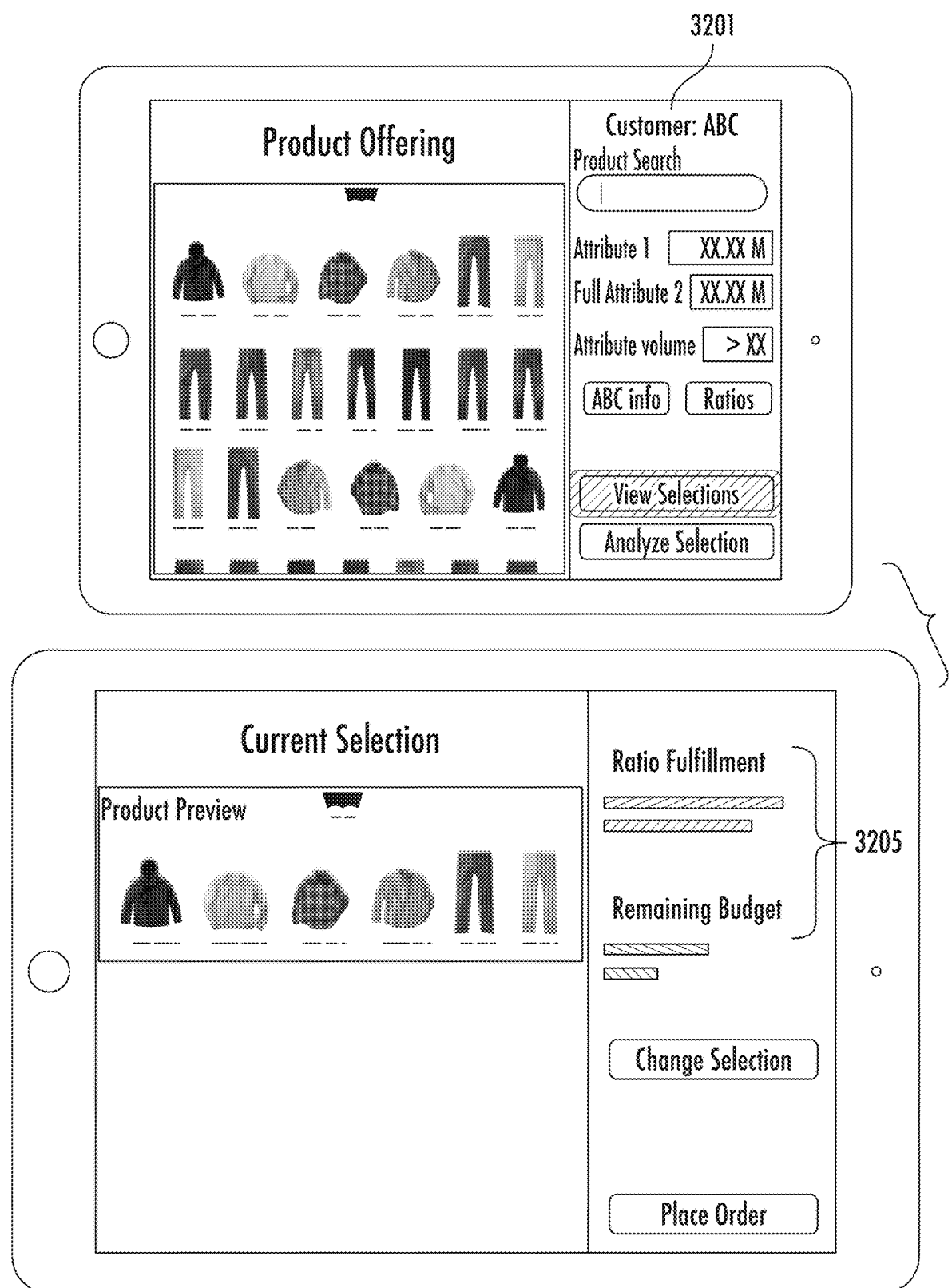
FIG. 39 shows a view product selection feature of the sell-in tool.

FIG. 39 shows a view product selection feature of the sell-in tool. A customer can view an overview 3205 of their current product selections 3201 at any time in the process. This gives them the ability to see their collection (e.g., collection of garments selected for purchase) in one place all together. Also included in this preview is the remaining budget or volume as well as ratio goals if applicable.

Figure 40:
FIG. 40 shows a single product view image, which is part of the showroom version of the sell-in tool.

FIG. 40 shows a single product view image, which is part of the showroom version of the sell-in tool. In the showroom, the customer may choose to view a full size (human size) image of a product they have selected on a large screen, a mannequin, or a live model. The imagery that the selected garment is shown on can be on either customer supplied or manufacturer-supplied. The image can be stored in and selected from the sell-in tool for display on the full-size panel located in the digital showroom.

Figure 41:
FIG. 41 shows a selection fashion show video feature, which is part of the showroom version of the sell-in tool.

FIG. 41 shows a selection fashion show video feature, which is part of the showroom version of the sell-in tool. In the showroom, the customer may choose to view their entire product selection (e.g., collection of garments selected for purchase) by playing a video slide show where the models will be wearing the selected garments. After selection of the fashion show video feature, the sell-in tool will control the playing of the video slide show. The video slide show may be displayed on a one or more relatively large computer monitors, on a display panel on which a projector projects the video slide show, other large display device, mannequins, or live models. In an implementation where two or more relatively large computer monitors are adapted for displaying the video slide show, the monitors may be adjacently positioned (e.g., connected) to form a larger monitor where the number of monitors display a single image across the number of monitors.

Figure 42:
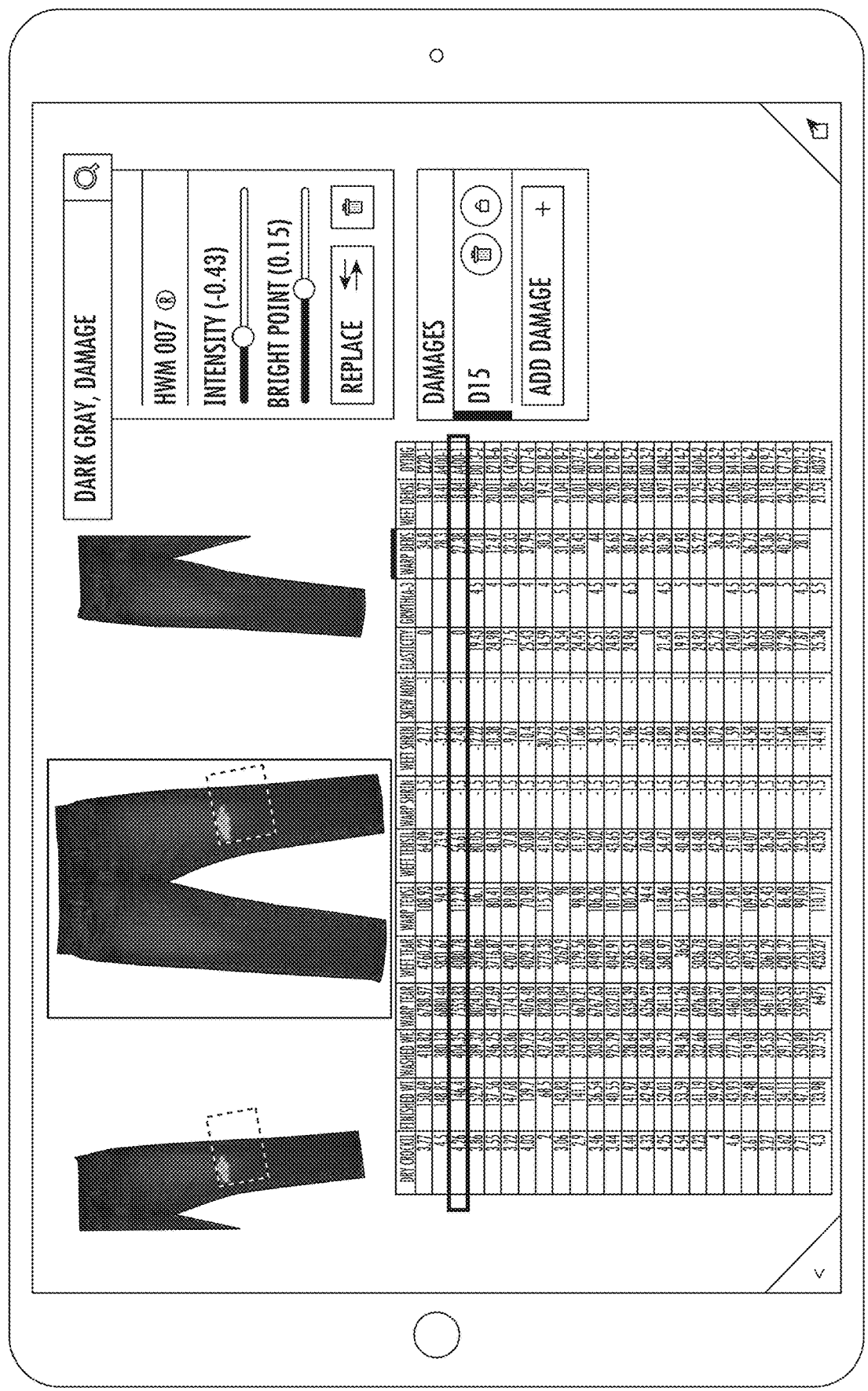
FIGS. 42-43 show an assortment builder tool, which can be used in conjunction with a digital brief tool or the sell-in tool to assemble an assortment of garments for purchase or potential purchase.
Figure 43:
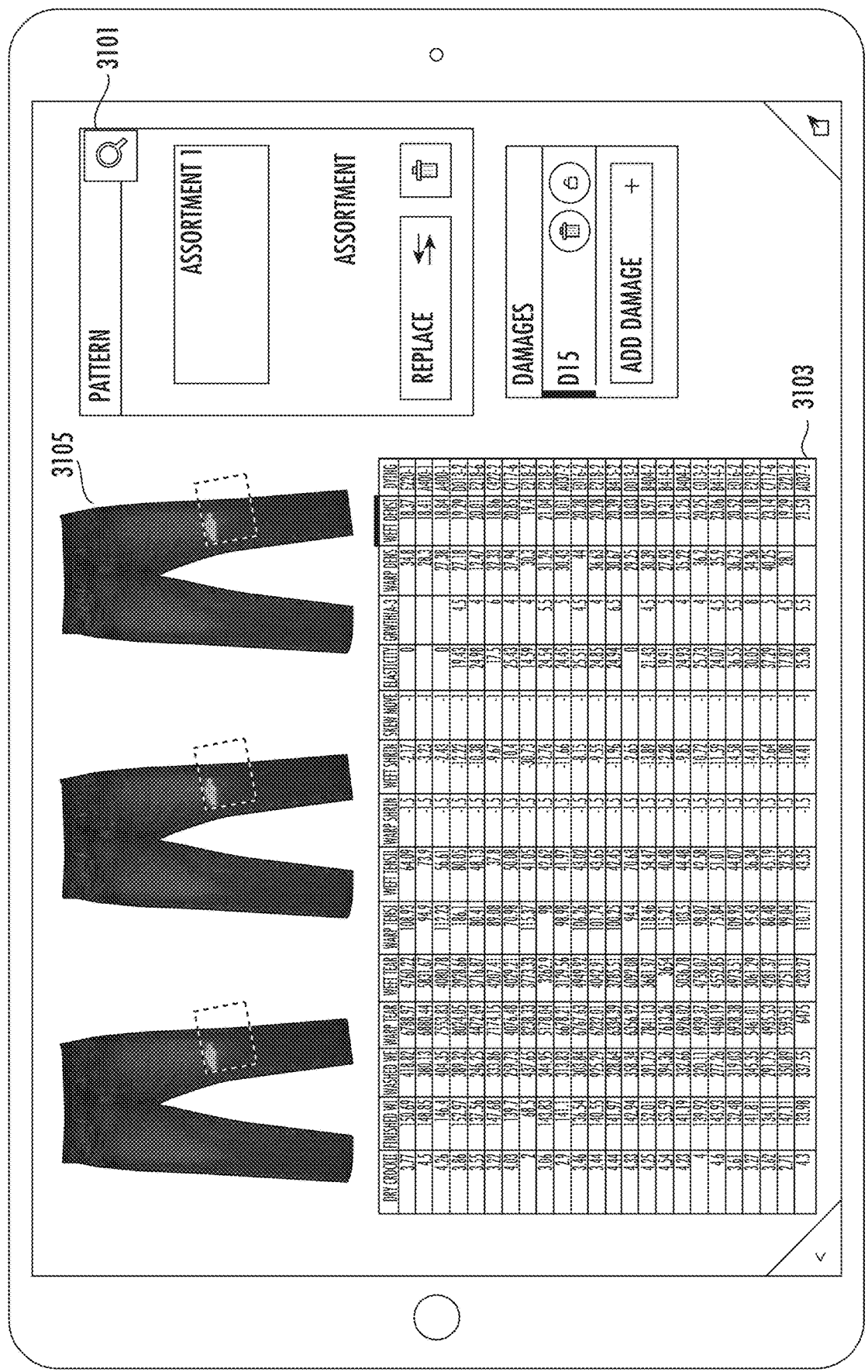

FIGS. 42-43 show an assortment builder tool, which can be used in conjunction with a digital brief tool, such as digital brief tool 1803 of FIG. 18, or used in conjunction with the sell-in tool. The assortment builder tool allows a user (e.g., merchandiser) to select designs (e.g., garments having select designs) to build an assortment or collection (e.g., an assortment of collection of garments) by adding or removing a product (e.g., to or from an assortment or collection of garments). Then, the user can save this assortment. Multiple assortments can be created. Also, the assortment builder tool can have a collaboration feature, so that two or more people can build an assortment together. Computer systems on which the assortment builder tool operates may be at the same location (e.g., a showroom) or at different geographic locations (e.g., in different cities or different countries) and may be connected to a network so that two or more people can build an assortment together.

A design (e.g., a garment having a design) added to an assortment may have been created using the digital brief tool, or may have been created using other tools or techniques. An assortment is used to show and market a set or group of products to others, such as internal buyers, retail buyers, and other customers of the products. Assortments can be organized according to seasons, demographics, gender, or other categories. For example, there may be a spring collection, summer collection, fall collection, winter collection, children's collection, sportswear collection, or another category. An assortment can include multiple types or classes of product, such a pair of jeans, shirts, and accessories that coordinate together well for a particular target category.

Using the assortment builder tool, a user creates an assortment or collection of products. When starting a new assortment, the assortment is empty and products can be added. As shown in FIG. 42, the user can search for products to add to an assortment using data, keyword or text, image search, or other search parameters.

The assortment builder tool can search on internal data metrics, keywords, or photo similarities using data distance processes. The internal data metrics can include, for example, product name, product code, season, brand, style, colorway, customer or user comments, or both, color code, fabric contents, availability, brand targets, retail or production prices, or both, last offered, manufacturing lead time, lab metrics, volume availability, stock, environmental score, and estimated product lifetime.

Colorway refers to a color based design aesthetic. In particular, colorway may be an arrangement of colors. This can be used to categorize different colors of the same product and typically can refer to multiple colors. As an example, there can be a product where the design dictates the use of three colors in specific areas; then there might be colorway for that product called "Shamrok" and it would be orange, white, and green, or a colorway called "Patriot" might be red white and blue. Alternatively, colorway can be referred to by other terms such as color palette, design iteration, or color pattern.

For the found products, the assortment builder tool shows preview images of products on the screen, on mannequins, on live models, or on display panels, and the preview can be generated as described for the digital brief tool. For each product, the assortment builder tool can also show detailed information on each product. This information, which can include the internal data metrics, can be retrieved from a product lifecycle management (PLM) database, which contains all the products available from the apparel manufacturer and each product's details. The product details can help the user decide whether to include a particular product in an assortment. The user can select one or more found products to add to an assortment, while discarding unwanted found products.

FIG. 43 shows an assortment 1 and its associated detailed product lifecycle management data. There can be multiple assortments, and the user can select which assortment to view. For example, for each assortment, preview images of each product are displayed on the screen, on mannequins, on live models, or on display screens, and the user can scroll through these products for display on one or more of these.

The assortments can be linked to the apparel manufacturers internal data from other databases (e.g., product lifecycle management database). Assortment images can be swapped out and replaced dynamically by the user as desired. Upon an update to the image, the data linked will also be updated.

FIGS. 44-49 show a user interface of a virtual merchandising preview tool. The user interface of the virtual merchandising tool includes a virtual store with garments that are part of a collection, such as a collection created using the sell-in tool or the assortment builder tool. The user will be able to view the virtual store with the garments that are part of the collection. The customer can view the virtual store using image texture and color swap, augmented reality (AR), or virtual reality (VR), or any combination of these. The virtual merchandising tool may operate on any of the computer systems or a combination of the computer systems described in this patent. The virtual merchandising preview tool can be made available in the digital showroom, for example, as a customer builds an assortment of garments using the sell-in tool, the assortment builder tool, or other tools.

For example, a user or customer who has selected some products (e.g., an assortment or collection of garments using one or more of the tools described) they are interested in purchasing for sale in their store or other retail location, can view the products digitally where the products are projected onto one or more digital images of the store or retail location. The virtual merchandizing preview tool allows the customer to see a visualization of how the products might appear together in a virtual storefront which mimics a real-world environment, such as where the products are digitally placed and digitally displayed in a digitally reproduced retail environment. The digitally reproduced retail environment can include pictures of the environment, fabricated images of the environment, or other images of the environment.

FIG. 44 shows an image texture and color swap approach for digitally displaying a collection of garments in a digital image of a store or retail environment. An image on the left-hand side of FIG. 44 is a store template, with regions or locations identifying where digital assets (e.g., digital images of garments in an assortment or collection of garments) may be populated. The store template, regions, or locations may include a table, a shelf, a garment rack, a mannequin, a display case, a hanger hanging on a rack, a hanger hanging on a wall, a human model, other store templates, or any combination of these store templates.

An image on the right-hand side of FIG. 44 is a virtual storefront image generated from the store template. The store template has boundary lines or outlines identifying locations where products (e.g., jeans, accessories, or shorts) can be placed. The virtual storefront image can include texture or color populated images, or both. The virtual storefront image shows the products as they might appear in a physical store.

Figure 45:
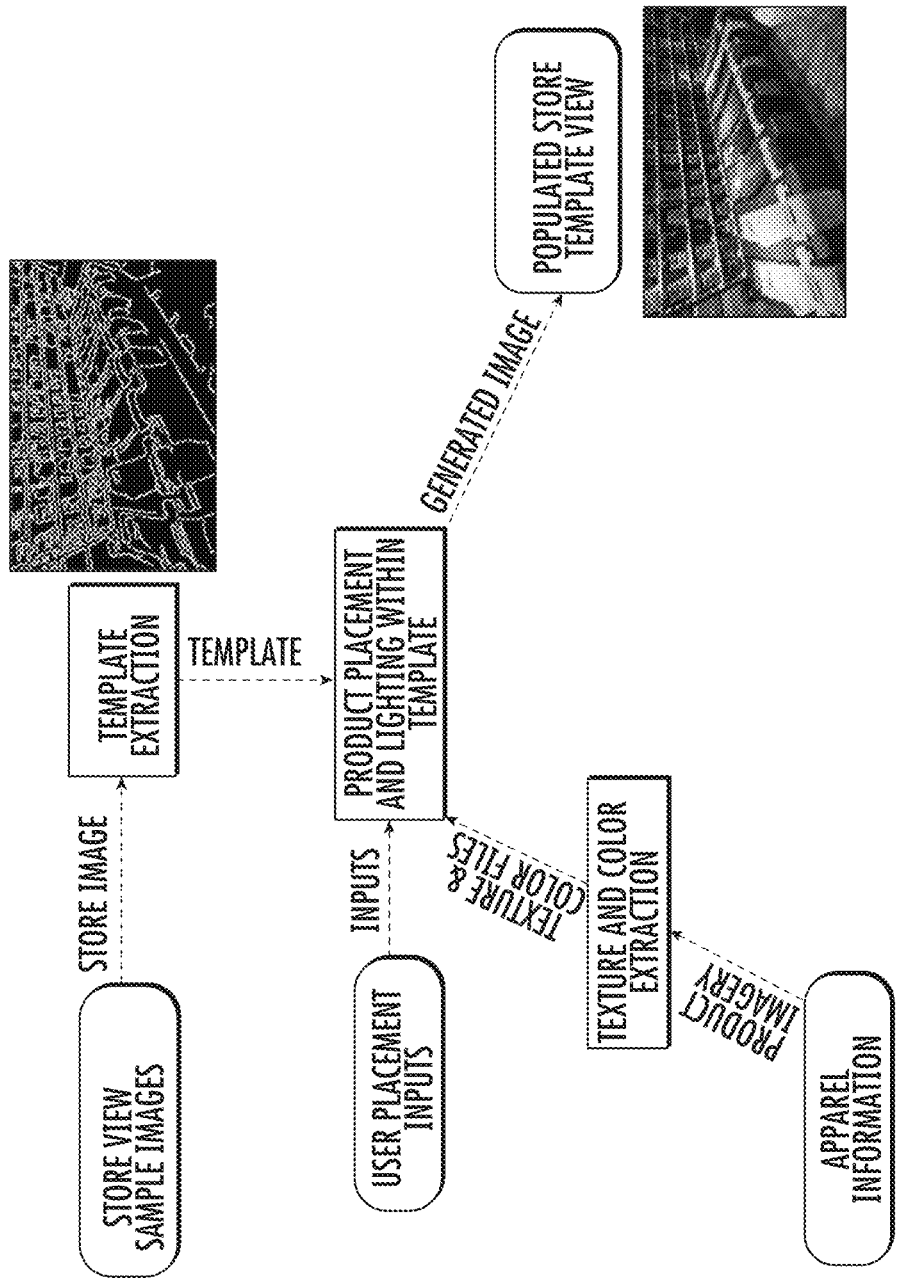
FIG. 45 shows a flow diagram of the image texture and color swap technique.

FIG. 45 shows a flow diagram of the image texture and color swap technique. Various data to create the virtual storefront are provided to the tool: (i) store view sample images including store images are provided to the tool, (ii) user placement inputs are provided to the tool where the inputs specify where, for each piece of apparel, the apparel should be included (e.g., placed) in the virtual storefront, and (iii) apparel information is provided to the tool where the information includes a collection of apparel items and their associated apparel images. The product images are processed using texture and color extraction to generate texture and color files. The store images are used to perform template extraction, which identifies one or more locations in the store images where apparel may be placed, and stored as a template. The texture and color files, template, and inputs are used to perform product placement and lighting within the template to generate an image. The generated image is used to populate a store template view and is shown to a customer as a storefront populated with the collection of apparel.

Figure 46:
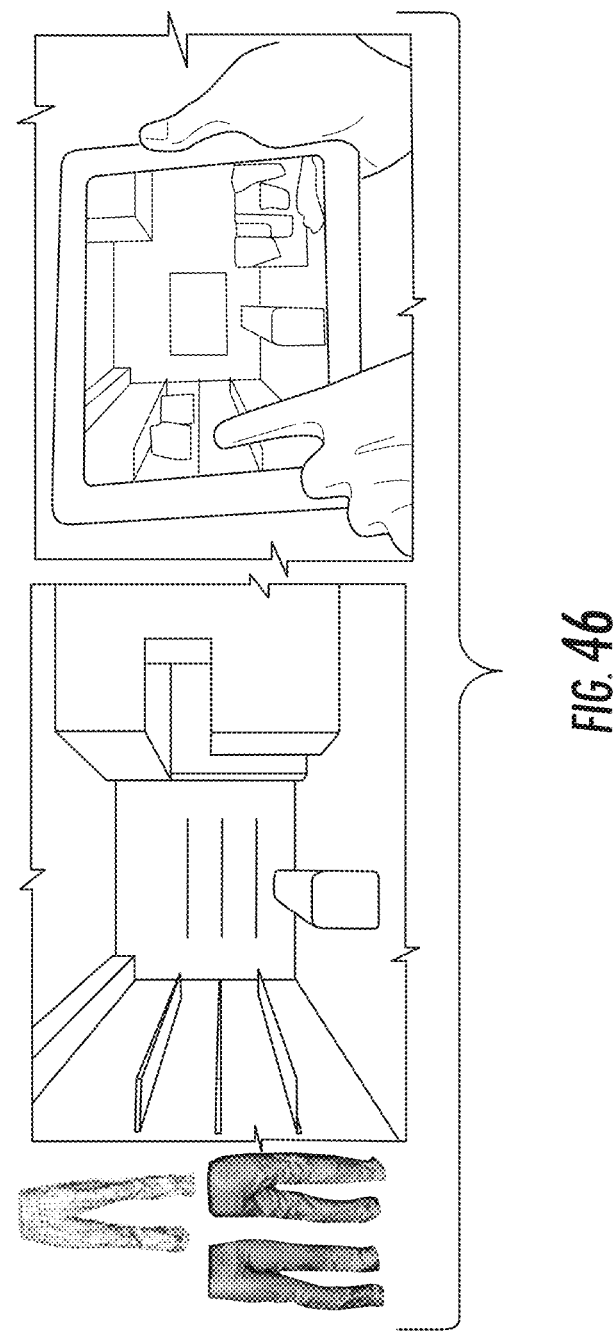
FIG. 46 shows an augmented reality approach for displaying a collection of garments in an augmented reality.

FIG. 46 shows an augmented reality approach for displaying a collection of garments in an augmented reality. There are images of garments that are part of a collection. There is an empty real-world environment (e.g., a picture of a store or retail space), which for example, can include an empty table, a shelf, a floor, a clothing rack, or any combination of these that serve as a framework on which the images of the garments can be projected. With a viewer (e.g., tablet device), using augmented reality, the user will be able to view a collection of garments in the empty real-world environment. With the viewer, the customer will also be able to walk around and move the collection (e.g., move some garments from one shelf to a different shelf) as desired.

Figure 47:
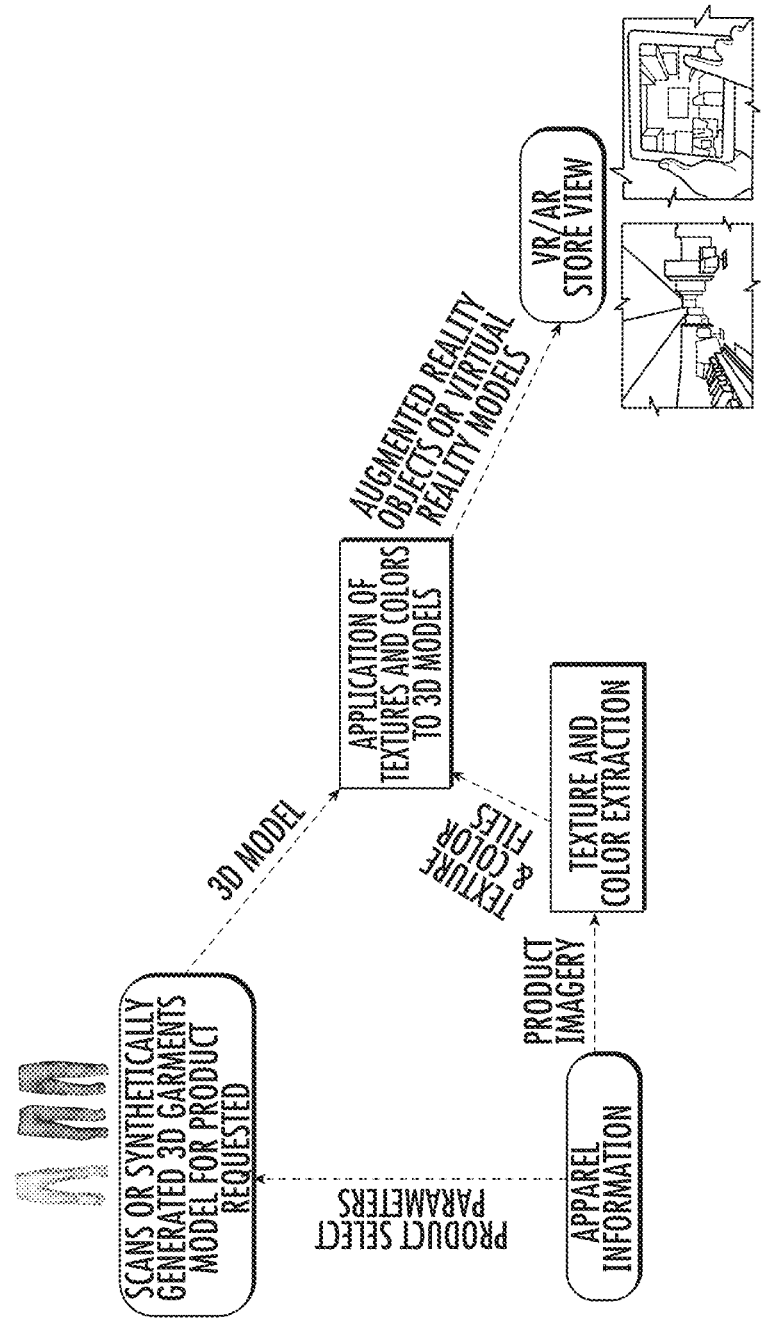
FIG. 47 shows a flow for an augmented reality technique for displaying a collection of garments in an augmented reality.

FIG. 47 shows a flow for an augmented reality technique for displaying a collection of garments in an augmented reality. Apparel information, such as a collection of one or more products, is provided. This includes associated apparel images and user-selected process parameters for items in the collection. Three-dimensional garment models are selected from a database depending on the apparel information received. The three-dimensional garment models can be directly scanned or synthetically created. For example, three-dimensional garment models can be directly scanned for use in the store preview feature or an approximation can be created on-the-fly when the model is required by the virtual storefront feature. Texture and color information are extracted from the product imagery to generate texture and color files. The three-dimensional garment models and texture and color files undergo the application of textures and colors to the three-dimensional garment models. This technique creates augmented reality objects that are presented to the customer in an augmented reality virtual storefront view.

The viewer device has a screen and a camera on an opposite side of the device from the screen. The viewer's camera captures images of the empty real-world environment. The captured real-world environment is displayed on the screen along with the virtual garments to create an augmented reality view of a virtual storefront or virtual retail space. When the user moves the viewer, such as tilting, panning, or walking around, the virtual storefront with populated virtual apparel on the screen, will update in near real-time.

Figure 48:
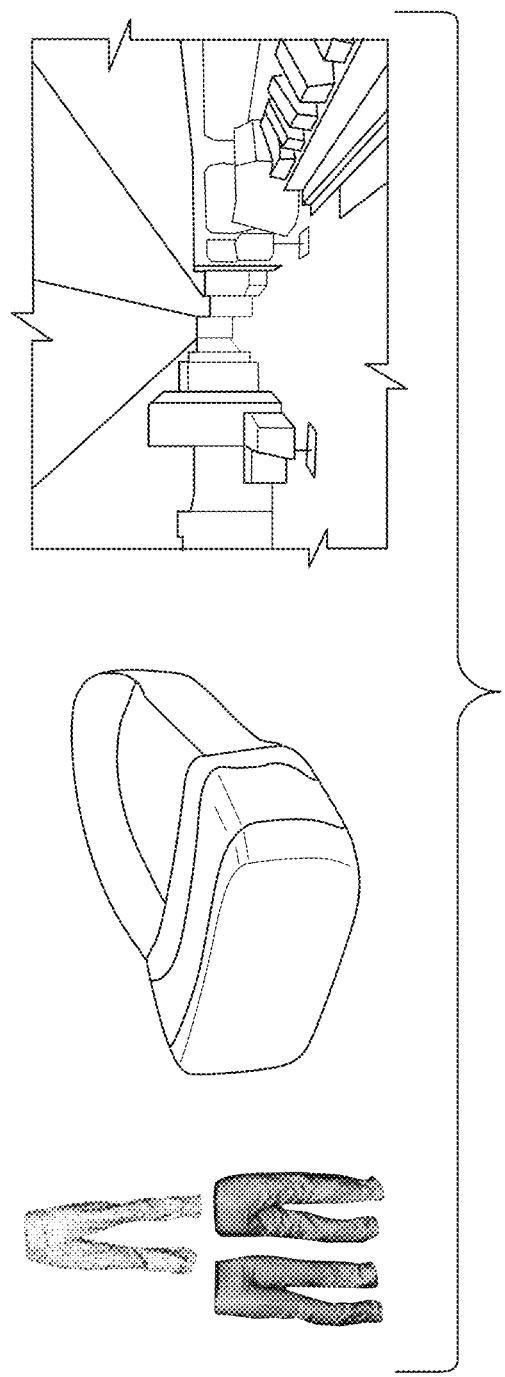
FIG. 48 shows a virtual reality approach for displaying a collection of garments in a virtual reality or an augmented reality using a virtual reality headset.

FIG. 48 shows a virtual reality approach for displaying a collection of garments in a virtual reality or an augmented reality using a virtual reality headset. The environment can be a completely synthetic environment where the customer can experience through a virtual reality headset a virtual storefront that is populated by garments in a collection. The environment can either be set by the garment manufacturer (e.g., LS&Co.) or the user. In an implementation, the virtual reality or augmented reality can be displayed on one or more of the control computer systems 2069 of the showroom and on the virtual reality headset. The virtual reality or augmented reality displayed on a display of one of the control computer systems 2069 is a preview of the virtual reality or augmented reality displayed on the virtual reality headset where the headset can show different views of the virtual reality or augmented reality when a user moves their head. The virtual reality or augmented reality views of one or both of the views displayed on the control computer system and the headset can be three-dimensional preview images.

For a pair of jeans, a three-dimensional garment model of the jeans is retrieved. Options for the jeans, such as color, finish, base, tint, and other options, are projected onto the three-dimensional garment model. A customer views the virtual reality environment by wearing a virtual reality headset. With the headset, the customer will see on a screen the virtual storefront. When the customer moves, such as tilting their heads, moving forward or backward, rotating their head, the virtual storefront will update the populated apparel and virtual environment in near real time. Alternatively, the customer may navigate the virtual environment using an input device, such as a joystick, controller, or keyboard.

A flow of a virtual reality technique may be similar to a flow for the augmented reality approach discussed above and shown in FIG. 47. In an implementation, instead of augmented reality, the technique creates virtual reality models that are presented to the customer in a virtual reality storefront view. In an implementation, instead of virtual reality, the technique creates augmented reality models that are presented to the customer in an augmented reality storefront view.

In an implementation, a system includes: (1) a first three-dimensional model including a portion of a human form to support a base garment that includes the human form when the base garment is positioned on the first three-dimensional model; (2) a computing device including a display and a first communication port, where a selection screen on the display includes a first three-dimensional preview image of a first base garment, and a first selection finishing pattern of a number of selection finishing patterns, selectable by a user, along with the first three-dimensional preview image, an appearance of the first three-dimensional preview image is as if the first base garment is worn by a person, and the first selection finishing patterns include laser finishing patterns for the first base garment and when the first selected finishing pattern is selected the first three-dimensional preview image is displayed in combination with the first selected finishing pattern, and (3) a first projector including an optical source structure directed toward the first three-dimensional model, and a second communication port connected to the first communication port of the computing device, where the second communication port receives the first selected finishing pattern through the first communication port when the first selected finishing pattern is selected, and an appearance of a first base garment positioned on the first three-dimensional model with the first selected finishing pattern projected onto the first base garment by the optical source structure of the first projector has an approximate appearance of the first three-dimensional preview image of the first base garment combined with the first selected finishing patterns displayed on the selection screen.

The system can further include: (4) a second three-dimensional model including a portion of a human form to support a base garment that includes the human form when a base garment is positioned on the second three-dimensional model, where the computing device includes a third communication port, where a selection screen on the display includes a second three-dimensional preview image of a second base garment, and a second selection finishing pattern of the number of selection finishing patterns, selectable by a user, along with the second three-dimensional preview image, an appearance of the second three-dimensional preview image is as if the second base garment is worn by a person, and the second selection finishing pattern includes laser finishing patterns for the second base garment and when the second selected finishing pattern is selected, the second three-dimensional preview image is displayed in combination with the second selected finishing pattern; and (5) a second projector including an optical source structure directed toward the second three-dimensional model, and a forth communication port connected to the third communication port of the computing device, where the fourth communication port receives the second selected finishing pattern through the third communication port when the second selected finishing pattern is selected, and an appearance of a second base garment positioned on the second three-dimensional model with the second selected finishing pattern projected onto the second base garment by the optical source structure of the second projector has an approximate appearance of the second three-dimensional preview image of the second base garment combined with the second selected finishing patterns displayed on the selection screen.

The system can further include where the fourth communication port receives the first selected finishing pattern through the third communication port when the first selected finishing pattern is selected and the first base garment is on the second three-dimensional model, and an appearance of the first base garment positioned on the second three-dimensional model with the first selected finishing pattern projected onto the first base garment by the optical source structure of the second projector has an approximate appearance of the first three-dimensional preview image of the first base garment combined with the first selected finishing patterns displayed on the selection screen.

The system can further include where the second communication port receives the second selected finishing pattern through the first communication port when the second selected finishing pattern is selected and the second base garment is on the first three-dimensional model, and an appearance of the second base garment positioned on the first three-dimensional model with the second selected finishing pattern projected onto the second base garment by the optical source structure of the second projector has an approximate appearance of the second three-dimensional preview image of the second base garment combined with the second selected finishing patterns displayed on the selection screen.

In various implementations, the system can include a switch connected between the first and second communication ports and between the third and fourth communication ports, where the switch comprises a first video board connected to the second communication port and a second video board connected to the fourth communication port. The switch can route the first selected finishing pattern to the second communication port from the first communication port when the first base garment is positioned on the first three-dimensional model. The switch can route the second selected finishing pattern to the fourth communication port from the third communication port when the second base garment is positioned on the first three-dimensional model. The switch can route the second selected finishing pattern to the fourth communication port from the third communication port when the second base garment is positioned on the second three-dimensional model. The switch can route the second selected finishing pattern to the second communication port from the first communication port when the second base garment is positioned on the first three-dimensional model.

The switch can be located in the computing device. The switch can be externally located from the computing device. The first and third communication ports can be a single communication port. The first and second base garments can be different base garments. The first and second base garments can be the same base garments and the first and second selection finishing patterns are different selection finishing patterns. The first three-dimensional model includes a first pose, the second three-dimensional model includes a second pose, and the first and second poses are different poses.

The system can include a sensor, where the sensor includes a sensor structure and a third communication port connected to a fourth communication port of the computing device, the fourth communication port receives an angular orientation for the first three-dimensional model or first base garment on the first three-dimensional model when the sensor structure determines the angular orientation. The second communication port can receive an updated selected finishing pattern through the first communication port for the first three-dimensional model or first base garment in the angular orientation and the appearance of the first base garment positioned on the first three-dimensional model with the updated selected finishing pattern is for the angular orientation.

The first three-dimensional model can be a mannequin having human-shaped legs. The first three-dimensional model can be a mannequin having a human-shaped upper body or torso. The first three-dimensional model can be a human model.

In an implementation, a system includes: (1) a computing device including a first display and a first communication port, where a selection screen on the display includes a three-dimensional preview image of a base garment, and a selection finishing pattern of a number of selection finishing patterns, selectable by a user, along with the three-dimensional preview image, an appearance of the three-dimensional preview image is as if the base garment is on a display in a retail environment, and the selection finishing patterns includes laser finishing patterns for the base garment and when the selected finishing pattern is selected the three-dimensional preview image is displayed in combination with the selected finishing pattern; and (2) a virtual reality headset including a second display and a second communication port connected to the first communication port of the computing device, where the second communication port receives an image file for the base garment and the selected finishing pattern through the first communication port when the selected finishing pattern is selected, and the second display includes the three-dimensional preview image received in the image file, as if the base garment with the selected finishing pattern is on the display in the retail environment and has an approximate appearance of the three-dimensional preview image of the base garment combined with the selected finishing patterns displayed on the selection screen.

The display in the retail environment can include a table in the retail environment. The display in the retail environment can be a shelf. The display in the retail environment can be a garment rack. The display in the retail environment can be a mannequin.

In an implementation, a system includes: (1) a computing device including a first display and a first communication port, where a selection screen on the display includes a three-dimensional preview image of a base garment, and a selection finishing pattern of a number of selection finishing patterns, selectable by a user, along with the three-dimensional preview image, an appearance of the three-dimensional preview image is as if the base garment is on a display in a retail environment, and the selection finishing patterns includes laser finishing patterns for the base garment and when the selected finishing pattern is selected the three-dimensional preview image is displayed in combination with the selected finishing pattern; and (2) an augmented reality headset including a second display and a second communication port connected to the first communication port of the computing device, where the second communication port receives an image file for the base garment and the selected finishing pattern through the first communication port when the selected finishing pattern is selected, and the second display includes the three-dimensional preview image received in the image file, as if the base garment with the selected finishing pattern is on the display in the retail environment and has an approximate appearance of the three-dimensional preview image of the base garment combined with the selected finishing patterns displayed on the selection screen.

The first three-dimensional model can be a mannequin having human-shaped legs. The first three-dimensional model can be a mannequin having a human-shaped upper body or torso. The first three-dimensional model can be a human model.

In an implementation, a system includes: a number of three-dimensional models, each including a portion of a human form to support base garments that includes the human forms when base garments are positioned on the three-dimensional models; a computing device including a display, a first communication port, and a second communication port where a selection screen on the display includes a first three-dimensional preview image of a first base garment, and a first selection finishing pattern of a number of selection finishing patterns, selectable by a user, along with the first three-dimensional preview image, an appearance of the first three-dimensional preview image is as if the first base garment is worn by a person, and the first selection finishing patterns includes laser finishing patterns for the first base garment and when the first selected finishing pattern is selected the first three-dimensional preview image is displayed in combination with the first selected finishing pattern; and a first projector including an optical source structure directed toward a first three-dimensional model of the number of three-dimensional models, and a third communication port connected to the first communication port of the computing device.

The system can include: a second projector including an optical source structure directed toward a second three-dimensional model of the number of three-dimensional model, and a fourth communication port connected to the second communication port of the computing device; and a switch connected between first and third communication ports and connected between the second and fourth communication ports, where the switch routes the first selected finishing pattern to the third communication port from the first communication port when a first base garment is positioned on the first three-dimensional model, routes the first selected finishing pattern to the fourth communication port from the second communication port when the first base garment is positioned on the second three-dimensional model, and an appearance of the first base garment positioned on the first or second three-dimensional model with the first selected finishing pattern projected onto the first base garment by the optical source structure of the first or second projector has an approximate appearance of the first three-dimensional preview image of the first base garment combined with the first selected finishing patterns displayed on the selection screen.

In various implementations, the selection screen on the display can includes a second three-dimensional preview image of a second base garment, and a second selection finishing pattern of a number of selection finishing patterns, selectable by a user, along with the second three-dimensional preview image, an appearance of the second three-dimensional preview image is as if the second base garment is worn by a person, and the second selection finishing patterns include laser finishing patterns for the second base garment and when the second selected finishing pattern is selected, the second three-dimensional preview image is displayed in combination with the second selected finishing pattern, and an appearance of the second base garment positioned on the first or second three-dimensional model with the second selected finishing pattern projected onto the second base garment by the optical source structure of the first or second projector has an approximate appearance of the second three-dimensional preview image of the second base garment combined with the second selected finishing patterns displayed on the selection screen.

The first and second communication ports can be a single port. The selection screen on the display can include an assortment selection option, selectable by a user to add a selected garment having a selected finishing pattern to a garment assortment, along with the three-dimensional preview image. The selection screen on the display can include a product offering menu, to search garments by image or text, along with the three-dimensional preview image. The three-dimensional models can include a store table top. The three-dimensional models can include a store shelf. The three-dimensional models can include a clothing rack. The first base garment can be a pair of jeans. The first base garment can be a jacket. The first selected finishing pattern can include a three-dimensional selected finishing pattern. The first selected finishing pattern can include digital picture information of a person wearing the first base garment.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. Various elements of the embodiments may be combined with or substituted for other elements of the embodiments. This description will enable others skilled in the art to best utilize and practice the invention in various embodiments and with various modifications as are suited to a particular use. The scope of the invention is defined by the following claims.

The invention claimed is:

1. A system comprising:
 a computing device comprising a first display and a first communication port, wherein a selection screen on the display comprises a three-dimensional preview image of a base garment, and a selection finishing pattern of a plurality of selection finishing patterns, selectable by a user, along with the three-dimensional preview image, an appearance of the three-dimensional preview image is as if the base garment is on a display in a retail environment, and the selection finishing patterns comprise laser finishing patterns for the base garment and when the selected finishing pattern is selected the three-dimensional preview image is displayed in combination with the selected finishing pattern,
 the three-dimensional preview image of a base garment comprises a first preview image,
 the three-dimensional preview image displayed in combination with the selected finishing pattern comprise a second preview image,
 the second garment preview image is generated by
 generating an adjusted base image from the garment base image without the selected finishing pattern,
 generating a pattern mask based on a laser input file associated with the selected finishing pattern,
 for a pixel at a pixel location of the first garment preview image, obtaining a first contribution by combining a first value associated with a pixel of the pattern mask at a pattern mask pixel location that corresponds to the pixel location of the first garment preview image and a value of a pixel of the garment base image at a base image pixel location that corresponds to the pixel location of the first preview image,
 for the pixel at the pixel location of the first preview image, obtaining a second contribution by combining a second value associated with the pixel of the pattern mask at the pattern mask pixel location that corresponds to the pixel location of the first preview image and a value of a pixel of the adjusted base image at an adjusted base image pixel location that corresponds to the pixel location of the second preview image,
 combining the first contribution and the second contribution to obtain a combined value for the pixel at the pixel location of the first preview image, and
 updating the pixel of the second preview image as a color on the first display, wherein the color of the pixel corresponds to the combined value; and
 a virtual reality headset comprising a second display and a second communication port coupled to the first communication port of the computing device, wherein the second communication port receives an image file for the base garment and the selected finishing pattern through the first communication port when the selected finishing pattern is selected, and the second display comprises the three-dimensional preview image received in the image file, as if the base garment with the selected finishing pattern is on the display in the retail environment and has an appearance based on the three-dimensional preview image of the base garment combined with the selected finishing patterns displayed on the selection screen.

2. The system of claim 1 wherein the display in the retail environment comprises a table in the retail environment.

3. The system of claim 1 wherein the display in the retail environment comprises a shelf.

4. The system of claim 1 wherein the display in the retail environment comprises a garment rack.

5. The system of claim 1 wherein the display in the retail environment comprises a mannequin.

6. The system of claim 1 wherein the base garment comprises a pair of jeans.

7. The system of claim 1 wherein the base garment comprises a jacket.

8. The system of claim 1 wherein the selected finishing pattern comprises a three-dimensional selected finishing pattern.

9. The system of claim 1 wherein the selected finishing pattern comprises digital picture information of a person wearing the base garment.

10. The system of claim 1 wherein the display in the retail environment comprises garments other than the base garment.

11. The system of claim 1 wherein the base garment comprises a pair of jeans, and the user can move the jeans to a different position and see a resulting positional change of the jeans through the virtual reality headset.

12. The system of claim 1 wherein the base garment comprises a pair of jeans, and the user can move to a different position relative to the jeans shown in the second display, and then see the jeans from a perspective of the different position through the virtual reality headset.

13. The system of claim 1 comprising:
 a laser finishing facility, coupled to the computing device, wherein an input to the laser finishing facility comprises the laser input, and based on a laser input file, a laser removes selected amounts of material from a surface of a garment base template corresponding to the base garment.

14. The system of claim 1 wherein the computing device comprises a smartphone.

15. The system of claim 1 wherein the computing device comprises a tablet computer.

16. The system of claim 1 wherein the computing device comprises a computer a where the three-dimensional preview image is generated by way of a Web browser.

17. A system comprising:
a computing device comprising a first display and a first communication port, wherein a selection screen on the display comprises a three-dimensional preview image of a base garment comprising a pair of jeans, and a selection finishing pattern of a plurality of selection finishing patterns, selectable by a user, along with the three-dimensional preview image, an appearance of the three-dimensional preview image is as if the base garment is on a display in a retail environment, and the selection finishing patterns comprise laser finishing patterns for the base garment and when the selected finishing pattern is selected the three-dimensional preview image is displayed in combination with the selected finishing pattern,
the three-dimensional preview image of a base garment comprises a first preview image,
the three-dimensional preview image displayed in combination with the selected finishing pattern comprise a second preview image,
the second garment preview image is generated by
generating an adjusted base image from the garment base image without the selected finishing pattern,
generating a pattern mask based on a laser input file associated with the selected finishing pattern,
for a pixel at a pixel location of the first garment preview image, obtaining a first contribution by combining a first value associated with a pixel of the pattern mask at a pattern mask pixel location that corresponds to the pixel location of the first garment preview image and a value of a pixel of the garment base image at a base image pixel location that corresponds to the pixel location of the first preview image,
for the pixel at the pixel location of the first preview image, obtaining a second contribution by combining a second value associated with the pixel of the pattern mask at the pattern mask pixel location that corresponds to the pixel location of the first preview image and a value of a pixel of the adjusted base image at an adjusted base image pixel location that corresponds to the pixel location of the second preview image,
combining the first contribution and the second contribution to obtain a combined value for the pixel at the pixel location of the first preview image, and
updating the pixel of the second preview image as a color on the first display, wherein the color of the pixel corresponds to the combined value;
a virtual reality headset comprising a second display and a second communication port coupled to the first communication port of the computing device, wherein the second communication port receives an image file for the base garment and the selected finishing pattern through the first communication port when the selected finishing pattern is selected, and the second display comprises the three-dimensional preview image received in the image file, as if the base garment with the selected finishing pattern is on the display in the retail environment and has an appearance based on the three-dimensional preview image of the base garment combined with the selected finishing patterns displayed on the selection screen;
a laser finishing facility, coupled to the computing device, wherein an input to the laser finishing facility comprises the laser input, and based on a laser input file, a laser removes selected amounts of material from a surface of a garment base template corresponding to the base garment.

18. The system of claim 17 wherein the computing device comprises a smartphone.

19. The system of claim 17 wherein the computing device comprises a tablet computer.

20. The system of claim 17 wherein the computing device comprises a computer a where the three-dimensional preview image is generated by way of a Web browser.

21. The system of claim 17 wherein the user can move the jeans to a different position and see a resulting positional change of the jeans through the virtual reality headset.

22. The system of claim 17 wherein the user can move to a different position relative to the jeans shown in the second display, and then see the jeans from a perspective of the different position through the virtual reality headset.

* * * * *